(12) United States Patent
Zhang et al.

(10) Patent No.: US 11,706,556 B2
(45) Date of Patent: *Jul. 18, 2023

(54) ACOUSTIC OUTPUT APPARATUS

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 15 days.

This patent is subject to a terminal disclaimer.

(21) Appl. No.: 17/335,062

(22) Filed: May 31, 2021

(65) Prior Publication Data

US 2021/0289281 A1 Sep. 16, 2021

Related U.S. Application Data

(63) Continuation of application No. 17/172,012, filed on Feb. 9, 2021, now Pat. No. 11,115,774, which is a
(Continued)

(30) Foreign Application Priority Data

Apr. 30, 2019 (CN) .......................... 201910364346.2
Sep. 19, 2019 (CN) .......................... 201910888067.6
Sep. 19, 2019 (CN) .......................... 201910888762.2

(51) Int. Cl.
*H04R 1/10* (2006.01)
*H04R 1/20* (2006.01)
(Continued)

(52) U.S. Cl.
CPC ........... *H04R 1/1016* (2013.01); *G02C 11/00* (2013.01); *G02C 11/10* (2013.01); *G06F 3/16* (2013.01);
(Continued)

(58) Field of Classification Search
CPC .......... H04R 1/02; H04R 1/026; H04R 1/028; H04R 1/10; H04R 1/22; H04R 1/24;
(Continued)

(56) References Cited

U.S. PATENT DOCUMENTS 9,905,244 B2 * 2/2018 Glasgow ............ G02B 27/0093
10,555,106 B1 * 2/2020 Mehra ..................... G06F 3/165
(Continued)

FOREIGN PATENT DOCUMENTS

CN 103179483 A 6/2013
CN 106792304 A 5/2017
(Continued)

OTHER PUBLICATIONS

International Search Report in PCT/CN2020/087526 dated Jul. 23, 2020, 5 pages.
(Continued)

*Primary Examiner* — Thang V Tran
(74) *Attorney, Agent, or Firm* — Metis IP LLC

(57) ABSTRACT

The present disclosure provides an acoustic output apparatus including one or more status sensors, at least one low-frequency acoustic driver, at least one high-frequency acoustic driver, at least two first sound guiding holes, and at least two second sound guiding holes. The status sensors may detect status information of a user. The low-frequency acoustic driver may generate at least one first sound, a frequency of which is within a first frequency range. The high-frequency acoustic driver may generate at least one second sound, a frequency of which is within a second
(Continued)

frequency range including at least one frequency exceeding the first frequency range. The first and second sound guiding holes may output the first and second spatial sound, respectively. The first and second sound may be generated based on the status information, and may simulate a target sound coming from at least one virtual direction with respect to the user.

16 Claims, 37 Drawing Sheets

Related U.S. Application Data continuation of application No. PCT/CN2020/087526, filed on Apr. 28, 2020.

(51) Int. Cl.
| | |
|---|---|
| H04R 3/00 | (2006.01) |
| H04R 1/02 | (2006.01) |
| H04R 1/26 | (2006.01) |
| H04R 1/44 | (2006.01) |
| G06F 3/16 | (2006.01) |
| H04M 1/03 | (2006.01) |
| H04M 1/78 | (2006.01) |
| H04R 1/24 | (2006.01) |
| H04R 1/28 | (2006.01) |
| H04R 3/02 | (2006.01) |
| H04R 1/34 | (2006.01) |
| H04W 4/80 | (2018.01) |
| H04R 1/22 | (2006.01) |
| H04R 5/02 | (2006.01) |
| G10L 21/038 | (2013.01) |
| H04R 5/033 | (2006.01) |
| H04S 7/00 | (2006.01) |
| G02C 11/00 | (2006.01) |
| H04R 1/38 | (2006.01) |
| H04R 9/06 | (2006.01) |
| G10L 21/0208 | (2013.01) |
| G02C 11/06 | (2006.01) |
| G10L 21/0216 | (2013.01) |

(52) U.S. Cl.
CPC ............ *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/105* (2013.01); *H04R 1/1008* (2013.01); *H04R 1/1025* (2013.01); *H04R 1/1041* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC ... H04R 1/26; H04R 1/28; H04R 1/34; H04R 1/38; H04R 1/44; H04R 1/105; H04R 1/1008; H04R 1/1016; H04R 1/1075; H04R 1/1025; H04R 1/1041; H04R 1/245; H04R 1/1083; H04R 1/2803; H04R 1/2807; H04R 1/2811; H04R 1/2823; H04R 1/2846; H04R 1/2896; H04R 1/342; H04R 1/345; H04R 1/347; H04R 3/00; H04R 3/005; H04R 3/02; H04R 5/00; H04R 5/02; H04R 5/033; H04R 5/0335; H04R 9/06; H04R 2420/07; H04R 2201/103; H04R 2410/05; G10L 21/038; G10L 21/0208; H04S 7/304; H04S 2400/11; G06F 3/16; G06F 3/165; G06F 3/162; H04M 1/03; H04M 1/035; H04M 1/78; H04W 4/80; G02C 11/00; G02C 11/06; G02C 11/10
See application file for complete search history.

(56) References Cited

U.S. PATENT DOCUMENTS

| 11,115,774 | B2* | 9/2021 | Zhang ................ H04R 1/028 |
| 2005/0093653 | A1 | 5/2005 | Larson, III |
| 2006/0113143 | A1* | 6/2006 | Ishida .................. H04M 1/035 |
| | | | 181/148 |
| 2006/0252979 | A1 | 11/2006 | Vesely et al. |
| 2007/0076897 | A1 | 4/2007 | Philipp |
| 2007/0098198 | A1 | 5/2007 | Hildebrandt |
| 2011/0170730 | A1 | 7/2011 | Zhu |
| 2013/0051585 | A1 | 2/2013 | Karkkainen et al. |
| 2017/0195795 | A1 | 7/2017 | Mei et al. |
| 2017/0201822 | A1* | 7/2017 | Shetye .................. H04R 1/347 |
| 2017/0230741 | A1 | 8/2017 | Matsuo et al. |
| 2018/0167710 | A1* | 6/2018 | Silver .................. H04R 1/1075 |
| 2018/0376231 | A1 | 12/2018 | Pfaffinger |
| 2019/0026071 | A1 | 1/2019 | Tamaoki et al. |
| 2019/0052954 | A1* | 2/2019 | Rusconi Clerici Beltrami ........... |
| | | | G10K 11/175 |
| 2019/0238971 | A1* | 8/2019 | Wakeland ............ G02C 11/10 |
| 2020/0137476 | A1 | 4/2020 | Shinmen et al. |
| 2020/0169801 | A1 | 5/2020 | Zhu |
| 2020/0252708 | A1 | 8/2020 | Zhu |
| 2021/0136495 | A1 | 5/2021 | Hui |
| 2021/0160606 | A1 | 5/2021 | Zhang et al. |

FOREIGN PATENT DOCUMENTS

| CN | 207075075 U | 3/2018 |
| WO | 2020051786 A1 | 3/2020 |

OTHER PUBLICATIONS

Written Opinion in PCT/CN2020/087526 dated Jul. 23, 2020, 4 pages.

* cited by examiner

4600A

4600B

ACOUSTIC OUTPUT APPARATUS

CROSS REFERENCE TO RELATED APPLICATIONS

This application is a continuation of U.S. application Ser. No. 17/172,012, filed on Feb. 9, 2021, which is a Continuation of International Application No. PCT/CN2020/087526, filed on Apr. 28, 2020, which claims priority to Chinese Patent Application No. 201910888067.6, filed on Sep. 19, 2019, Chinese Patent Application No. 201910888762.2, filed on Sep. 19, 2019, and Chinese Patent Application No. 201910364346.2, filed on Apr. 30, 2019, the contents of each of which are hereby incorporated by reference.

TECHNICAL FIELD

The present disclosure generally relates to acoustic output apparatus, and more particularly, relates to acoustic output apparatus that can provide a spatial sound related to a virtual reality (VR) scene or an augmented reality (AR) scene to a user.

BACKGROUND

With the development of technology, smart VR/AR devices (e.g., smart glasses) are more and more popular. In some cases, open acoustic output apparatuses may be provided on the smart VR/AR devices to output sounds related to a VR/AR scene. An open acoustic output apparatus is a portable audio output apparatus that can spread a sound within a specific range, which allows a user to obtain sound information in the surrounding environment while listening to the sound outputted by the acoustic output apparatus. An open structure of the open acoustic output apparatus may lead to sound leakage that causes the sound outputted by the open binaural acoustic output apparatus to be possibly heard by other people around a user wearing the open acoustic output apparatus. Therefore, it is desirable to provide novel acoustic output devices that can reduce sound leakage and enhance an audio experience for the user.

SUMMARY

According to an aspect of the present disclosure, an acoustic output apparatus is provided. The acoustic output apparatus may include one or more status sensors, at least one low-frequency acoustic driver, at least one high-frequency acoustic driver, at least two first sound guiding holes, and at least two second sound guiding holes. The one or more status sensors may be configured to detect status information of a user. The at least one low-frequency acoustic driver may be configured to generate at least one first sound, wherein a frequency of the at least one first sound being within a first frequency range. The at least one high-frequency acoustic driver may be configured to generate at least one second sound. A frequency of the at least one second sound may be within a second frequency range, wherein the second frequency range includes at least one frequency that exceeds the first frequency range. The at least two first sound guiding holes may be acoustically coupled to the at least one low-frequency acoustic driver. The at least two first sound guiding holes may be configured to output the at least one first sound. The at least two second sound guiding holes may be acoustically coupled to the at least one high-frequency acoustic driver. The at least two second sound guiding holes may be configured to output the second spatial sound. The at least one first sound and the at least one second sound may be generated based on the status information. The at least one first sound and the at least one second sound may be configured to simulate at least one target sound coming from at least one virtual direction with respect to the user.

In some embodiments, there may be a first distance between the at least two first sound guiding holes and a second distance between the at least two second sound guiding holes. The first distance may be greater than the second distance.

In some embodiments, the first distance may be with a range of 20 mm-40 mm.

In some embodiments, the second distance may be within a range of 3 mm-7 mm.

In some embodiments, the first distance may be greater than or equal to two times of the second distance.

In some embodiments, the first frequency range may include at least one frequency that is lower than 650 Hz, and the second frequency range may include at least one frequency that is higher than 1000 Hz.

In some embodiments, the first frequency range may overlap with the second frequency range.

In some embodiments, the acoustic output apparatus may further include an electronic frequency division module. The electronic frequency division module may be configured to divide a sound signal into a first sound signal corresponding to a sound of the first frequency range and a second sound signal corresponding to a sound of the second frequency range. The first sound signal may be transmitted to the at least one low-frequency acoustic driver and the second sound signal may be transmitted to the at least one high-frequency acoustic driver.

In some embodiments, the electronic frequency division module may include at least one of a passive filter, an active filter, an analog filter, or a digital filter.

In some embodiments, the at least one low-frequency acoustic driver may include a first transducer, and the at least one high-frequency acoustic driver may include a second transducer. The first transducer and the second transducer may have different frequency response characteristics.

In some embodiments, the first transducer may include a low-frequency speaker, and the second transducer may include a high-frequency speaker.

In some embodiments, the at least two first sound guiding holes may be coupled to the at least one low-frequency acoustic driver via a first acoustic route, and the at least two second sound guiding holes may be coupled to the at least one high-frequency acoustic driver via a second acoustic route. The first acoustic route and the second acoustic route may have different frequency selection characteristics.

In some embodiments, the first acoustic route may include an acoustic impedance material. The acoustic impedance of the acoustic impedance material may be within a range of 5 MKS Rayleigh to 500 MKS Rayleigh.

In some embodiments, the acoustic output apparatus may further include a supporting structure. The supporting structure may be configured to carry the at least one low-frequency acoustic driver and the at least one high-frequency acoustic driver, and enable the acoustic output apparatus to be located off the user ear.

In some embodiments, a distance between each of the at least two first sound guiding holes and an ear of the user may be greater than a distance between each of the at least two second sound guiding holes and the ear of the user.

In some embodiments, the at least two first sound guiding holes and the at least two second sound guiding holes may be located on the supporting structure.

In some embodiments, the at least one low-frequency acoustic driver may be enclosed in a first housing, wherein the first housing forms a first front chamber of the at least one low-frequency acoustic driver and a first rear chamber of the at least one low-frequency acoustic driver.

In some embodiments, the first front chamber may be acoustically coupled to one of the at least two first sound guiding holes, and the first rear chamber may be acoustically coupled to another one of the at least two first sound guiding holes.

In some embodiments, the at least one high-frequency acoustic driver may be enclosed in a second housing, wherein the second housing forms a second front chamber of the at least one high-frequency acoustic driver and a second rear chamber of the at least one high-frequency acoustic driver.

In some embodiments, the second front chamber may be acoustically coupled to one of the at least two second sound guiding holes, and the second rear chamber may be acoustically coupled to another one of the at least two second sound guiding holes.

In some embodiments, a phase of one of the at least one first sound outputted from one of the at least two first sound guiding holes may be opposite to a phase of another one of the at least one first sound outputted from another one of the at least two first sound guiding holes.

In some embodiments, a phase of one of the at least one second sound outputted from one of the at least two second sound guiding holes may be opposite to a phase of another one of the at least one second sound outputted from another one of the at least two second sound guiding holes.

In some embodiments, the at least two first sound guiding holes may include a first set of first sound guiding holes located in a first region of the acoustic output apparatus and a second set of first sound guiding holes located in a second region of the acoustic output apparatus. The first region of the acoustic output apparatus and the second region of the acoustic output apparatus may be located at opposite sides of the user. The at least two second sound guiding holes may include a first set of second sound guiding holes located in a third region of the acoustic output apparatus and a second set of second sound guiding holes located in a fourth region of the acoustic output apparatus. The third region of the acoustic output apparatus and the fourth region of the acoustic output apparatus may be located at opposite sides of the user.

In some embodiments, the at least one target sound coming from at least one virtual direction with respect to the user may be simulated based on at least one of: a first difference between the at least one first sound outputted by the first set of first sound guiding holes and the at least one first sound outputted by the second set of first sound guiding holes, or a second difference between the at least one second sound outputted by the first set of second sound guiding holes and the at least one second sound outputted by the second set of second sound guiding holes.

In some embodiments, the first difference or the second difference may include at least one of a phase difference, an amplitude difference, or a frequency difference.

In some embodiments, the acoustic output apparatus may further include a display configured to present visual data to the user based on the status information of the user.

In some embodiments, the acoustic output apparatus may further include a camera configured to obtain image data from a scene around the user in real time.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations outlined in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
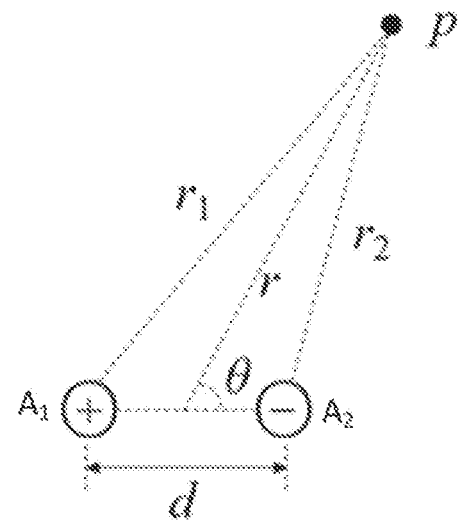
FIG. 1 is a schematic diagram illustrating exemplary two point sources according to some embodiments of the present disclosure.

In order to illustrate the technical solutions related to the embodiments of the present disclosure, a brief introduction of the drawings referred to in the description of the embodiments is provided below. Drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure are described with reference to the drawings. It is obvious that the described embodiments are not exhaustive and are not limiting. Other embodiments obtained, based on the embodiments outlined in the present disclosure, by those with ordinary skill in the art without any creative works are within the scope of the present disclosure.

An aspect of the present disclosure relates to an acoustic output apparatus. The acoustic output apparatus may include one or more sensors, a controller, a target sound generation module, at least one low-frequency acoustic driver, at least one high-frequency acoustic driver, at least two first sound guiding holes, and at least two second sound guiding holes. The one or more sensors may include one or more status sensors configured to detect status information of a user. The controller may be configured to generate a first sound signal corresponding to a first frequency range and a second sound signal corresponding to a second frequency range. The second frequency range may include frequencies higher than the first frequency range. The target sound generation module may be configured to generate at least two sound signals for simulating a target sound. The target sound may be a spatial sound that allows the user to identify the position information of the sound source in a VR/AR scene. The at least one low-frequency acoustic driver may be configured to generate a first sound corresponding to the first frequency range. The at least one high-frequency acoustic driver may be configured to generate a second sound corresponding to the second frequency range. The at least two first sound guiding holes may be acoustically coupled to the at least one low-frequency acoustic driver and configured to output the first sound. The at least two second sound guiding holes may be acoustically coupled to the at least one high-frequency acoustic driver and configured to output the second sound. In some embodiments, the at least one first sound and the at least one second sound may be configured to simulate at least one target sound coming from at least one virtual direction with respect to the user. The user may be able to identify a direction or a position of a sound source of the target sound. Thus, an audio experience of the user ma be improved. For example, the at least two first sound guiding holes may include a first set of sound guiding holes which are located at one side of a user (e.g., the left side close to the left ear) and a second set of sound guiding holes which are located at another side of the user (e.g., the right side close to the right ear). The different sets of sound guiding holes may output sounds with different phases, different amplitudes, and/or different frequencies to simulate the at least one target sound.

According to another aspect of the present disclosure, the acoustic output device may further include a noise reduction device configured to reduce the noise of sound detected by an audio sensor of the acoustic output device. The noise reduction device can generate a plurality of sub-band noise correction signal in response to the sub-band noise signals. As a result, noise in the sound detected by the audio sensor may be effectively reduced or eliminated. The user may interact with the acoustic output device by, for example, speaking. Therefore, the user experience for using the acoustic output device may be enhanced.

An acoustic output apparatus in the present disclosure may refer to a device having a sound output function. In practical applications, the acoustic output apparatus may include different product forms such as bracelets, glasses, helmets, watches, clothing, or backpacks. For illustration purposes, a glass with a sound output function may be provided as an example. Exemplary glasses may include myopia glasses, sports glasses, hyperopia glasses, reading glasses, astigmatism lenses, wind/sand-proof glasses, sunglasses, ultraviolet-proof glasses, welding mirrors, infrared-proof mirrors, smart glasses, or the like, or any combination thereof. Exemplary smart glasses may include virtual reality (VR) glasses, augmented reality (AR) glasses, mixed reality (MR) glasses, mediated reality glasses, or the like, or any combination thereof.

Taking the smart glasses as an example, the sound output function of the acoustic output apparatus is described hereinafter. The smart glasses may include a microphone array. The microphone array may include a plurality of microphones. Each of the microphones may have a specific frequency response to the sound. Each of the microphones may be configured to detect sound and generate a sub-band sound signal in response to the detected sound. For example, the microphone with a higher frequency response may be more sensitive to high-frequency sound, and the microphone with a lower frequency response may be more sensitive to low-frequency sound. The microphones with different frequency responses may improve the ability of the smart glasses to detect the sound and make a frequency response curve of the smart glasses flat, thereby improving a sound pickup effect of the smart glasses. In some embodiments, the smart glasses may further include a noise reduction device and a combination device. The noise reduction device may generate a plurality of noise correction signals according to the sub-band voice signals. Each of the noise correction signals may be generated according to one of the sub-band voice signals. The microphone array may add a noise correction signal to the corresponding sub-band voice signal to generate a sub-band correction signal. The combination device may combine a plurality of sub-band correction signals generated by the microphone array to generate a target sound signal.

In some embodiments, when the user wears the smart glasses, the smart glasses may be located on at least one side of the user's head, and be close to but not blocking the user's ear. The smart glasses may be worn on the user's head (for example, non-in-ear open earphones worn with glasses, headbands, or other structural means) or on other parts of the user's body, such as the user's neck/shoulder.

In some embodiments, the smart glasses may include at least two groups of acoustic drivers, which may include at least one group of high-frequency acoustic drivers and one group of low-frequency acoustic drivers. Each group of acoustic drivers may be used to generate a sound with a certain frequency range, and the sound may be propagated outward through at least two sound guiding holes that are acoustically coupled to it. By dividing (for example, decomposing into high and low-frequency signals) the sound signal and setting different sound guiding hole pitches for the frequency-divided signals in different frequency bands (for example, the distance between two sound guiding holes corresponding to the low-frequency acoustic driver may be set greater than the distance between at least two sound guiding holes corresponding to the high-frequency acoustic driver), the leakage reduction capability of the open binaural headphones may be improved.

In some embodiments, a baffle structure may be provided on the smart glasses, so that the at least two sound guiding holes may be distributed on both sides of the baffle, respectively. In some embodiments, the at least two sound guiding holes may be distributed on both sides of the user's auricle. At this time, the auricle may serve as a baffle, and the at least two sound guiding holes may be separated, so that the propagation routes of the sound emitted from the at least two sound guiding holes to the user's ear canal may be different. By setting the baffle, the propagation route of the sound from different sound guiding holes to the user's ear canal may be different, and the leakage reduction capability of the open binaural headphones may be improved.

FIG. 1 is a schematic diagram illustrating exemplary two-point sound sources according to some embodiments of the present disclosure. In order to further explain the effect of the setting of the sound guiding hole on the acoustic output apparatus on the sound output effect of the acoustic output apparatus, and considering that the sound may be regarded as propagating outwards from the sound guiding hole, the present disclosure may describe a sound guiding hole on an acoustic output apparatus as a sound source for externally outputting sound.

Just for the convenience of description and for illustration, when the size of the sound guiding hole on the acoustic output apparatus is small, each sound guiding hole may be approximately regarded as a point source (or referred to as a point sound source or a sound source). In some embodiments, any sound guiding hole provided on the acoustic output apparatus for outputting sound may be approximated as a single-point sound source on the acoustic output apparatus. The sound field pressure p generated by a single-point sound source may satisfy Equation (1):

$$p = \frac{j\omega\rho_0}{4\pi r} Q_0 \exp j(\omega t - kr), \quad (1)$$

where $\omega$ is the angular frequency, $\rho_0$ is the air density, r is the distance between a target point and the sound source, $Q_0$ is the volume velocity of the sound source, and k is the wave number. It may be seen that the magnitude of the sound field pressure of sound field of the point sound source at the target point is inversely proportional to the distance from the target point to the point sound source.

It should be noted that the sound guiding holes for outputting sound as point sources may only serve as an explanation of the principle and effect of the present disclosure, and may not limit the shapes and sizes of the sound guiding holes in practical applications. In some embodiments, if an area of a sound guiding hole is large enough, the sound guiding hole may also be equivalent to a planar acoustic source. In some embodiments, the point source may also be realized by other structures, such as a vibration surface and a sound radiation surface. For those skilled in the art, without creative activities, it may be known that sounds produced by structures such as a sound guiding hole, a vibration surface, and an acoustic radiation surface may be similar to a point source at the spatial scale discussed in the present disclosure and may have similar sound propagation characteristics and the similar mathematical description method. Further, for those skilled in the art, without creative activities, it may be known that the acoustic effect achieved by "an acoustic driver may output sound from at least two first sound guiding holes" described in the present disclosure may also achieve the same effect by other acoustic structures, for example, "at least two acoustic drivers each may output sound from at least one acoustic radiation surface." According to actual situations, other acoustic structures may be selected for adjustment and combination, and the same acoustic output effect may also be achieved. The principle of radiating sound outward with structures such as surface sound sources may be similar to that of point sources, and may not be repeated here.

As mentioned above, at least two sound guiding holes corresponding to the same acoustic driver may be set on the acoustic output apparatus provided in the specification. In this case, two point sources may be formed, which may reduce sound transmitted to the surrounding environment. For convenience, sound output from the acoustic output apparatus to the surrounding environment may be referred to as a far-field leakage since it can be heard by others in the environment. The sound output from the acoustic output apparatus to the ears of the user wearing the acoustic output apparatus may be referred to as a near-field sound since a distance between the acoustic output apparatus and the user is relatively short. In some embodiments, the sound output from two sound guiding holes (i.e., two point sources) may have a certain phase difference. When the distance between the two point sources and the phase difference of the two point sources meet a certain condition, the acoustic output apparatus may output different sound effects in the near-field (for example, the position of the user's ear) and the far-field. For example, if the phases of the point sources corresponding to the two sound guiding holes are opposite, that is, an absolute value of the phase difference between the two point sources is 180 degrees, the far-field leakage may be reduced according to the principle of reversed phase destruction. More details regarding enhancement of the acoustic output apparatus by adjusting the amplitude and/or phase of each point source may be found in International Application No. PCT/CN2019/130884, filed on Dec. 31, 2019, the entire content of which may be hereby incorporated by reference.

As shown in FIG. 1, a sound field pressure p generated by two-point sound sources may satisfy Equation (2):

$$p = \frac{A_1}{r_1} \exp j(\omega t - kr_1 + \varphi_1) + \frac{A_2}{r_2} \exp j(\omega t - kr_2 + \varphi_2), \quad (2)$$

where $A_1$ and $A_2$ denote intensities of the two-point sound sources, and $\varphi_1$ and $\varphi_2$ denote phases of the two-point sound sources, respectively, d denotes a distance between the two-point sound sources, and $r_1$ and $r_2$ may satisfy Equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad 3)$$

where r denotes a distance between a target point and the center of the two-point sound sources in the space, and θ indicates an angle between a line connecting the target point and the center of the two-point sound sources and the line on which the two point sound source is located.

It may be known from Equation (3) that a magnitude of the sound pressure p at the target point in the sound field may relate to the intensity of each point sound source, the distance d, the phase of each point source, and the distance r.

Two point sources with different output effects may be achieved by different settings of sound guiding holes, such that the volume of the near-field heard may be improved, and the far-field leakage may be reduced. For example, an acoustic driver may include a vibration diaphragm. When the vibration diaphragm vibrates, sounds may be emitted from the front and rear sides of the vibration diaphragm, respectively. The front side of the vibration diaphragm in the acoustic output apparatus may be provided with a front chamber for transmitting sound. The front chamber may be acoustically coupled with a sound guiding hole. The sound on the front side of the vibration diaphragm may be transmitted to the sound guiding hole through the front chamber and further transmitted outwards. The rear side of the vibration diaphragm in the acoustic output apparatus may be provided with a rear chamber for transmitting sound. The rear chamber may be acoustically coupled with another sound guiding hole. The sound on the rear side of the vibration diaphragm may be transmitted to the sound guiding hole through the rear chamber and propagate further outwards. It should be noted that, when the vibration diaphragm is vibrating, the front side and the rear side of the vibration diaphragm may generate sounds with opposite phases. In some embodiments, the structures of the front chamber and rear chamber may be specially set so that the sound output by the acoustic driver at different sound guiding holes may meet a specific condition. For example, lengths of the front chamber and rear chamber may be specially designed such that sound with a specific phase relationship (e.g., opposite phases) may be output at the two sound guiding holes. As a result, a problem that the acoustic output apparatus has a low volume in the near-field and sound leakage in the far-field may be effectively resolved.

Under certain conditions, compared to the volume of a far-field leakage of a single point source, the volume of a far-field leakage of two point sources may increase with the frequency. In other words, the leakage reduction capability of the two point sources in the far-field may decrease with the frequency increases. For further description, a curve illustrating a relationship between a far-field leakage and a frequency may be described in connection with FIG. 2.

Figure 2:
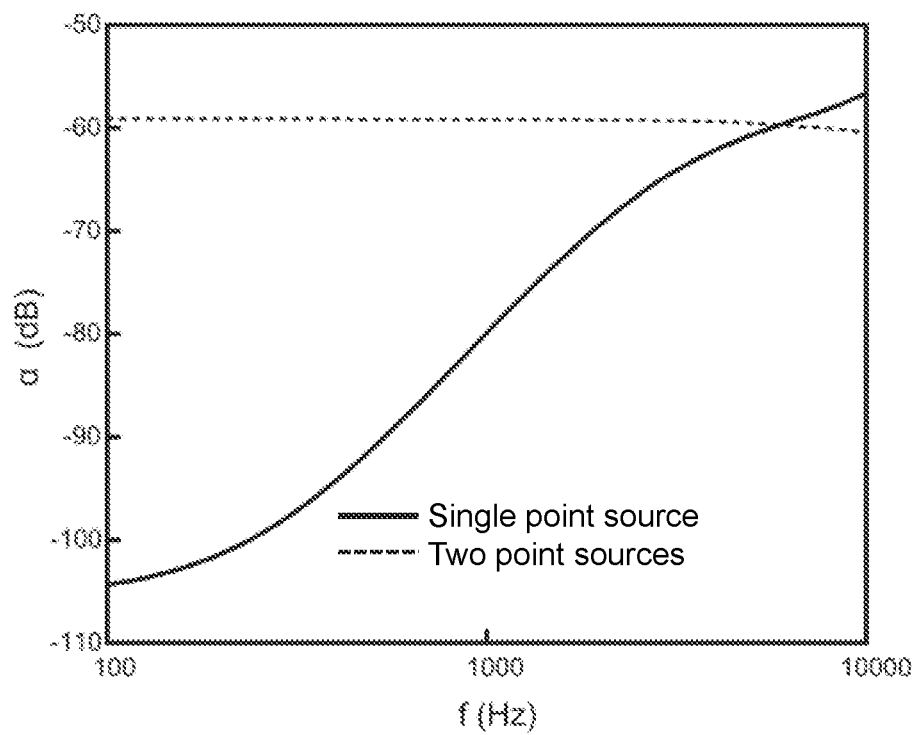
FIG. 2 is a schematic diagram illustrating a variation of sound leakage of two point sources and a single point source along with frequency according to some embodiments of the present disclosure.

FIG. 2 is a schematic diagram illustrating a variation of sound leakage of two-point sound sources and a single-point sound source along with frequency according to some embodiments of the present disclosure. A distance between the two point sound sources in FIG. 2 may be fixed, and two point sound sources may have the substantially same amplitude and opposite phases. The dotted line may indicate a variation curve of a volume of a leaked sound of a single-point sound source at different frequencies. The solid line may indicate a variation curve of a volume of a leaked sound of two-point sound sources at different frequencies. The abscissa of the diagram may represent the sound frequency (f), and the unit may be Hertz (Hz). The ordinate of the diagram may use a normalization parameter a to evaluate the volume of a leaked sound. The parameter a may be determined according to Equation (4):

$$\alpha = \frac{|P_{far}|^2}{|P_{ear}|^2}, \quad (4)$$

where $P_{far}$ represents the sound pressure of the acoustic output apparatus in the far-field (i.e., the sound pressure of the far-field sound leakage). $P_{ear}$ represents the sound pressure around the user's ears (i.e., the sound pressure of the near-field sound). The larger the value of α, the larger the far-field leakage relative to the near-field sound heard, which may indicate that a poorer capability of the acoustic output apparatus for reducing the far-field leakage.

As shown in FIG. 2, when the frequency is below 6000 Hz, the far-field leakage produced by the two-point sound sources may be less than the far-field leakage produced by the single-point sound source, and may increase as the frequency increases; When the frequency is close to 10000 Hz (for example, about 8000 Hz or above), the far-field leakage produced by the two-point sound sources may be greater than the far-field leakage produced by the single-point sound source. In some embodiments, a frequency corresponding to an intersection of the variation curves of the two-point sound sources and the single-point sound source may be determined as an upper limit frequency that the two-point sound sources are capable of reducing sound leakage.

For illustrative purposes, when the frequency is relatively small (for example, in a range of 100 Hz-1000 Hz), the capability of reducing sound leakage of the two point sources may be strong (e.g., the value of a is small, such as below −80 dB). In such a frequency band, an increase in the volume of the sound heard by the user may be determined as an optimization goal. When the frequency is larger (for example, in a range of 1000 Hz-8000 Hz), the capability of reducing sound leakage of the two point sources may be weak (e.g., above −80 dB). In such a frequency band, a decrease of the sound leakage may be determined as the optimization goal.

According to FIG. 2, it may be possible to determine a frequency division point based on the variation tendency of the two point sources' capability of reducing sound leakage.

Parameters of the two point sources may be adjusted according to the frequency division point so as to reducing the sound leakage of the acoustic output apparatus. For example, the frequency corresponding to a of α specific value (for example, −60 dB, −70 dB, −80 dB, −90 dB, etc.) may be used as the frequency division point. Parameters of the two point sources may be determined to improve the near-field sound in a frequency band below the frequency division point, and/or to reduce the far-field sound leakage in a frequency band above the frequency division point. In some embodiments, a high-frequency band with a high frequency (for example, a sound output from a high-frequency acoustic driver) and a low-frequency band with a low frequency (for example, a sound output from a low-frequency acoustic driver) may be determined based on the frequency division point. More details of the frequency division point may be disclosed elsewhere in the present disclosure, for example, FIG. 8 and the descriptions thereof.

In some embodiments, the method for measuring and determining the sound leakage may be adjusted according to the actual conditions. For example, a plurality of points on a spherical surface centered by s center point of the two point sources with a radius of r (for example, 40 centimeters) may be identified, and an average value of amplitudes of the sound pressure at the plurality of points may be determined as the value of the sound leakage. The distance between the near-field listening position and the point sources may be far less than the distance between the point sources and the spherical surface for measuring the far-field leakage. Optionally, the ratio of the distance from the near-field listening position to the center of the two point sources to the radius r may be less than 0.3, 0.2, 0.15, or 0.1. As another example, one or more points of the far-field may be taken as the position for measuring the sound leakage, and the sound volume of the position may be taken as the value of the sound leakage. As another example, a center of the two point sources may be used as a center of a circle at the far-field, and sound pressure amplitudes of two or more points evenly distributed at the circle according to a certain spatial angle may be averaged as the value of the sound leakage. These measuring and calculating methods may be adjusted by those skilled in the art according to actual conditions, and may not be limited herein.

According to FIG. 2, it may be concluded that in the high-frequency band (a higher frequency band determined according to the frequency division point), the two point sources may have a weak capability to reduce sound leakage. In the low-frequency band (a lower frequency band determined according to the frequency division point), the two point sources may have a strong capability to reduce sound leakage. At a certain sound frequency, if the distance between the two point sources changes, its capability to reduce sound leakage may be changed, and the difference between the volume of the sound heard by the user and volume of the leaked sound may also be changed. For a better description, the curve of a far-field leakage as a function of the distance of the two-point sound sources may be described with reference to FIGS. 3A and 3B.

Figure 3A:
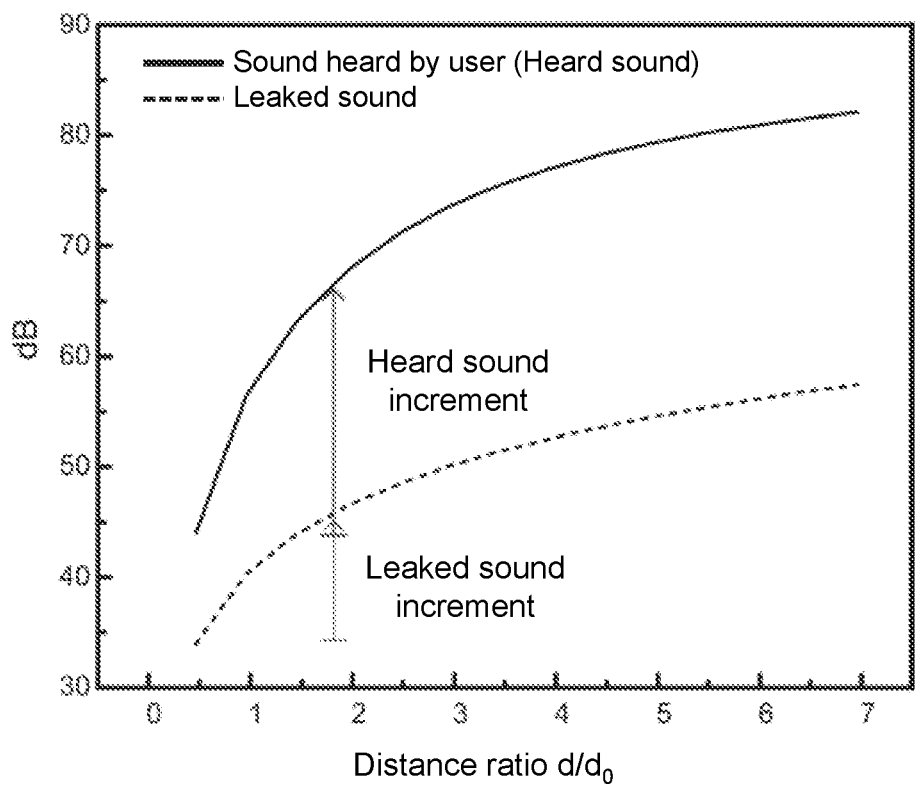
FIGS. 3A-3B are graphs illustrating a volume of the near-field sound and a volume of the far-field leakage as a function of a distance of two point sources according to some embodiments of the present disclosure.
Figure 3B:
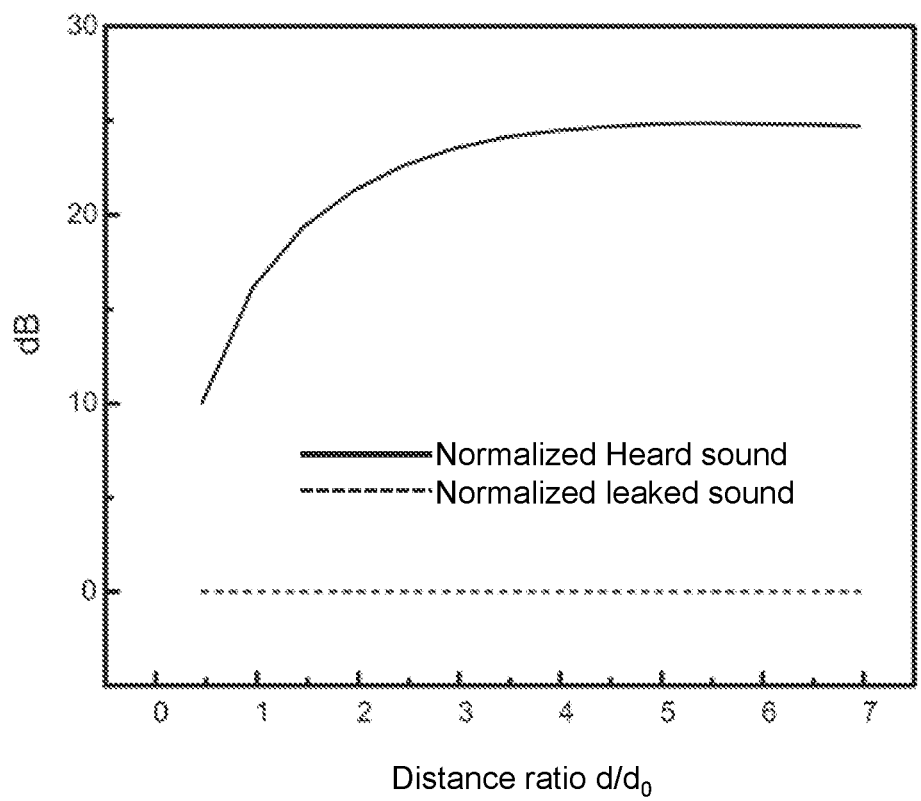

FIGS. 3A and 3B are exemplary graphs illustrating a volume of a near-field sound and a volume of a far-field leakage as a function of a distance between two point sources according to some embodiments of the present disclosure. FIG. 3B may be a graph generated by performing a normalization on the graph in FIG. 3A.

In FIG. 3A, a solid line may represent a variation curve of the volume of the two point sources as a function of the distance between the two point sources, and the dotted line may represent the variation curve of the volume of the leaked sound of the two point sources as a function of the distance between the two point sources. The abscissa may represent a distance ratio d/d0 of the distance d of the two point sources to a reference distance d0. The ordinate may represent a sound volume (the unit is decibel dB). The distance ratio d/d0 may reflect a variation of the distance between the two point sources. In some embodiments, the reference distance d0 may be selected within a specific range. For example, d0 may be a specific value in the range of 2.5 mm~10 mm, e.g., d0 may be 5 mm. In some embodiments, the reference distance d0 may be determined based on a listening position. For example, the distance between the listening position to the nearest point source may be taken as the reference distance d0. It should be known that the reference distance d0 may be flexibly selected from any other suitable values according to the actual conditions, which is not limited here. Merely by way of example, in FIG. 3A, d0 may be equal to 5 mm.

When the sound frequency is a constant, the volume of the sound heard by the user and volume of the leaked sound of the two point sources may increase as the distance between the two point sources increases. When the distance ratio d/d0 of is less than a threshold ratio, an increase (or increment) in the volume of the sound heard by the user may be larger than an increase (or increment) in the volume of the leaked sound as the distance between two point sources increases. That is to say, the increase in volume of the sound heard by the user may be more significant than the increase in volume of the leaked sound. For example, as shown in FIG. 3A, when the distance ratio d/d0 is 2, the difference between the volume of the sound heard by the user and the volume of the leaked sound may be about 20 dB. When the distance ratio d/d0 is 4, the difference between the volume of the sound heard by the user and the volume of the leaked sound may be about 25 dB. In some embodiments, when the distance ratio d/d0 reaches the threshold ratio, the ratio of the volume of the sound heard by the user to the volume of the leaked sound of the two point sources may reach a maximum value. At this time, as the distance of the two point sources further increases, the curve of the volume of the sound heard by the user and the curve of the volume of the leaked sound may gradually go parallel, that is, the increase in volume of the sound heard by the user and the increase in volume of the leaked sound may remain substantially the same. For example, as shown in FIG. 3B, when the distance ratio d/d0 is 5, 6, or 7, the difference between the volume of the sound heard by the user and the volume of the leaked sound may remain substantially the same, both of which may be about 25 dB. That is, the increase in volume of the sound heard by the user may be the same as the increase in volume of the leaked sound. In some embodiments, the threshold ratio of the distance ratio d/d0 of the two point sources may be in the range of 0~7. For example, the threshold ratio of d/d0 may be set in the range of 0.5~4.5. As another example, the threshold ratio of d/d0 may be set in the range of 1~4.

In some embodiments, the threshold ratio value may be determined based on the variation of the difference between the volume of the sound heard by the user and the volume of the leaked sound of the two point sources of FIG. 3A. For example, the ratio corresponding to the maximum difference between the volume of the sound heard by the user and the volume of the leaked sound may be determined as the threshold ratio. As shown in FIG. 3B, when the distance ratio d/d0 is less than the threshold ratio (e.g., 4), a curve of a normalized sound heard by the user may show an upward trend (the slope of the curve is larger than 0) as the distance between the two point sources increases. That is, the increase in sound heard by the user volume may be greater than the increase in volume of the leaked sound. When the distance ratio d/d0 is greater than the threshold ratio, the slope of the curve of the normalized sound heard by the user may gradually approach 0 as the distance between the two point sources increases. That is to say, the increase in volume of the sound heard by the user may be no longer greater than the increase in volume of the leaked sound as the distance between the two point sources increases.

According to the descriptions above, if the listening position is fixed, the parameters of the two point sources may be adjusted by certain means. It may be possible to achieve an effect that the volume of the near-field sound has a significant increase while the volume of the far-field leakage only increases slightly (i.e., the increase in the volume of the near-field sound is greater than the volume of the far-field leakage). For example, two or more sets of two point sources (such as a set of high-frequency two point sources and a set of low-frequency two point sources) may be used. For each set, the distance between the point sources in the set is adjusted by a certain means, so that the distance between the high-frequency two point sources may be less than the distance between the low-frequency two point sources. The low-frequency two point sources may have a small sound leakage (the capability to reduce the sound leakage is strong), and the high-frequency two point sources have a large sound leakage (the capability to reduce the sound leakage is weak). The volume of the sound heard by the user may be significantly larger than the volume of the leaked sound if a smaller distance between the two point sources is set in the high-frequency band, thereby reducing the sound leakage.

In some embodiments, each acoustic driver may have a corresponding pair of sound guiding holes. The distance between the sound guiding holes corresponding to each acoustic driver may affect the volume of the near-field sound transmitted to the user's ears and the volume of the far-field leakage transmitted to the environment. In some embodiments, if the distance between the sound guiding holes corresponding to a high-frequency acoustic driver is less than that between the sound guiding holes corresponding to a low-frequency acoustic driver, the volume of the sound heard by the user may be increased and the sound leakage may be reduced, thereby preventing the sound from being heard by others near the user of the acoustic output apparatus. According to the above descriptions, the acoustic output apparatus may be effectively used as an open earphone even in a relatively quiet environment.

Figure 4:
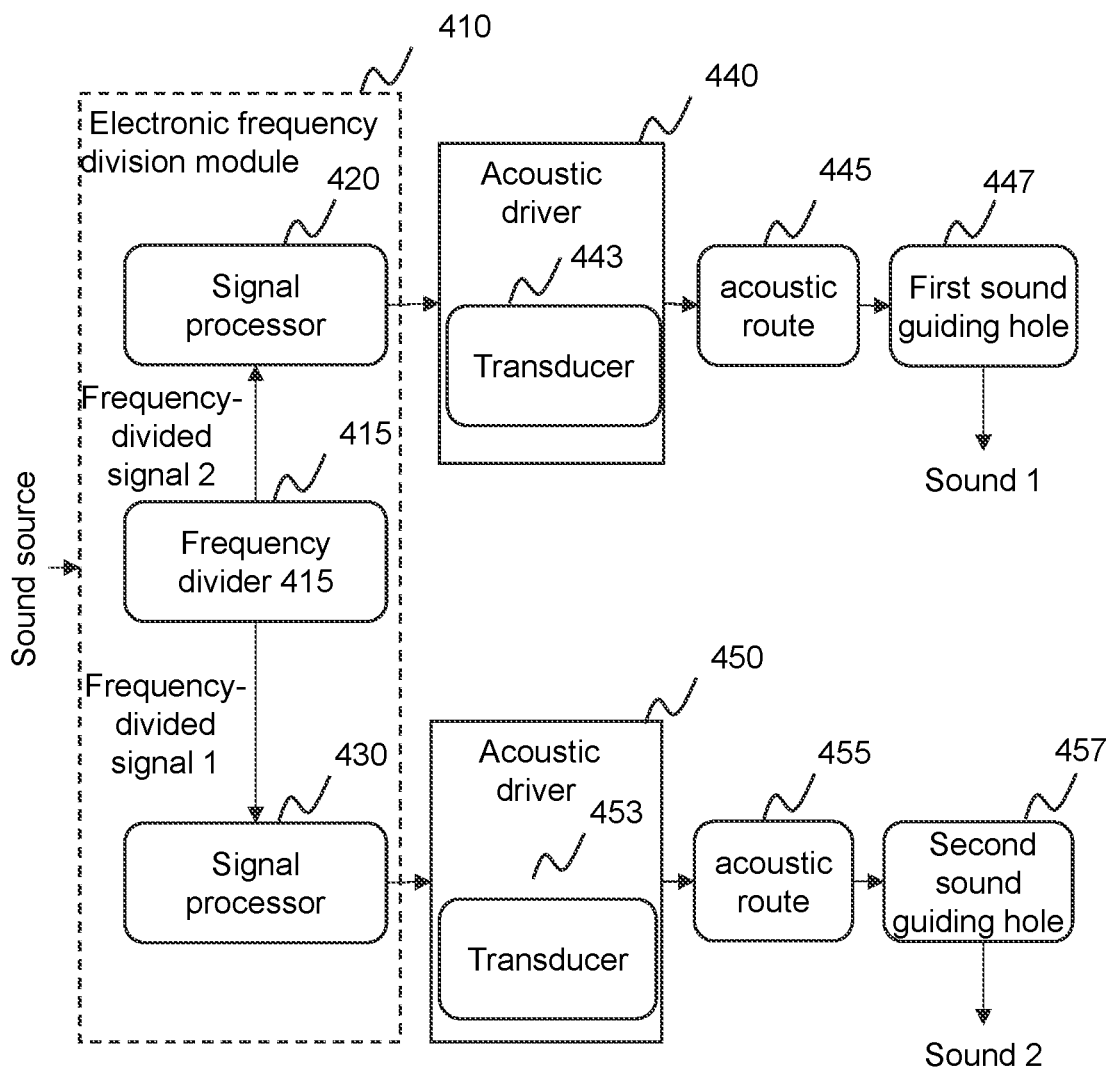
FIG. 4 is a schematic diagram illustrating an exemplary acoustic output apparatus according to some embodiments of the present disclosure.

FIG. 4 is a schematic diagram illustrating an exemplary acoustic output apparatus according to some embodiments of the present disclosure. As shown in FIG. 4, the acoustic output apparatus 400 may include an electronic frequency division module 410, an acoustic driver 440, an acoustic driver 450, an acoustic route 445, an acoustic route 455, at least two first sound guiding holes 447, and at least two second sound guiding holes 457. In some embodiments, the acoustic output apparatus 400 may further include a controller (not shown in the figure). The electronic frequency division module 410 may be part of the controller, and configured to generate electrical signals that are input into different acoustic drivers. The connection between different components in the acoustic output apparatus 400 may be wired and/or wireless. For example, the electronic frequency division module 410 may send signals to the acoustic driver 440 and/or the acoustic driver 450 through a wired transmission or a wireless transmission.

The electronic frequency division module 410 may generate one or more signals of different frequency ranges based on a source signal. The source signal may come from one or more sound source apparatus (for example, a memory storing audio data). The sound source apparatus may be part of the acoustic output apparatus 400 or an independent device. The source signal may be an audio signal that is received by the acoustic output apparatus 8400 via a wired or wireless means. In some embodiments, the electronic frequency division module 410 may decompose the source signal into two or more frequency-divided signals having different frequencies. For example, the electronic frequency division module 410 may decompose the source signal into a first frequency-divided signal (or frequency-divided signal 1) having a high-frequency sound and a second frequency-divided signal (or frequency-divided signal 2) having a low-frequency sound. For convenience, a frequency-divided signal having the high-frequency sound may be referred to as a high-frequency signal, and a frequency-divided signal having the low-frequency sound may be referred to as a low-frequency signal.

For the purposes of description, a low-frequency signal described in the present disclosure may refer to a sound signal with a frequency in a first frequency range (or referred to as a low frequency range). A high-frequency signal may refer to a sound signal with a frequency in a second frequency range (or referred to as a high frequency range). The first frequency range and the second frequency range may or may not include overlapping frequency ranges. The second frequency range may include frequencies higher than the first frequency range. Merely by way of example, the first frequency range may include frequencies below a first threshold frequency. The second frequency range may include frequencies above a second threshold frequency. The first threshold frequency may be lower than the second threshold frequency, or equal to the second threshold frequency, or higher than the second threshold frequency. For example, the first threshold frequency may be lower than the second threshold frequency (for example, the first threshold frequency may be 600 Hz and the second threshold frequency may be 700 Hz), which means that there is no overlap between the first frequency range and the second frequency range. As another example, the first threshold frequency may be equal to the second frequency (for example, both the first threshold frequency and the second threshold frequency may be 650 Hz or any other frequency values). As another example, the first threshold frequency may be higher than the second threshold frequency, which indicates that there is an overlap between the first frequency range and the second frequency range. In such cases, in some embodiments, the difference between the first threshold frequency and the second threshold frequency may not exceed a third threshold frequency. The third threshold frequency may be a fixed value, for example, 20 Hz, 50 Hz, 100 Hz, 150 Hz, or 200 Hz. Optionally, the third threshold frequency may be a value related to the first threshold frequency and/or the second threshold frequency (for example, 5%, 10%, 15%, etc., of the first threshold frequency). Alternatively, the third threshold frequency may be a value flexibly set by the user according to the actual needs, which may be not limited herein. It should be noted that the first threshold frequency and the second threshold frequency may be flexibly set according to different situations, and are not limited herein.

In some embodiments, the electronic frequency division module 410 may include a frequency divider 415, a signal processor 420, and a signal processor 430. The frequency divider 415 may be used to decompose the source signal into two or more frequency-divided signals containing different frequency components. For example, a frequency-divided signal 1 having a high-frequency sound component and a frequency-divided signal 2 having a low-frequency sound component. In some embodiments, the frequency divider 415 may be any electronic device that may implement the signal decomposition function, including but not limited to one of a passive filter, an active filter, an analog filter, a digital filter, or any combination thereof. In some embodiments, the frequency divider 415 may divide the source signal based on one or more frequency division points. A frequency division point may refer to a specific frequency distinguishing the first frequency range and the second frequency range. For example, when there is an overlapping frequency range between the first frequency range and the second frequency range, the frequency division point may be a feature point within the overlapping frequency range (for example, a low-frequency boundary point, a high-frequency boundary point, a center frequency point, etc., of the overlapping frequency range). In some embodiments, the frequency division point may be determined according to a relationship between the frequency and the sound leakage of the acoustic output apparatus (for example, the curves shown in FIGS. 2, 3A and 3B). For example, considering that the sound leakage of the acoustic output apparatus changes with the frequency, a frequency point corresponding to the volume of the leaked sound satisfying a certain condition may be selected as the frequency division point. For example, 1000 Hz shown in FIG. 6. In some alternative embodiments, the user may specify a specific frequency as the frequency division point directly. For example, considering that the frequency range of sounds that the human ear may hear is 20 Hz-20 kHz, the user may select a frequency point in this range as the frequency division point. For example, the frequency division point may be 600 Hz, 800 Hz, 1000 Hz, 1200 Hz, or the like. In some embodiments, the frequency division point may be determined based on the performance of the acoustic drivers 440 and 450. The frequency division point may be determined based on the performance of the acoustic driver. For example, considering that a low-frequency acoustic driver and a high-frequency acoustic driver have different frequency response curves, the frequency division point may be selected within a frequency range. The frequency range may be above ½ of the upper limiting frequency of the low-frequency acoustic driver and below 2 times of the lower limiting frequency of the high-frequency acoustic driver. In some embodiments, the frequency division point may be selected in a frequency range above ⅓ of the upper limiting frequency of the low-frequency acoustic driver and below 1.5 times of the lower limiting frequency of the high-frequency acoustic driver. In some embodiments, in the overlapping frequency range, the positional relationship between point sources may also affect the volume of the sound produced by the acoustic output apparatus in the near-field and the far-field. More details may be found in International application No. PCT/CN2019/130886, filed on Dec. 31, 2019, the entire contents of which are hereby incorporated by reference.

The signal processor 420 and the signal processor 430 may further process a frequency-divided signal to meet the requirements of sound output. In some embodiments, the signal processor 420 and/or the signal processor 430 may include one or more signal processing components. For example, the signal processing components(s) may include, but not limited to, an amplifier, an amplitude modulator, a phase modulator, a delayer, a dynamic gain controller, or the like, or any combination thereof. Merely by way of example, the processing of a sound signal by the signal processor 420 and/or the signal processor 430 may include adjusting the amplitude of a portion of the sound signal that has a specific frequency. In some embodiments, if the first frequency range and the second frequency range overlap, the signal processors 420 and 430 may adjust the intensity of a portion of a sound signal that has the frequency in the overlapping frequency range (for example, reduce the amplitude of the portion that has the frequency in the overlapping frequency range). This may avoid that in a final sound outputted by the acoustic output apparatus, the portion that corresponds to the overlapping frequency range may have an excessive volume caused by the superposition of multiple sound signals.

After being processed by the signal processors 420 or 430, the frequency-divided signals 1 and 2 may be transmitted to the acoustic drivers 440 and 450, respectively. In some embodiments, the processed frequency-divided signal transmitted into the acoustic driver 440 may be a sound signal having a lower frequency range (e.g., the first frequency range). Therefore, the acoustic driver 440 may also be referred to as a low-frequency acoustic driver. The processed frequency-divided signal transmitted into the acoustic driver 450 may be a sound signal having a higher frequency range (e.g., the second frequency range). Therefore, the acoustic driver 450 may also be referred to as a high-frequency acoustic driver. The acoustic driver 440 and the acoustic driver 450 may convert sound signals into a low-frequency sound and a high-frequency sound, respectively, then propagate the converted signals outwards.

In some embodiments, the acoustic driver 440 may be acoustically coupled to at least two first sound guiding holes. For example, the acoustic driver 440 may be acoustically coupled to the two first sound guiding holes 447 via two acoustic routes 445. The acoustic driver 440 may propagate sound through the at least two first sound guiding holes 447. The acoustic driver 450 may be acoustically coupled to at least two second sound guiding holes. For example, the acoustic driver 450 may be acoustically coupled to the two second sound guiding holes 457 via two acoustic routes 455. The acoustic driver 450 may propagate sound through the at least two second sound guiding holes 457. A sound guiding hole may be a small hole formed on the acoustic output apparatus with a specific opening and allowing sound to pass. The shape of a sound guiding hole may include but not limited to a circle shape, an oval shape, a square shape, a trapezoid shape, a rounded quadrangle shape, a triangle shape, an irregular shape, or the like, or any combination thereof. In addition, the number of the sound guiding holes connected to the acoustic driver 440 or 450 may not be limited to two, which may be an arbitrary value instead, for example, three, four, six, or the like.

In some embodiments, in order to reduce the far-field leakage of the acoustic output apparatus 400, the acoustic driver 440 may be used to output low-frequency sounds with the same (or approximately the same) amplitude and opposite (or approximately opposite) phases via the at least two first sound guiding holes. The acoustic driver 450 may be used to output high-frequency sounds with the same (or approximately the same) amplitude and opposite (or approximately opposite) phases via the at least two second sound guiding holes. In this way, the far-field leakage of low-frequency sounds (or high-frequency sounds) may be reduced according to the principle of acoustic destructive interference.

According to the FIG. 2, FIG. 3A and FIG. 3B, considering that the wavelength of a low-frequency sound is longer than that of a high-frequency sound, and in order to reduce the destructive interference of the sound in the near-field (for example, near the user's ear), the distance between the first sound guiding holes and the distance between the second sound guiding holes may have different values. For example, assuming that there is a first distance between the two first sound guiding holes and a second distance between the two second sound guiding holes, the first distance may be longer than the second distance. In some embodiments, the first distance and the second distance may be arbitrary values. Merely by way of example, the first distance may be longer than 40 mm. For example, in the range of 20 mm-40 mm. The second distance may not be longer than 12 mm, and the first distance may be longer than the second distance. In some embodiments, the first distance may not be shorter than 12 mm. The second distance may be shorter than 7 mm, for example, in the range of 3 mm-7 mm. In some embodiments, the first distance may be 30 mm, and the second distance may be 5 mm. As another example, the first distance may be at least twice longer than the second distance. In some embodiments, the first distance may be at least three times longer than the second distance. In some embodiments, the first distance may be at least 5 times longer than the second distance.

As shown in FIG. 4, the acoustic driver 440 may include a transducer 443. The transducer 443 may transmit a sound to the first sound guiding hole(s) 447 through the acoustic route 445. The acoustic driver 450 may include a transducer 453. The transducer 453 may transmit a sound to the second sound guiding hole(s) 457 through the acoustic route 855. In some embodiments, the transducer may include, but not limited to, a transducer of a gas-conducting acoustic output apparatus, a transducer of a bone-conducting acoustic output apparatus, a hydroacoustic transducer, an ultrasonic transducer, or the like, or any combination thereof. In some embodiments, the transducer may be of a moving coil type, a moving iron type, a piezoelectric type, an electrostatic type, or a magnetostrictive type, or the like, or any combination thereof.

In some embodiments, the acoustic drivers (such as the low-frequency acoustic driver 440, the high-frequency acoustic driver 450) may include transducers with different properties or different counts of transducers. For example, each of the low-frequency acoustic driver 440 and the high-frequency acoustic driver 450 may include a transducer, and the transducers of the frequency acoustic driver 840 and the high-frequency acoustic driver 850 may have different frequency response characteristics (such as a low-frequency speaker unit and a high-frequency speaker unit). As another example, the low-frequency acoustic driver 440 may include two transducers 443 (such as two of the low-frequency speaker units), and the high-frequency acoustic driver 450 may include two transducers 453 (such as two of the high-frequency speaker units).

In some embodiments, the acoustic output apparatus 400 may generate sounds with different frequency ranges by other means, for example, a transducer frequency division, an acoustic route frequency division, or the like. When the acoustic output apparatus 400 uses a transducer or an acoustic route to divide a sound, the electronic frequency division module 410 (e.g., the part inside the dotted frame in FIG. 4) may be omitted. The source signal may be input to the acoustic driver 440 and the acoustic driver 450, respectively.

In some embodiments, the acoustic output apparatus 400 may use a plurality of transducers to achieve signal frequency division. For example, the acoustic driver 440 and the acoustic driver 450 may convert the inputted source signal into a low-frequency signal and a high-frequency signal, respectively. Specifically, through the transducer 443 (such as a low-frequency speaker), the low-frequency acoustic driver 440 may convert the source signal into the low-frequency sound having a low-frequency component. The low-frequency sound may be transmitted to at least two first sound guiding holes 447 along at least two different acoustic routes 445. Then the low-frequency sound may be propagated outwards through the first sound guiding holes 447. Through the transducer 453 (such as a high-frequency speaker), the high-frequency acoustic driver 450 may convert the source signal into the high-frequency sound having a high-frequency component. The high-frequency sound may be transmitted to at least two second sound guiding holes 457 along at least two different acoustic routes 455. Then the high-frequency sound may be propagated outwards through the second sound guiding holes 457.

In some alternative embodiments, an acoustic route (e.g., the acoustic routes 445 and the acoustic routes 455) connecting a transducer and a sound guiding hole may affect the nature of the transmitted sound. For example, an acoustic route may attenuate or change the phase of the transmitted sound to some extent. In some embodiments, the acoustic route may include a sound tube, a sound cavity, a resonance cavity, a sound hole, a sound slit, a tuning net, or the like, or any combination thereof. In some embodiments, the acoustic route may include an acoustic impedance material, which may have a specific acoustic impedance. For example, the acoustic impedance may be in the range of 5 MKS Rayleigh to 500 MKS Rayleigh. Exemplary acoustic impedance materials may include but not limited to plastic, textile, metal, permeable material, woven material, screen material or mesh material, porous material, particulate material, polymer material, or the like, or any combination thereof. By setting acoustic routes of different acoustic impedances, the sounds output of different transducers may be acoustically filtered. In this case, the sounds output through different acoustic routes have different frequency components.

In some embodiments, the acoustic output apparatus 400 may utilize a plurality of acoustic routes to achieve signal frequency division. Specifically, the source signal may be inputted into a specific acoustic driver and converted into a sound including high and low-frequency components. The sound may be propagated along an acoustic route having a specific frequency selection characteristic. For example, the sound may be propagated along an acoustic route with a low-pass characteristic to a corresponding sound guiding hole to output a low-frequency sound. In this process, the high-frequency component of the sound may be absorbed or attenuated by the acoustic route with a low-pass characteristic. Similarly, the sound signal may be propagated along an acoustic route with a high-pass characteristic to the corresponding sound guiding hole to output a high-frequency sound. In this process, the low-frequency component of the sound may be absorbed or attenuated by the acoustic route with the high-pass characteristic.

In some embodiments, the controller in the acoustic output apparatus 400 may cause the low-frequency acoustic driver 440 to output a sound in the first frequency range (i.e., a low-frequency sound), and cause the high-frequency acoustic driver 450 to output a sound in the second frequency range (i.e., a high-frequency sound). In some embodiments, the acoustic output apparatus 400 may also include a supporting structure. The supporting structure may be used to carry an acoustic driver (such as the high-frequency acoustic driver 450, the low-frequency acoustic driver 440), so that the acoustic driver may be positioned away from the user's ear. In some embodiments, the sound guiding hole(s) acoustically coupled with the high-frequency acoustic driver 450 may be located closer to an expected position of the user's ears (for example, the ear canal entrance), while the sound guiding hole(s) acoustically coupled with the low-frequency acoustic driver 440 may be located further away from the expected position. In some embodiments, the supporting structure may be used to package the acoustic driver. For example, the supporting structure may include a housing made of various materials such as plastic, metal, and tape. The housing may encapsulate the acoustic driver and form a front chamber and a rear chamber corresponding to the acoustic driver. The front chamber may be acoustically coupled to one of the at least two sound guiding holes corresponding to the acoustic driver. The rear chamber may be acoustically coupled to the other of the at least two sound guiding holes corresponding to the acoustic driver. For example, the front chamber of the low-frequency acoustic driver 440 may be acoustically coupled to one of the at least two first sound guiding holes 447. The rear chamber of the low-frequency acoustic driver 440 may be acoustically coupled to the other of the at least two first sound guiding holes 447. The front chamber of the high-frequency acoustic driver 450 may be acoustically coupled to one of the at least two second sound guiding holes 457. The rear chamber of the high-frequency acoustic driver 450 may be acoustically coupled to the other of the at least two second sound guiding holes 457. In some embodiments, a sound guiding hole (such as the first sound guiding hole(s) 447 and the second sound guiding hole(s) 457) may be disposed on the housing.

The above description of the acoustic output apparatus 400 may be merely provided by way of example. Those skilled in the art may make adjustments and changes to the structure, quantity, etc., of the acoustic driver, which is not limiting in the present disclosure. In some embodiments, the acoustic output apparatus 400 may include any number of the acoustic drivers. For example, the acoustic output apparatus 400 may include two groups of the high-frequency acoustic drivers 450 and two groups of the low-frequency acoustic drivers 440, or one group of the high-frequency acoustic drives 450 and two groups of the low-frequency acoustic drivers 440, and these high-frequency/low-frequency drivers may be used to generate a sound in a specific frequency range, respectively. As another example, the acoustic driver 440 and/or the acoustic driver 450 may include an additional signal processor. The signal processor may have the same structural component as or different structural components from the signal processor 420 or 430.

It should be noted that the acoustic output apparatus and its modules shown in FIG. 4 may be implemented in various ways. For example, in some embodiments, the system and the modules may be implemented by hardware, software, or a combination of both. The hardware may be implemented by a dedicated logic. The software may be stored in a storage that may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD or a DVD-ROM, a programmable memory device, such as read-only memory (e.g., firmware), or a data carrier such as an optical or electric signal carrier. The system and the modules in the present disclosure may be implemented not only by a hardware circuit in a programmable hardware device in an ultra large scale integrated circuit, a gate array chip, a semiconductor such a logic chip or a transistor, a field-programmable gate array, or a programmable logic device. The system and the modules in the present disclosure may also be implemented by software to be performed by various processors, and further also by a combination of hardware and software (e.g., firmware).

It should be noted that the above description of the acoustic output apparatus 400 and its components is only for the convenience of description, and not intended to limit the scope of the present disclosure. It may be understood that, for those skilled in the art, after understanding the principle of the apparatus, it is possible to combine each unit or form a substructure to connect with other units arbitrarily without departing from this principle. For example, the electronic frequency division module 410 may be omitted, and the frequency division of the source signal may be implemented by the internal structure of the low-frequency acoustic driver 440 and/or the high-frequency acoustic driver 450. As another example, the signal processor 420 or 430 may be a part independent of the electronic frequency division module 410. Those modifications may fall within the scope of the present disclosure.

Figure 5A:
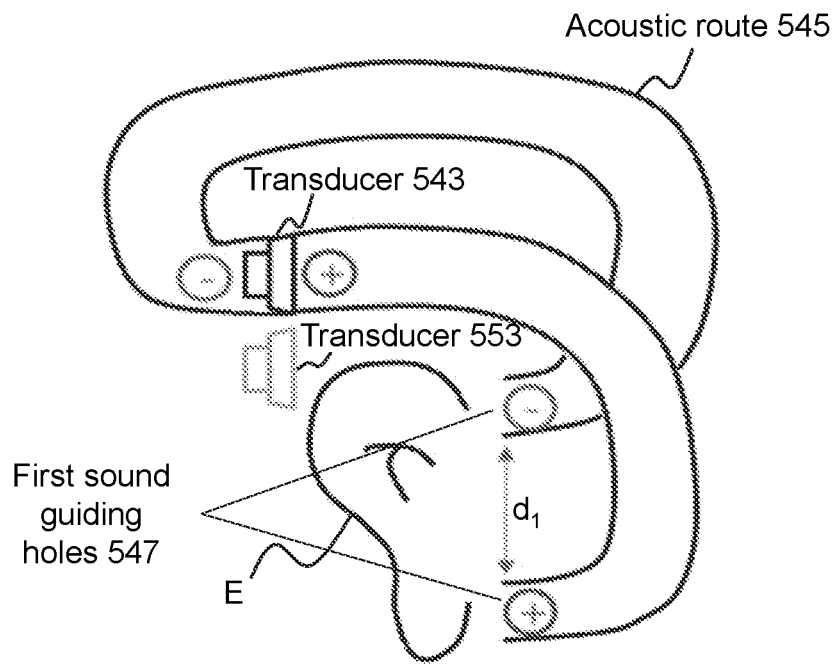
FIGS. 5A-5B are schematic diagrams illustrating exemplary application scenarios of an acoustic driver according to some embodiments of the present disclosure.
Figure 5B:
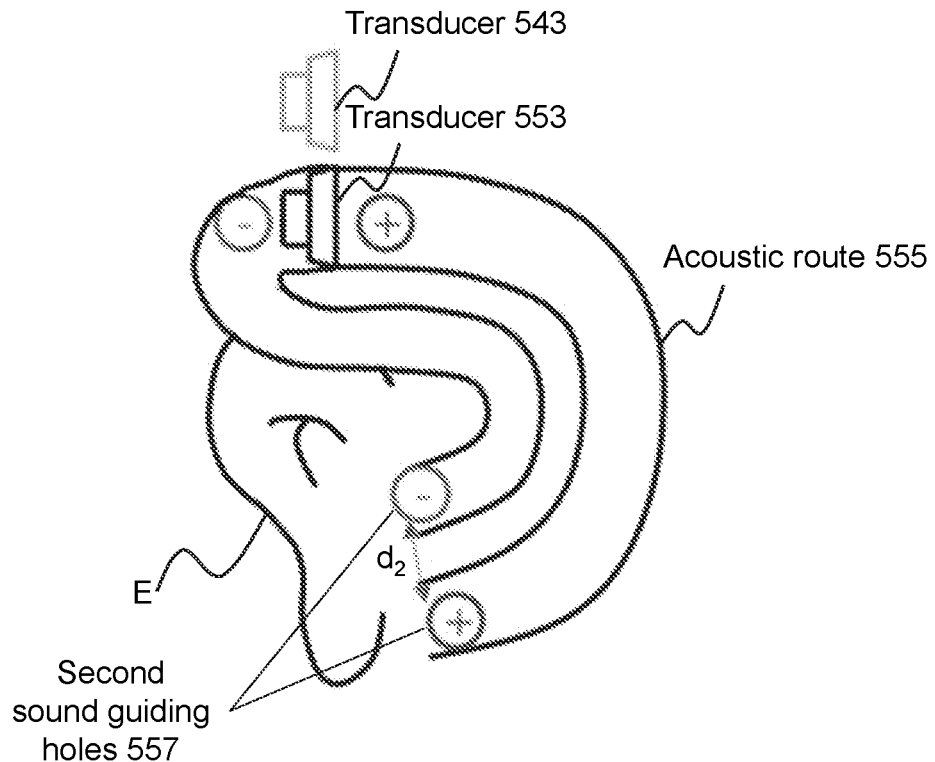

FIGS. 5A and 5B are schematic diagrams illustrating exemplary acoustic output apparatuses according to some embodiments of the present disclosure. For the purpose of illustration, sounds outputted by different sound guiding holes coupled with the same transducer may be described as an example. In FIGS. 5A and 5B, each transducer may have a front side and a rear side, and corresponding front chamber (i.e., the first acoustic route) and rear chamber (i.e., the second acoustic route) may exist on the front and rear side of the transducer, respectively. In some embodiments, these structures may have the same or approximately the same equivalent acoustic impedance, such that the transducer may be loaded symmetrically. The symmetrical load of the transducer may form sound sources satisfy an amplitude and phase relationship at different sound guiding holes (such as the "two-point sound source" having the same amplitude and opposite phases as described above), such that a specific sound field may be formed in the high-frequency range and/or the low-frequency range (for example, the near-field sound may be enhanced and the far-field leakage may be suppressed).

As shown in FIGS. 5A and 5B, an acoustic output apparatus (for example, the acoustic output apparatus 500A or 500B) may include transducers, and acoustic routes and sound guiding holes connected to the transducer. In order to describe the actual application scenarios of an actual application scenario of the acoustic output apparatus more clearly, the position of a user's ear E is shown in FIGS. 5A and 5B for explanation. FIG. 5A illustrates an application scenario of the acoustic output apparatus 500A. The acoustic output apparatus 500A may include a transducer 543 (or referred to as a low-frequency acoustic driver), and the transducer 543 may be coupled with two first sound guiding holes 547 through an acoustic route 545. FIG. 5B illustrates an application scenario of the acoustic output apparatus 500B. The acoustic output apparatus 500B may include a transducer 553 (or referred to as a high-frequency acoustic driver), and the transducer 553 may be coupled with two second sound guiding holes 557 through an acoustic route 555.

The transducer 543 or 553 may vibrate under the driving of an electric signal, and the vibration may generate sounds with equal amplitudes and opposite phases (180 degrees inversion). The type of transducer may include, but not limited to, one of an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magnetostrictive type, or the like, or any combination thereof. In some embodiments, the transducer 543 or 553 may include a vibration diaphragm, which may vibrate when driven by an electrical signal, and the front and rear sides of the vibration diaphragm may simultaneously output a normal-phase sound and a reverse-phase sound. In FIGS. 5A and 5B, "+" and "−" may be used to represent sounds with different phases, wherein "+" may represent a normal-phase sound, and "−" may represent a reverse-phase sound.

In some embodiments, a transducer may be enclosed by a housing of a supporting structure, and the interior of the housing may be provided with sound channels connected to the front and rear sides of the transducer, respectively, thereby forming an acoustic route. For example, a front cavity of the transducer 543 may be coupled to one of the two first sound guiding holes 547 through a first acoustic route (i.e., a half of the acoustic route 545), and a rear cavity of the transducer 543 may acoustically be coupled to the other sound guiding hole of the two first sound guiding holes 547 through a second acoustic route (i.e., the other half of the acoustic route 545). A normal-phase sound and a reverse-phase sound output from the transducer 543 may be output from the two first sound guiding holes 547, respectively. As another example, a front cavity of the transducer 553 may be coupled to one of the two sound guiding holes 557 through a third acoustic route (i.e., a half of the acoustic route 555), and a rear cavity of the transducer 553 may be coupled to another sound guiding hole of the two second sound guiding holes 557 through a fourth acoustic route (i.e., the other half of the acoustic route 555). A normal-phase sound and a reverse-phase sound output from the transducer 553 may be output from the two second sound guiding holes 557, respectively.

In some embodiments, an acoustic route may affect the nature of the transmitted sound. For example, an acoustic route may attenuate or change the phase of the transmitted sound to some extent. In some embodiments, the acoustic route may include one or more of a sound tube, a sound cavity, a resonance cavity, a sound hole, a sound slit, a tuning net, or the like, or any combination thereof. In some embodiments, the acoustic route may include an acoustic impedance material, which may have a specific acoustic impedance. For example, the acoustic impedance may be in the range of 5 MKS Rayleigh to 500 MKS Rayleigh. In some embodiments, the acoustic impedance material may include but not limited to plastics, textiles, metals, permeable materials, woven materials, screen materials, and mesh materials, or the like, or any combination thereof. In some embodiments, in order to prevent the sound transmitted by the acoustic driver's front chamber and rear chamber from being differently disturbed, the front chamber and rear chamber corresponding to the acoustic driver may have the approximately same equivalent acoustic impedance. Additionally, sound guiding holes with the same acoustic impedance material, the same size and/or shape, etc., may be used.

The distance between the two first sound guiding holes 547 of the low-frequency acoustic driver may be expressed as d1 (i.e., the first distance). The distance between the two second sound guiding holes 557 of the high-frequency acoustic driver may be expressed as d2 (i.e., the second distance). By setting the distances d1 and d2, a higher sound volume output in the low-frequency band and a stronger ability to reduce the sound leakage in the high-frequency band may be achieved. For example, the distance between the two first sound guiding holes 547 is greater than the distance between the two second sound guiding holes 557 (i.e., d1>d2).

In some embodiments, the transducer 543 and the transducer 553 may be housed together in a housing of an acoustic output apparatus, and be placed in isolation in a structure of the housing.

In some embodiments, the acoustic output apparatus may include multiple sets of high-frequency acoustic drivers and low-frequency acoustic drivers. For example, the acoustic output apparatus may include a set of high-frequency acoustic drivers and a set of low-frequency acoustic drivers for simultaneously outputting sound to the left and/or right ears. As another example, the acoustic output apparatus may include two sets of high-frequency acoustic drivers and two sets of low-frequency acoustic drivers, wherein one set of high-frequency acoustic drivers and one set of low-frequency acoustic drivers may be used to output sound to a user's left ear, and the other set of high-frequency acoustic drivers and the other set of ow-frequency acoustic drivers may be used to output sound to a user's right ear.

In some embodiments, the high-frequency acoustic driver and the low-frequency acoustic driver may have different powers. In some embodiments, the low-frequency acoustic driver may have a first power, the high-frequency acoustic driver may have a second power, and the first power may be greater than the second power. In some embodiments, the first power and the second power may be arbitrary values.

Figure 6A:
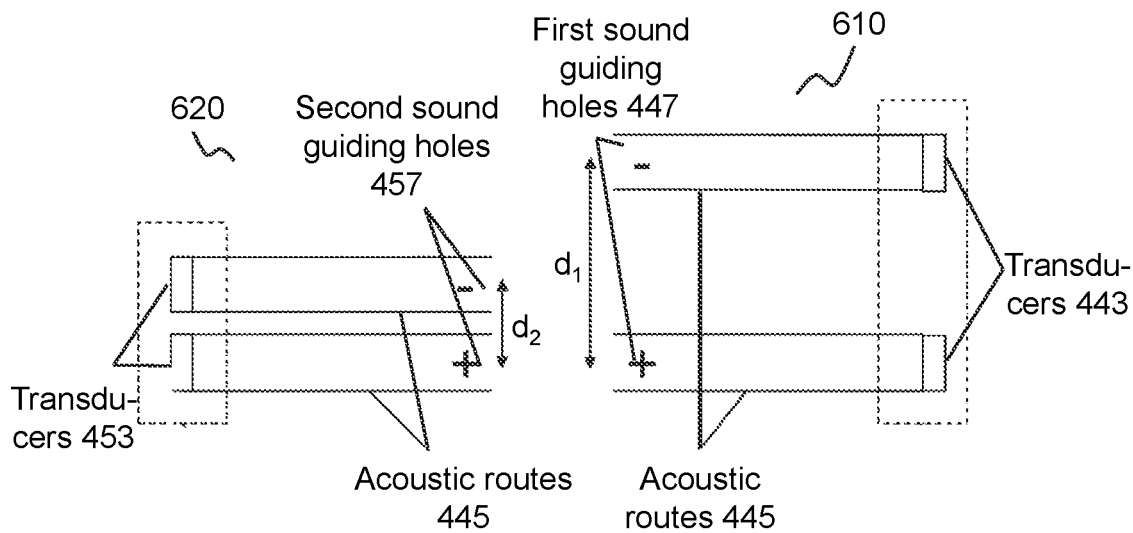
FIGS. 6A-6B are schematic diagrams illustrating exemplary sound outputs according to some embodiments of the present disclosure.
Figure 6B:
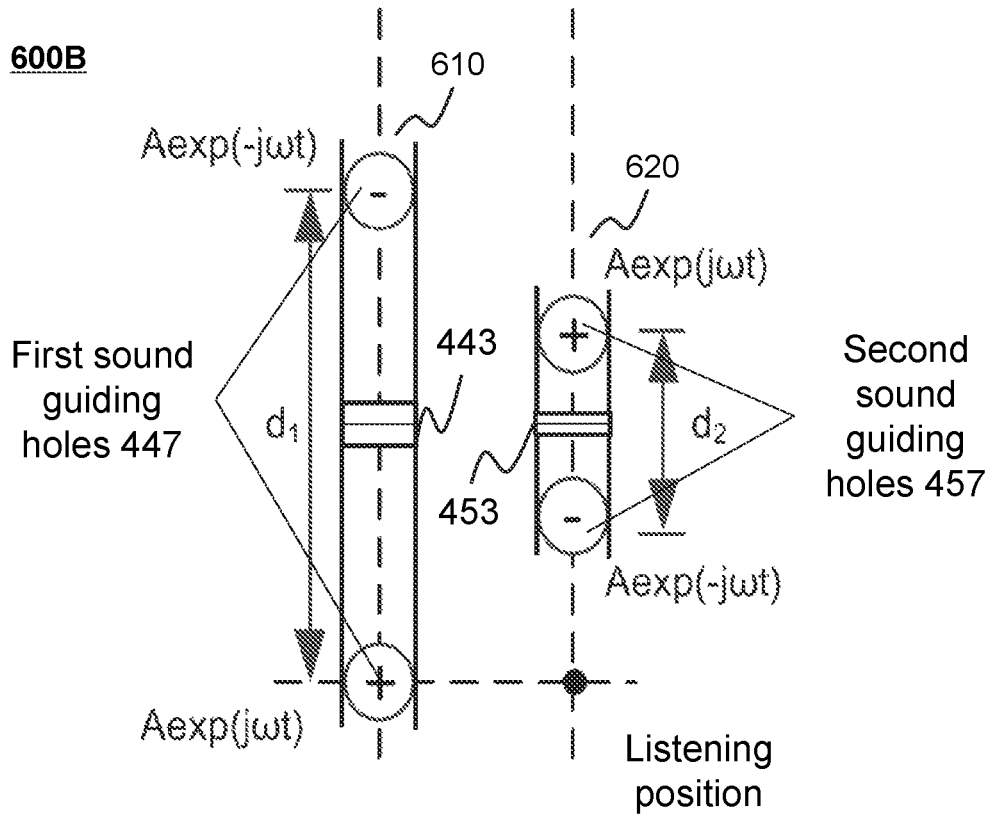

FIGS. 6A and 6B are schematic diagrams illustrating exemplary acoustic output apparatuses 600A and 600B according to some embodiments of the present disclosure.

In some embodiments, the acoustic output apparatus may generate sounds in the same frequency range through two or more transducers, and the sounds may propagate outwards through different sound guiding holes. In some embodiments, different transducers may be controlled by the same controller or different controllers, respectively, and may produce sounds that satisfy a certain phase and amplitude condition (for example, sounds with the same amplitude but opposite phases, sounds with different amplitudes and opposite phases, etc.). For example, a controller may make the electrical signals input into two low-frequency transducers of an acoustic driver have the same amplitude and opposite phases. In this way, the two low-frequency transducers may output low-frequency sounds with the same amplitude but opposite phases.

Specifically, the two transducers in an acoustic driver (such as a low-frequency acoustic driver 610 or a high-frequency acoustic driver 620) may be arranged side by side in an acoustic output apparatus, one of which may be used to output a normal-phase sound, and the other may be used to output a reverse-phase sound. As shown in FIG. 6A, the acoustic driver 610 may include two transducers 443, two acoustic routes 445, and two first sound guiding holes 447. The acoustic driver 620 may include two transducers 453, two acoustic routes 455, and two second sound guiding holes 457. Driven by electrical signals with opposite phases, the two transducers 443 may generate a set of low-frequency sounds with opposite phases (180 degrees inversion). One of the two transducers 443 may (such as the transducer located below) may output a normal-phase sound, and the other (such as the transducer located above) may output a reverse-phase sound. The two low-frequency sounds with opposite phases may be transmitted to the two first sound guiding holes 447 along the two acoustic routes 445, respectively, and propagate outwards through the two first sound guiding holes 447. Similarly, driven by electrical signals with opposite phases, the two transducers 453 may generate a set of high-frequency sounds with opposite phases (180 degrees inversion). One of the two transducers 453 (such as the transducer located below) may output a normal-phase high-frequency sound, and the other (such as the transducer located above) may output a reverse-phase high-frequency sound. The high-frequency sounds with opposite phases may be transmitted to the two second sound guiding holes 457 along the two acoustic routes 455, respectively, and propagate outwards through the two second sound guiding holes 457.

In some embodiments, the two transducers in an acoustic driver (for example, the low-frequency acoustic driver 610 and the high-frequency acoustic driver 620) may be arranged relatively close to each other along the same straight line, and one of them may be used to output a normal-phase sound and the other may be used to output a reverse-phase sound. As shown in FIG. 6B, the left side may be the acoustic driver 610, and the right side may be the acoustic driver 620. The two transducers 443 of the acoustic driver 610 may generate a set of low-frequency sounds of equal amplitude and opposite phases under the control of the controller, respectively. One of the transducers 443 may output a normal-phase low-frequency sound, and transmit the normal low-frequency sound along a first acoustic route to a first sound guiding hole 447. The other transducer 443 may output a reverse-phase low-frequency sound, and transmit the reverse-phase low-frequency sound along a second acoustic route to another first sound guiding hole 447. The two transducers 453 of the acoustic driver 620 may generate high-frequency sound of equal amplitude and opposite phases under the control of the controller, respectively. One of the transducers 453 may output a normal-phase high-frequency sound, and transmit the normal-phase high-frequency sound along a third acoustic route to a second sound guiding hole 457. The other transducer 453 may output a reverse-phase high-frequency sound, and transmit the reverse-phase high-frequency sound along a fourth acoustic route to another second sound guiding hole 457.

In some embodiments, the transducer 443 and/or the transducer 453 may be of various suitable types. For example, the transducer 443 and the transducer 453 may be dynamic coil speakers, which may have the characteristics of a high sensitivity in low-frequency, a deep low frequency depth, and a small distortion. As another example, the transducer 443 and the transducer 453 may be moving iron speakers, which may have the characteristics of a small size, a high sensitivity, and a large high-frequency range. As another example, the transducers 443 and 453 may be air-conducted speakers, or bone-conducted speakers. As another example, the transducer 443 and the transducer 453 may be balanced armature speakers. In some embodiments, the transducer 443 and the transducer 453 may be of different types. For example, the transducer 443 may be a moving iron speaker, and the transducer 453 may be a moving coil speaker. As another example, the transducer 443 may be a dynamic coil speaker, and the transducer 453 may be a moving iron speaker.

In FIGS. 6A-6B, the distance between the two-point sound sources of the acoustic driver 610 may be d1, the distance between the two-point sound sources of the acoustic driver 620 may be d2, and d1 may be greater than d2. As shown in FIG. 6B, the listening position (that is, the position of the ear canal when the user wears an acoustic output apparatus) may be approximately located on a line of a set of two-point sound sources. In some embodiments, the listening position may be located at any suitable position. For example, the listening position may be located on a circle centered on the center point of the two-point sound source. For another example, the listening position may be on the same side of two sets two-point sound sources connection, or in the middle of the two sets two-point sound sources connection.

It may be understood that the simplified structure of the acoustic output apparatus shown in FIGS. 6A-6B may be merely by way of example, which may be not a limitation for the present disclosure. In some embodiments, the acoustic output apparatus may include a supporting structure, a controller, a signal processor, or the like, or any combination thereof.

Figure 7A:
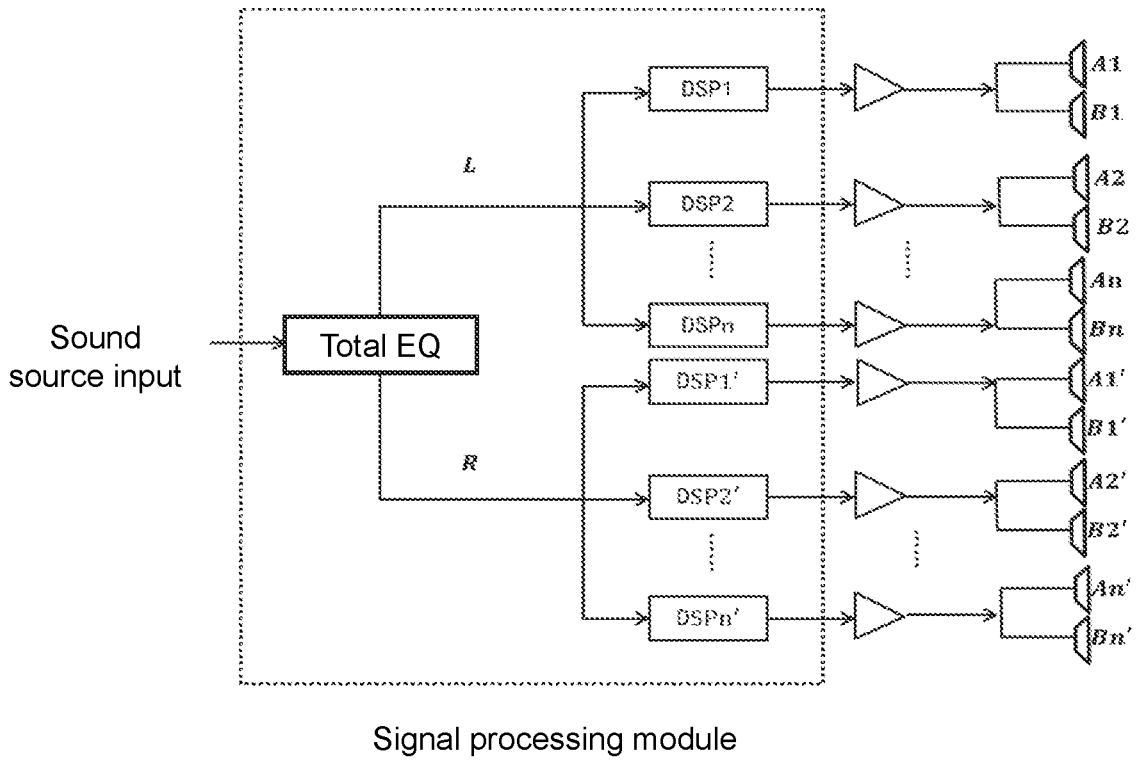
FIGS. 7A-7B are schematic diagrams illustrating acoustic output apparatuses according to some embodiments of the present disclosure.
Figure 7B:
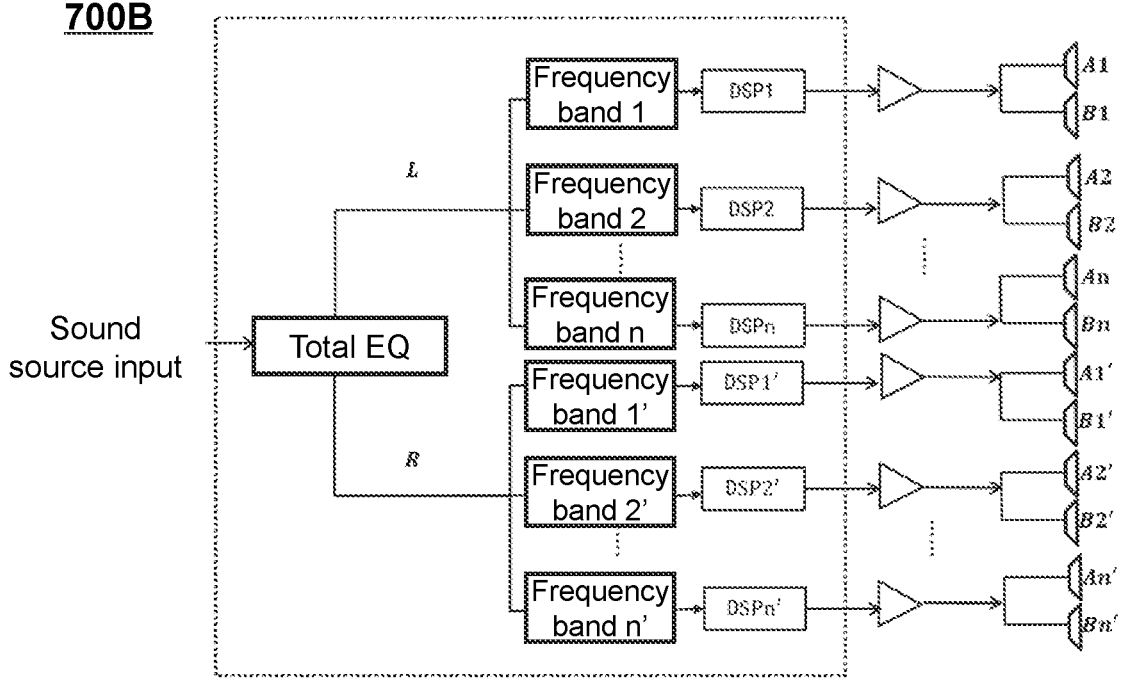

FIGS. 7A-7B are schematic diagrams illustrating exemplary acoustic output apparatuses 700A and 700B according to some embodiments of the present disclosure.

In some embodiments, acoustic drivers (e.g., acoustic drivers 610 or 620) may include multiple narrow-band speakers. As shown in FIG. 7A, the acoustic output apparatus 700A may include a plurality of narrow-band speaker units and a signal processing module. On the left or right side of the user, the acoustic output apparatus 700A may include n groups, narrow-band speaker units, respectively. Each group of narrow-band speaker units may have different frequency response curves, and the frequency response of each group may be complementary and collectively cover the audible sound frequency band. A narrow-band speaker unit used herein may be an acoustic driver with a narrower frequency response range than a low-frequency acoustic driver and/or a high-frequency acoustic driver. Taking the speaker units located on the left side of the user as shown in FIG. 7A as an example: A1~An and B1~Bn form n groups of two-point sound sources. When the same electrical signal is input, each two-point sound source may generate sounds with different frequency ranges. By setting the distance of each two-point sound source, the near-field and far-field sound of each frequency band may be adjusted. For example, in order to enhance the volume of near-field sound and reduce the volume of far-field leakage, the distance between a pair of two point sources corresponding to a high frequency may be less than the distance between a pair of two point sources corresponding to a low frequency.

In some embodiments, the signal processing module may include an Equalizer (EQ) processing module and a Digital Signal Processor (DSP) processing module. The signal processing module may be used to implement signal equalization and other digital signal processing algorithms (such as amplitude modulation and phase modulation). The processed signal may be connected to a corresponding acoustic driver (for example, a narrow-band speaker unit) to output a sound. Preferably, a narrow-band speaker unit may be a dynamic coil speaker or a moving iron speaker. In some embodiments, the narrow-band speaker unit may be a balanced armature speaker. Two-point sound sources may be constructed using two balanced armature speakers, and the sound output from the two speakers may be in opposite phases.

In some embodiments, an acoustic driver (such as acoustic drivers 440, 450, 610 or 620) may include multiple sets of full-band speakers. As shown in FIG. 7B, the acoustic output apparatus 700B may include a plurality of sets of full-band speaker units and a signal processing module. On the left or right side of the user, the acoustic output apparatus may include n groups full-band speaker units, respectively. Each full-band speaker unit may have the same or similar frequency response curve and may cover a wide frequency range.

Taking the speaker units located on the left side of the user as shown in FIG. 7B as an example: A1~An and B1~Bn form n two-point sound sources. The difference between FIGS. 7A and 7B may be that the signal processing module in FIG. 7B may include at least one set of filters for performing frequency division on the sound source signal to generate electric signals corresponding to different frequency ranges, and the electric signals corresponding to different frequency ranges may be input into each group of full-band speaker units. In this way, each group of speaker units (similar to the two-point sound source) may produce sounds with different frequency ranges separately.

Figure 8A:
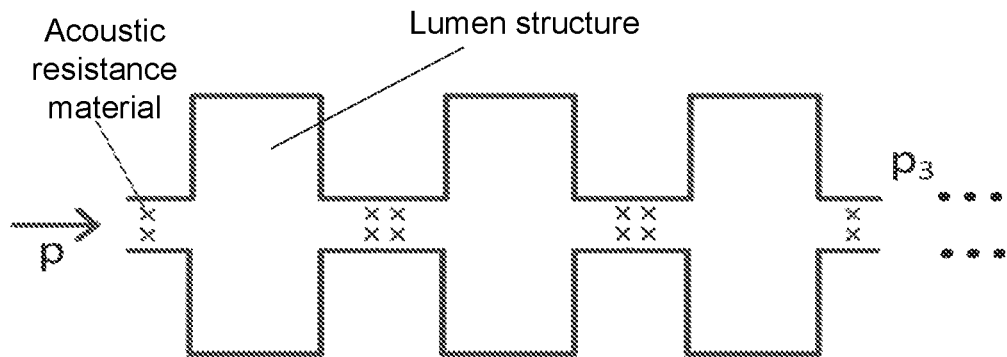
FIGS. 8A-8C are schematic diagrams illustrating acoustic routes according to some embodiments of the present disclosure.
Figure 8B:
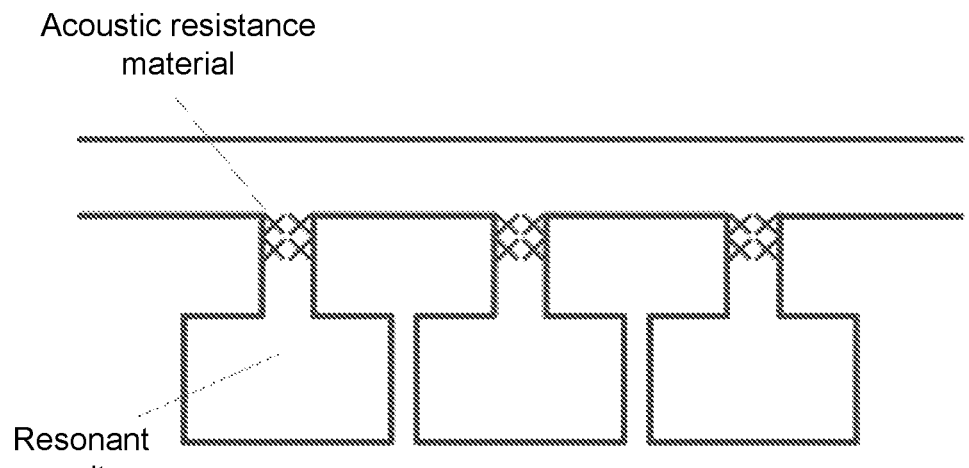
Figure 8C:
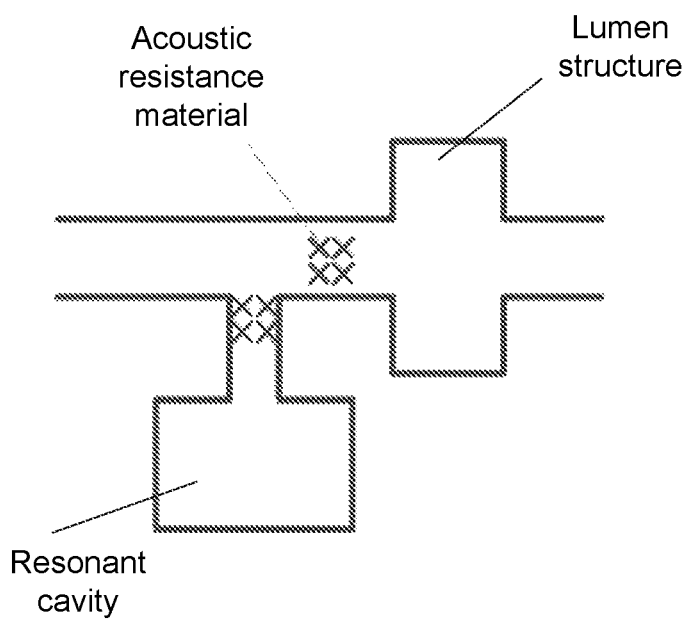

FIGS. 8A-8C are schematic diagrams illustrating an acoustic route according to some embodiments of the present disclosure.

As described above, an acoustic filtering network may be constructed by setting structures such as a sound tube, a sound cavity, and a sound resistance in an acoustic route to achieve frequency division of sound. FIGS. 8A-8C show schematic structural diagrams of frequency division of a sound signal using an acoustic route. It should be noted that FIGS. 8A-8C may be examples of setting the acoustic route when using the acoustic route to perform frequency division on the sound signal and may not be a limitation on the present disclosure.

As shown in FIG. 8A, an acoustic route may be composed of one or more groups of lumen structures connected in series, and an acoustic impedance material may be provided in the lumen structures to adjust the acoustic impedance of the entire structure to achieve a filtering effect. In some embodiments, a band-pass filtering or a low-pass filtering may be performed on the sound by adjusting the size of the lumen structures and/or the acoustic impedance material to achieve frequency division of the sound. As shown in FIG. 8B, a structure with one or more sets of resonant cavities (for example, Helmholtz cavity) may be constructed on a branch of the acoustic route, and the filtering effect may be achieved by adjusting the size of each structure and the acoustic impedance material. As shown in FIG. 8C, a combination of a lumen structure and a resonant cavity (for example, a Helmholtz cavity) structure may be constructed in an acoustic route, and a filtering effect may be achieved by adjusting the size of the lumen structure and/or a resonant cavity, and/or the acoustic impedance material.

Figure 9:
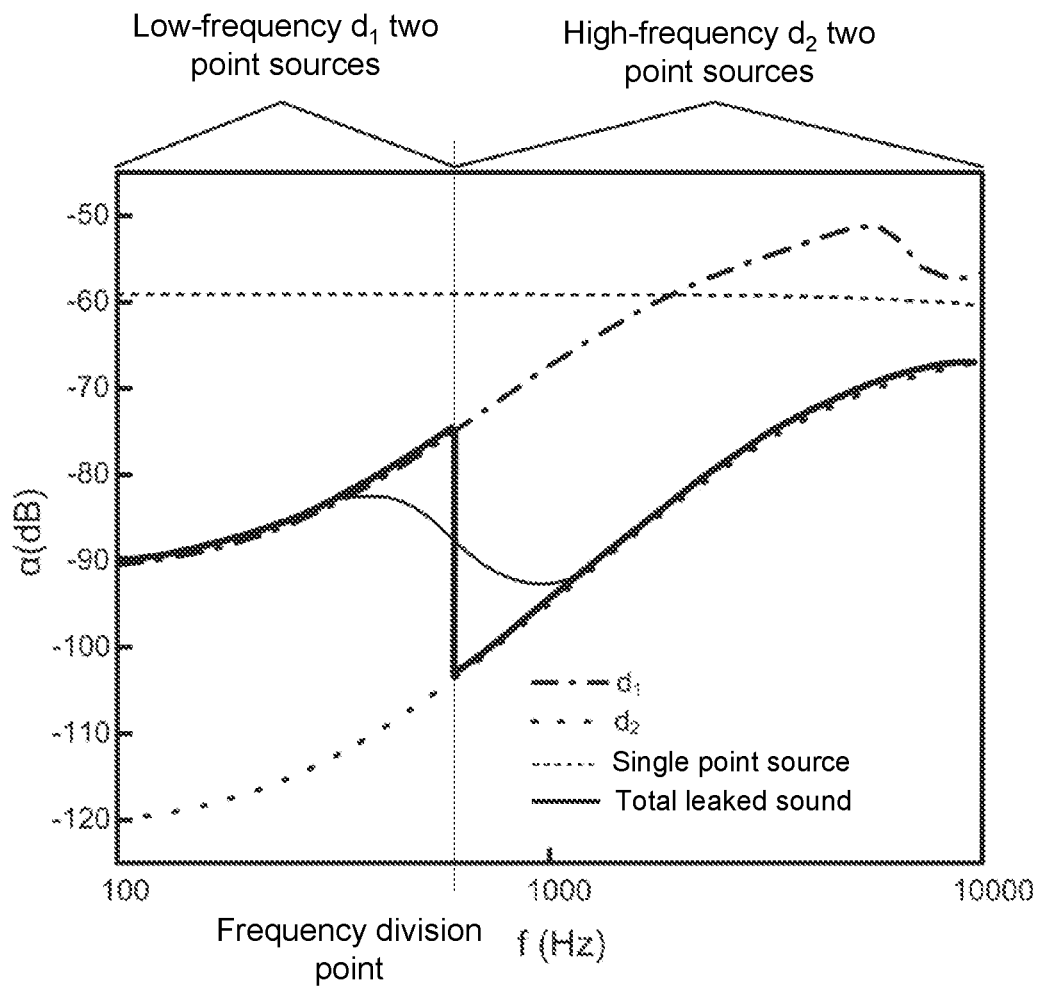
FIG. 9 is an exemplary graph illustrating sound leakage under a combination of two sets of two point sources according to some embodiments of the present disclosure.

FIG. 9 shows a curve of sound leakage of an acoustic output apparatus (for example, the acoustic output apparatus 400) under the action of two sets of two-point sound sources (a set of high-frequency two-point sound sources and a set of low-frequency two-point sound sources). The frequency division points of the two sets of two-point sound sources may be around 700 Hz.

A normalization parameter a may be used to evaluate the volume of the leaked sound (descriptions of a may be found in Equation (4)). As shown in FIG. 9, compared with a single point source, the two sets of two point sources may have a stronger ability to reduce sound leakage. In addition, compared with the acoustic output apparatus provided with only one set of two point sources, the two sets of two point sources may output high-frequency sounds and low-frequency sounds, separately. The distance between the low-frequency two point sources may be greater than that of the high-frequency two point sources. In the low-frequency range, by setting a larger distance (d1) between the low frequency two point sources, the increase in the volume of the near-field sound may be greater than the increase in the volume of the far-field leakage, which may achieve a higher volume of the near-field sound output in the low-frequency band. At the same time, in the low-frequency range, because that the sound leakage of the low frequency two point sources is very small, increasing the distance d1 may slightly increase the sound leakage. In the high-frequency range, by setting a small distance (d2) between the high frequency two point sources, the problem that the cutoff frequency of high-frequency sound leakage reduction is too low and the audio band of the sound leakage reduction is too narrow may be overcome. Therefore, by setting the distance d1 and/or the distance d2, the acoustic output apparatus provided in the embodiments of the present disclosure may obtain a stronger sound leakage suppressing capability than an acoustic output apparatus having a single point source or a single set of two point sources.

In some embodiments, affected by factors such as the filter characteristic of a circuit, the frequency characteristic of a transducer, and the frequency characteristic of an acoustic route, the actual low-frequency and high-frequency sounds of the acoustic output apparatus may differ from those shown in FIG. 9. In addition, low-frequency and high-frequency sounds may have a certain overlap (aliasing) in the frequency band near the frequency division point, causing the total sound leakage reduction of the acoustic output apparatus not have a mutation at the frequency division point as shown in FIG. 9. Instead, there may be a gradient and/or a transition in the frequency band near the frequency division point, as shown by a thin solid line in FIG. 9. It may be understood that these differences may not affect the overall leakage reduction effect of the acoustic output apparatus provided by the embodiments of the present disclosure.

According to FIGS. 4 to 9 and the related descriptions, the acoustic output apparatus provided by the present disclosure may be used to output sounds in different frequency bands by setting high-frequency two point sources and low-frequency two point sources, thereby achieving a better acoustic output effect. In addition, by setting different sets of two point sources with different distances, the acoustic output apparatus may have a stronger capability to reduce the sound leakage in a high frequency band, and meet the requirements of an open acoustic output apparatus.

In some alternative embodiments, an acoustic output apparatus may include at least one acoustic driver, and the sound generated by the at least one acoustic driver may propagate outwards through at least two sound guiding holes coupled with the at least one acoustic driver. In some embodiments, the acoustic output apparatus may be provided with a baffle structure, so that the at least two sound guiding holes may be distributed on two sides of the baffle. In some embodiments, the at least two sound guiding holes may be distributed on both sides of the user's auricle. At this time, the auricle may serve as a baffle that separates the at least two sound guiding holes, so that the at least two sound guiding holes may have different acoustic routes to the user's ear canal. More descriptions of two point sources and a baffle may be found in International applications No. PCT/CN2019/130921 and No. PCT/CN2019/130942, both filed on Dec. 31, 2019, the entire contents of each of which are hereby incorporated by reference in the present disclosure.

Figure 10:
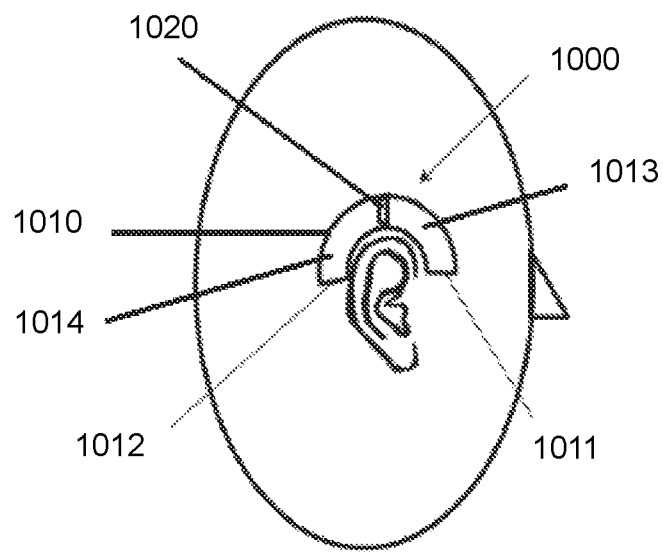
FIG. 10 is a schematic diagram illustrating another exemplary acoustic output apparatus according to some embodiments of the present disclosure.

FIG. 10 is a schematic diagram illustrating another exemplary acoustic output apparatus according to some embodiments of the present disclosure. As shown in FIG. 10, the acoustic output apparatus 1000 may include a supporting structure 1010 and an acoustic driver 1020 mounted within the supporting structure. In some embodiments, an acoustic output apparatus 1000 may be worn on the user's body (for example, the human body's head, neck, or upper torso) through a supporting structure 1010. At the same time, the supporting structure 1010 and the acoustic driver 1020 may approach but not block the ear canal, so that the user's ear may remain open, while the user may hear both the sound output from the acoustic output apparatus 1000 and the external environment. For example, the acoustic output apparatus 1000 may be arranged around or partially around the user's ear, and transmit sounds by means of air conduction or bone conduction.

The supporting structure 1010 may be used to be worn on the user's body and include one or more acoustic drivers 1020. In some embodiments, the supporting structure 1010 may have an enclosed housing structure with a hollow interior, and the one or more acoustic drivers 1020 may be located inside the supporting structure 1010. In some embodiments, the acoustic output apparatus 1000 may be combined with a product, such as glasses, a headset, a display apparatus, an AR/VR helmet, etc. In this case, the supporting structure 1010 may be fixed near the user's ear in a hanging or clamping manner. In some alternative embodiments, a hook may be provided on the supporting structure 1010, and the shape of the hook may match the shape of the user's auricle, so that the acoustic output apparatus 1000 may be independently worn on the user's ear through the hook. The acoustic output apparatus 1000 may communicate with a signal source (for example, a computer, a mobile phone, or other mobile devices) in a wired or wireless manner (for example, Bluetooth). For example, the acoustic output apparatus 1000 at the left and right ears may be directly in communication connection with the signal source in a wireless manner. As another example, the acoustic output apparatus 1000 at the left and right ears may include a first output apparatus and a second output apparatus. The first output apparatus may be in communication connection with the signal source, and the second output apparatus may be wirelessly connected with the first output apparatus. The audio output of the first output apparatus and the second output apparatus may be synchronized through one or more synchronization signals. A wireless connection disclosed herein may include but not limited to Bluetooth, a local area network, a wide area network, a wireless personal area network, a near-field communication, or the like, or any combination thereof.

In some embodiments, the supporting structure 1010 may have a housing structure with a shape suitable for human ears, for example, a circular ring, an oval, a polygonal (regular or irregular), a U-shape, a V-shape, a semi-circle, so that the supporting structure 1010 may be directly hooked at the user's ear. In some embodiments, the supporting structure 1010 may include one or more fixed structures. The fixed structure(s) may include an ear hook, a head strip, or an elastic band, so that the acoustic output apparatus 1000 may be better fixed on the user, preventing the acoustic output apparatus 1000 from falling down. Merely by way of example, the elastic band may be a headband to be worn around the head region. As another example, the elastic band may be a neckband to be worn around the neck/shoulder region. In some embodiments, the elastic band may be a continuous band and be elastically stretched to be worn on the user's head. In the meanwhile, the elastic band may also exert pressure on the user's head so that the acoustic output apparatus 1000 may be fixed to a specific position on the user's head. In some embodiments, the elastic band may be a discontinuous band. For example, the elastic band may include a rigid portion and a flexible portion. The rigid portion may be made of a rigid material (for example, plastic or metal), and the rigid portion may be fixed to the supporting structure 1010 of the acoustic output apparatus 1000 by a physical connection. The flexible portion may be made of an elastic material (for example, cloth, composite, or/and neoprene).

In some embodiments, when the user wears the acoustic output apparatus 1000, the supporting structure 1010 may be located above or below the auricle. The supporting structure 1010 may be provided with a sound guiding hole 1011 and a sound guiding hole 1012 for transmitting sound. In some embodiments, the sound guiding hole 1011 and the sound guiding hole 1012 may be located on both sides of the user's auricle, respectively, and the acoustic driver 1020 may output sounds through the sound guiding hole 1011 and the sound guiding hole 1012.

The acoustic driver 1020 may be a component that may receive an electrical signal, and convert the electrical signal into a sound signal for output. In some embodiments, in terms of frequency, the type of the acoustic driver 1020 may include a low-frequency acoustic driver, a high-frequency acoustic driver, or a full-frequency acoustic driver, or any combination thereof. In some embodiments, the acoustic driver 1020 may include a moving coil, a moving iron, a piezoelectric, an electrostatic, a magnetostrictive driver, or the like, or a combination thereof.

In some embodiments, the acoustic driver 1020 may include a vibration diaphragm. When the vibration diaphragm vibrates, sounds may be transmitted from the front and rear sides of the vibration diaphragm, respectively. In some embodiments, the front side of the vibration diaphragm in the supporting structure 1010 may be provided with a front chamber 1013 for transmitting sound. The front chamber 1013 may be acoustically coupled with the sound guiding hole 1011. The sound on the front side of the vibration diaphragm may be outputted from the sound guiding hole 1011 through the front chamber 1013. The rear side of the vibration diaphragm in the supporting structure 1010 may be provided with a rear chamber 1014 for transmitting sound. The rear chamber 1014 may be acoustically coupled with the sound guiding hole 1012. The sound on the rear side of the vibration diaphragm may be outputted from the sound guiding hole 1012 through the rear chamber 1014. It should be noted that, when the vibration diaphragm is vibrating, the front side and the rear side of the vibration diaphragm may simultaneously generate sounds with opposite phases. After passing through the front chamber 1013 and rear chamber 1014, respectively, the sounds may propagate outward from the sound guiding hole 1011 and the sound guiding hole 1012, respectively. In some embodiments, by adjusting the structure of the front chamber 1013 and the rear chamber 1014, the sounds output by the acoustic driver 1020 at the sound guiding hole 1011 and the sound guiding hole 1012 may meet specific conditions. For example, by designing the lengths of the front chamber 1013 and the rear chamber 1014, the sound guiding hole 1011 and the sound guiding hole 1012 may output sounds with a specific phase relationship (for example, opposite phases). Therefore, the problems including a small volume of the sound heard by the user in the near-field of the acoustic output apparatus 1000 and a large sound leakage in the far-field of the acoustic output apparatus 1000 may be effectively resolved.

In some alternative embodiments, the acoustic driver 1020 may also include a plurality of vibration diaphragms (e.g., two vibration diaphragms). Each of the plurality of vibration diaphragms may vibrate to generate a sound, which may pass through a cavity connected to the vibration diaphragm in the supporting structure, and output from corresponding sound guiding hole(s). The plurality of vibration diaphragms may be controlled by the same controller or different controllers and generate sounds that satisfy certain phase and amplitude conditions (for example, sounds of the same amplitude but opposite phases, sounds of different amplitudes and opposite phases, etc.).

As mentioned above, with a certain sound frequency, as the distance between two point sources increases, the volume of the sound heard by the user and the volume of the leaked sound corresponding to the two point sources may increase. For a clearer description, the relationship between volume of the sound heard by the user, the volume of sound leakage, and the point source distance d may be further explained in connection with FIGS. 11 through 13.

Figure 11:
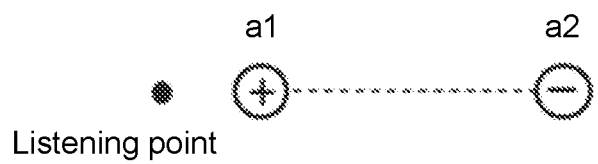
FIG. 11 is a schematic diagram illustrating two point sources and listening positions according to some embodiments of the present disclosure.

FIG. 11 is a schematic diagram illustrating two points of sound sources and a listening position according to some embodiments of the present disclosure. As shown in FIG. 11, a point source a1 and a point source a2 may be on the same side of the listening position. The point source a1 may be closer to the listening position, and the point source a1 and the point source a2 may output sounds with the same amplitude but opposite phases.

Figure 12:
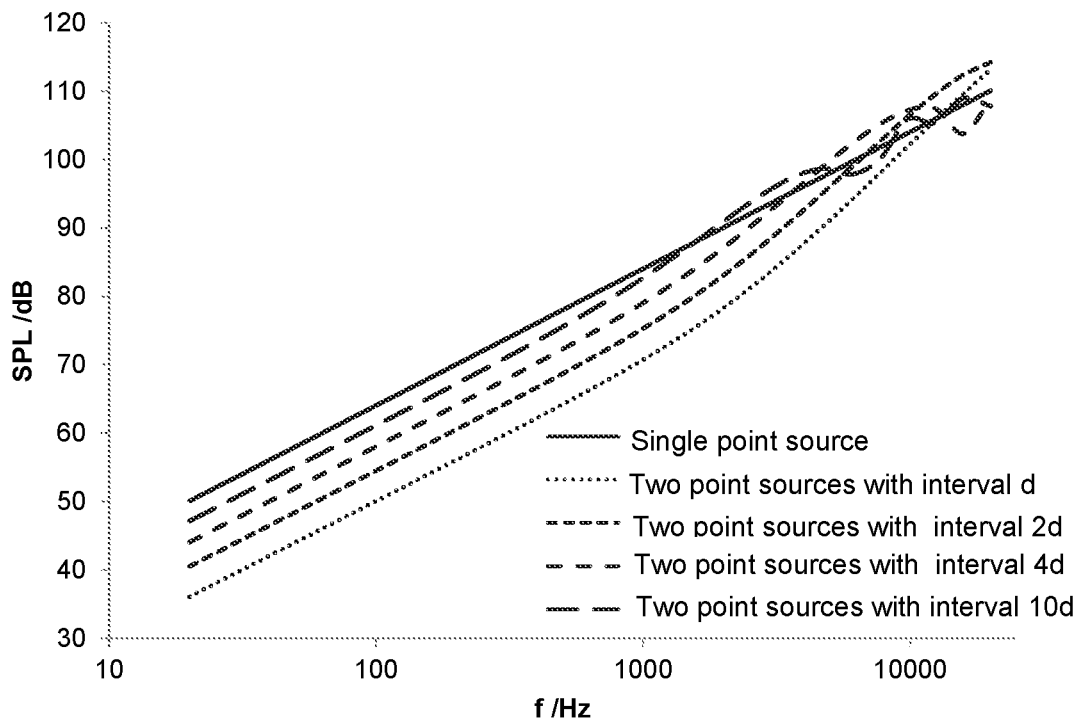
FIG. 12 is a graph illustrating a variation of a volume of the sound heard by the user of two point sources with different distances as a function of frequency according to some embodiments of the present disclosure.

FIG. 12 is a graph illustrating a variation of the volume of the sound heard by the user of two-point sound sources with different distances as a function of a frequency of sound according to some embodiments of the present disclosure. The abscissa may represent the frequency (f) of the sound output by the two-point sound source (denoted as a1 and a2), and the unit may be hertz (Hz). The ordinate may represent the volume of the sound, and the unit may be decibel (dB). As shown in FIG. 12, as the distance between the point source a1 and the point source a2 gradually increases (for example, from d to 10d), the sound volume at the listening position may gradually increase. That is, as the distance between the point source a1 and the point source a2 increases, the difference in sound pressure amplitude (i.e., sound pressure difference) between the two sounds reaching the listening position may become larger, making the sound cancellation effect weaker, which may increase the sound volume at the listening position. However, due to the existence of sound cancellation, the sound volume at the listening position may still be less than the sound volume generated by a single point source at the same position in the low and middle frequency band (for example, a frequency of less than 1000 Hz). However, in the high-frequency band (for example, a frequency close to 10000 Hz), due to the decrease in the wavelength of the sound, mutual enhancement of the sound may appear, making the sound generated by the two point sources louder than that of the single point source. In some embodiments, a sound pressure may refer to the pressure generated by the sound through the vibration of the air.

Figure 13:
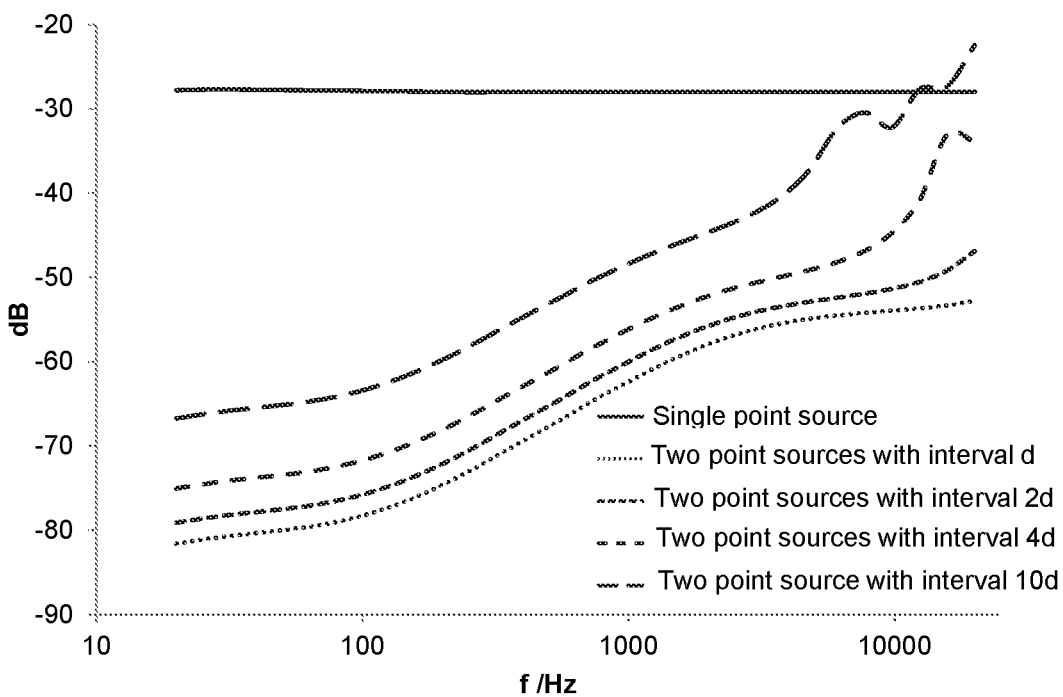
FIG. 13 is a graph illustrating a variation of a normalized parameter of two point sources in a far-field along with frequency according to some embodiments of the present disclosure.

In some embodiments, by increasing the distance of the two-point sound sources (for example, the point sound source a1 and the point sound source a2), the sound volume at the listening position may be increased. But as the distance increases, the sound cancellation of the two-point sound sources may become weaker, which may lead to an increase of the far-field sound leakage. For illustration purposes, FIG. 13 is a graph illustrating a variation of a normalized parameter of different distances between two-point sound sources in the far-field along with a frequency of sound according to some embodiments of the present disclosure. The abscissa may represent the frequency (f) of the sound, the unit may be Hertz (Hz). The ordinate may use a normalization parameter a for evaluating the volume of the leaked sound, and the unit may be decibel (dB). As shown in FIG. 13, taking the normalization parameter a of a single-point sound source as a reference, as the distance of the two-point sound sources increases from d to 10d, the normalization parameter a may gradually increase, indicating that the sound leakage may gradually increase. More descriptions regarding the normalization parameter a may be found in equation (4) and related descriptions.

Figure 14:
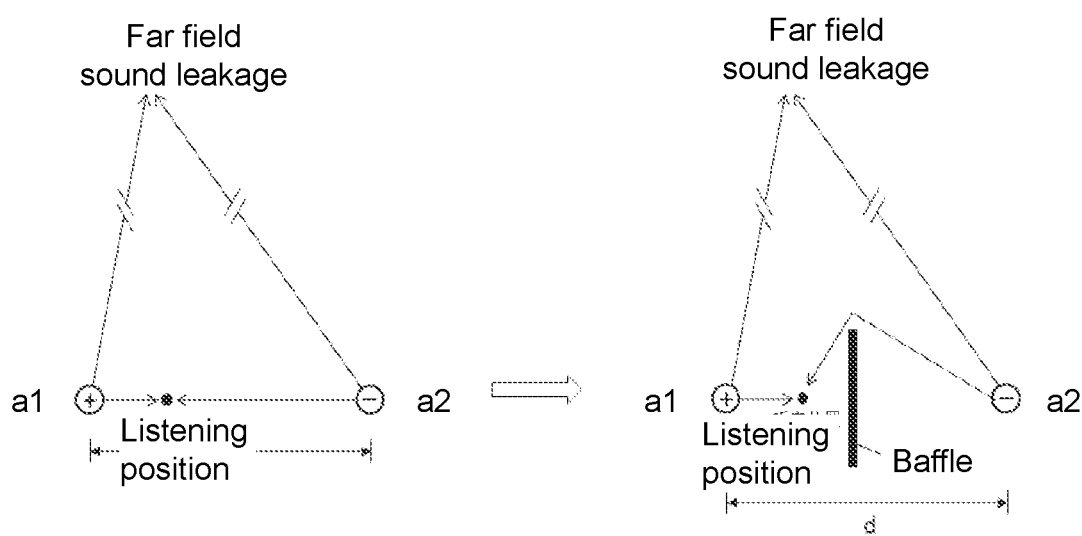
FIG. 14 is a distribution diagram illustrating an exemplary baffle provided between two point sources according to some embodiments of the present disclosure.

In some embodiments, adding a baffle structure to the acoustic output apparatus may be beneficial to improve the output effect of the acoustic output apparatus, that is, to increase the sound intensity at the near-field listening position, while reducing the volume of the far-field sound leakage. For illustration, FIG. 14 is a diagram illustrating an exemplary baffle provided between two-point sound sources according to some embodiments of the present disclosure. As shown in FIG. 14, when a baffle is provided between the point sound source a1 and the point sound source a2, in the near-field, the sound wave of the point sound source a2 may need to bypass the baffle to interfere with the sound wave of the point sound source a1 at the listening position, which may be equivalent to increasing the length of the acoustic route from the point sound source a2 to the listening position. Therefore, assuming that the point sound source a1 and the point sound source a2 have the same amplitude, compared to the case without a baffle, the difference in the amplitude of the sound waves of the point sound source a1 and the point sound source a2 at the listening position may increase, so that the degree of cancellation of the two sounds at the listening position may decrease, causing the sound volume at the listening position to increase. In the far-field, because the sound waves generated by the point sound source a1 and the point sound source a2 do not need to bypass the baffle in a large space, the sound waves may interfere (similar to the case without a baffle). Compared to the case without a baffle, the sound leakage in the far-field may not increase significantly. Therefore, a baffle structure being provided between the point sound source a1 and the point sound source a2 may increase the sound volume at the near-field listening position significantly when the far-field leakage volume does not increase significantly.

Figure 15:
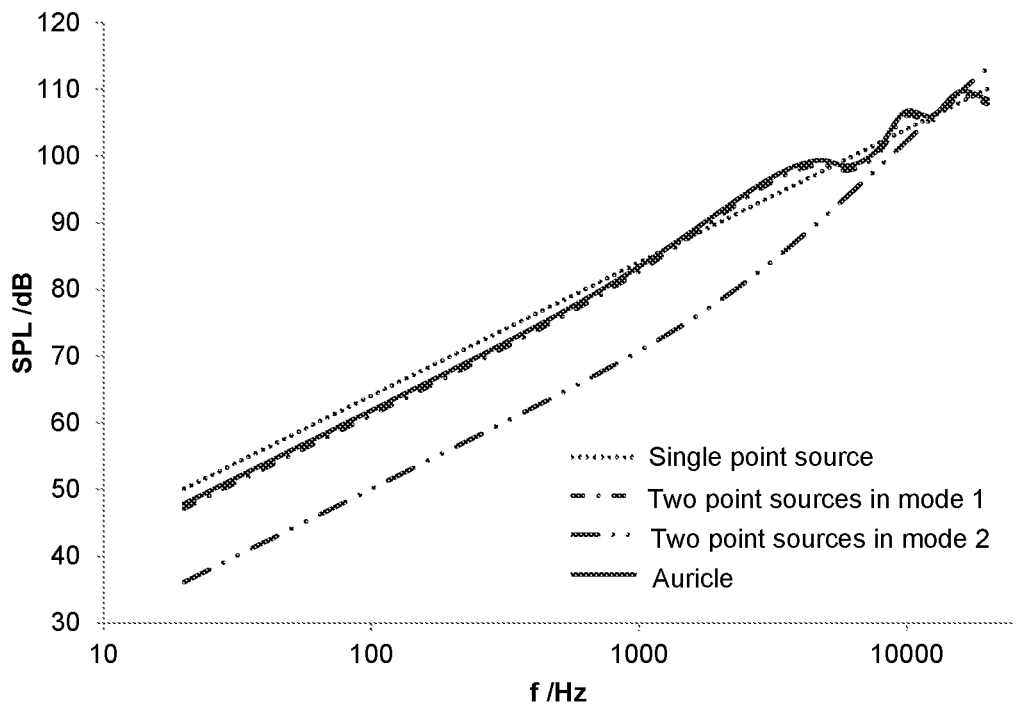
FIG. 15 is a graph illustrating a variation of a volume of sound heard by the user as a function of frequency when an auricle is located between two point sources according to some embodiments of the present disclosure.
Figure 16:
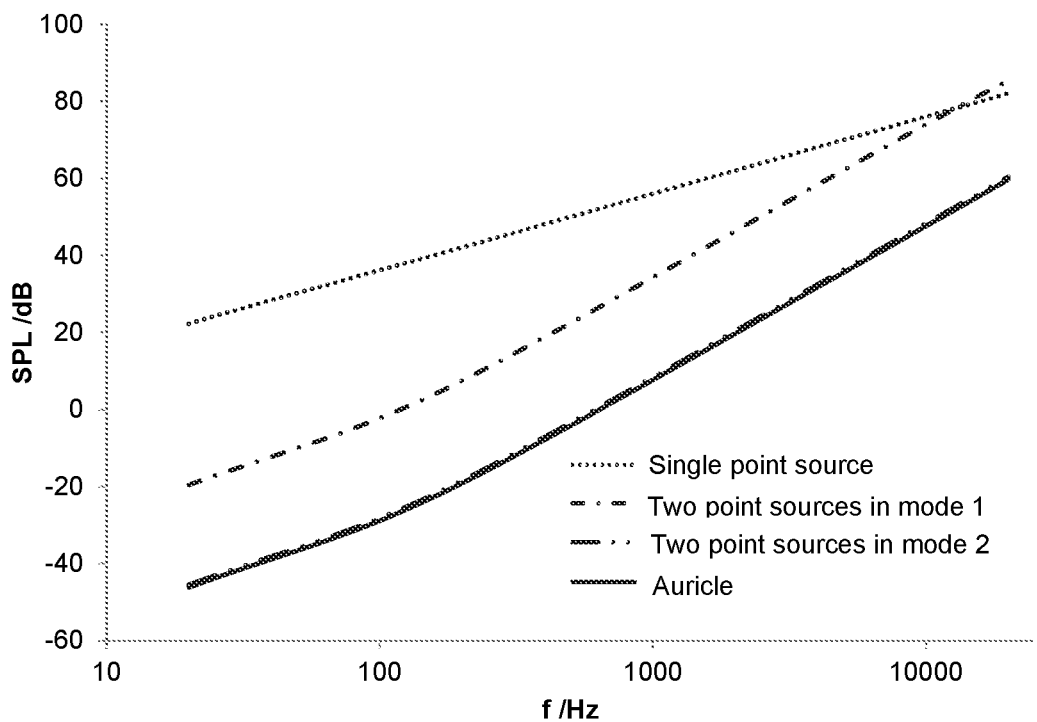
FIG. 16 is a graph illustrating a variation of a volume of the leaked sound as a function of frequency when an auricle is located between two point sources according to some embodiments of the present disclosure.
Figure 17:
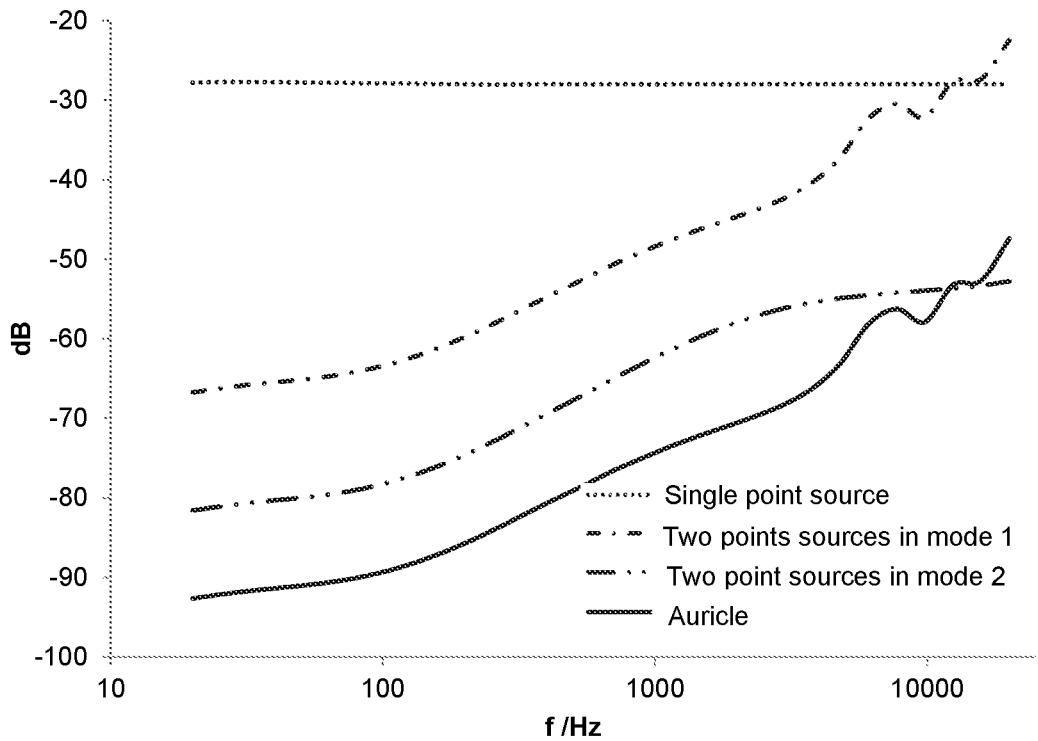
FIG. 17 is a graph illustrating a variation of a normalized parameter as a function of frequency when two point sources of an acoustic output apparatus are distributed on both sides of an auricle according to some embodiments of the present disclosure.

In the present disclosure, when the two-point sound sources are located on both sides of the auricle, the auricle may serve as a baffle, so the auricle may also be referred to as a baffle for convenience. As an example, due to the existence of the auricle, the result may be equivalent to that the near-field sound may be generated by two-point sound sources with a distance of D1 (also known as mode 1). The far-field sound may be generated by two-point sound sources with a distance of D2 (also known as mode 2), and D1>D2. FIG. 15 is a graph illustrating a variation of the volume of a sound heard by a user as a function of the frequency of sound when the auricle is located between two point sources according to some embodiments of the present disclosure. As shown in FIG. 15, when the frequency is low (for example, when the frequency is less than 1000 Hz), the volume at the near-field sound (that is, the sound heard by the user by the user's ear) may basically be the same as that of the near-field sound in mode 1, be greater than the volume of the near-field sound in mode 2, and be close to the volume of the near-field sound of a single point source. As the frequency increases (for example, when the frequency is between 2000 Hz and 7000 Hz), the volume of the near-field sound when mode 1 and the two-point sound sources being distributed on both sides of the auricle may be greater than that of the one-point sound source. It shows that when the user's auricle is located between the two-point sound sources, the volume of the near-field sound transmitted from the sound source to the user's ear may be effectively enhanced. FIG. 16 is a graph illustrating a variation of the volume of a leaked sound as a function of the frequency of sound when the auricle is located between two point sources according to some embodiments of the present disclosure. As shown in FIG. 16, as the frequency increases, the volume of the far-field leakage may increase. When the two-point sound sources are distributed on both sides of the auricle, the volume of the far-field leakage generated by the two-point sound sources may be basically the same as the volume of the far-field leakage of Mode 2, and both of which may be less than the volume of the far-field leakage of Mode 1 and the volume of the far-field leakage of a single-point sound source. It shows that when the user's auricle is located between the two-point sound source, the sound transmitted from the sound source to the far-field may be effectively reduced, that is, the sound leakage from the sound source to the surrounding environment may be effectively reduced. FIG. 17 is a graph illustrating a variation of a normalized parameter as a function of the frequency of sound when two point sources of an acoustic output apparatus are distributed on both sides of the auricle according to some embodiments of the present disclosure. As shown in FIG. 17, when the frequency is less than 10000 Hz, the normalized parameters when the two-point sound sources are distributed on both sides of the auricle may be less than the normalized parameter in the case of mode 1 (no baffle structure between the two-point sound source, and the distance is D1), mode 2 (no baffle structure between the two-point sound source, and the distance is D2), and the single-point sound source, which may show that when the two-point sound sources are located on both sides of the auricle, the acoustic output apparatus may have a better capability to reduce the sound leakage.

In order to further explain the effect of the acoustic output apparatus with or without a baffle between the two point sources or two sound guiding holes, the volume of the near-field sound at the listening position and/or volume of the far-field leakage under different conditions may specifically be described below.

Figure 18:
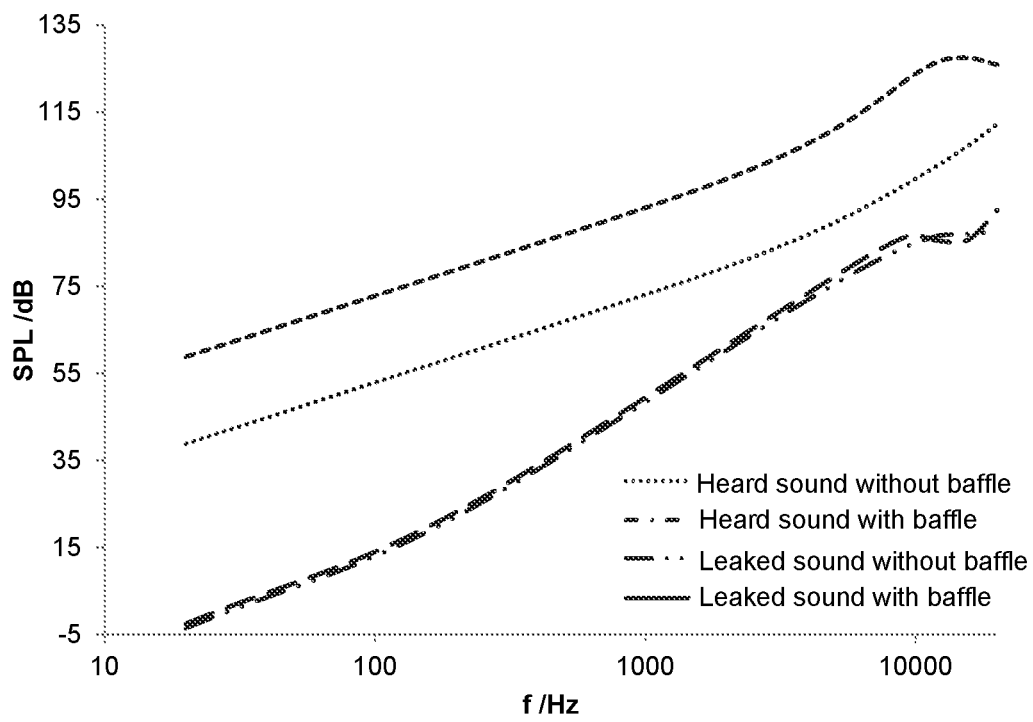
FIG. 18 is a graph illustrating a variation of a volume of sound heard by the user and a volume of the leaked sound as a function of frequency with and without a baffle between two point sources according to some embodiments of the present disclosure.

FIG. 18 is a graph illustrating a variation of the volume of a sound heard by the user and volume of a leaked sound as a function of the frequency of sound with and without a baffle between two point sources according to some embodiments of the present disclosure. As shown in FIG. 18, after adding a baffle between the two points of sound sources (i.e., two sound guiding holes) of the acoustic output apparatus, at the near-field, it may be equivalent to increasing the distance between the two points of sound sources, and the sound volume in the near-field listening position may be equivalent to being generated by a set of two-point sound sources with a large distance. The near-field sound volume may significantly be increased compared to the case without a baffle. In the far-field, because the interference of the sound waves generated by the two points of sound sources may be little affected by the baffle, the sound leakage may be equivalent to being generated by a set of two-point sound sources with a small distance, therefore the sound leakage may not change significantly with or without the baffle. It may be seen that by setting a baffle between two sound guiding holes (i.e., two point sources), the ability of the sound output apparatus to reduce the sound leakage may be effectively improved, and the volume of the near-field sound of the acoustic output apparatus may be increased significantly. Therefore, the requirements for sound production components of the acoustic output apparatus may be reduced. At the same time, the simple circuit structure may reduce the electrical loss of the acoustic output apparatus, so the working time of the acoustic output apparatus may be greatly prolonged under a certain amount of electricity.

Figure 19:
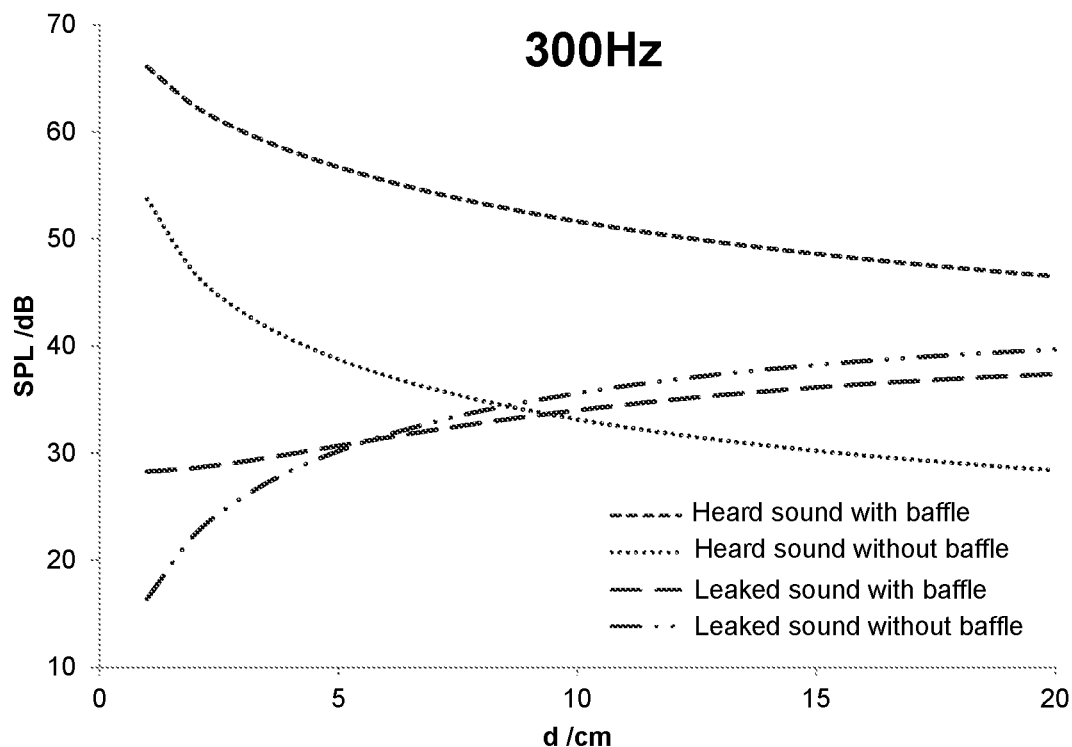
FIG. 19 is a graph illustrating a variation of a volume of sound heard by the user and a volume of the leaked sound as a function of the distance between two point sources at a frequency of 300 Hz and with or without a baffle according to some embodiments of the present disclosure.
Figure 20:
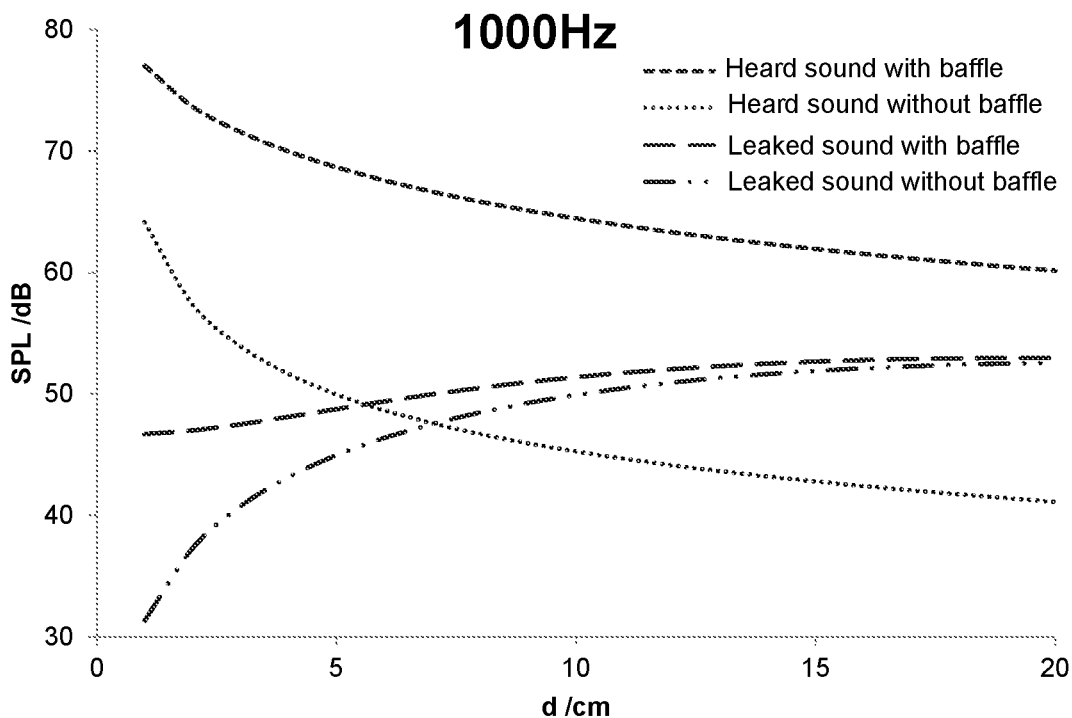
FIG. 20 is a graph illustrating a variation of a volume of sound heard by the user and a volume of the leaked sound as a function of the distance between two point sources at a frequency of 1000 Hz and with or without a baffle according to some embodiments of the present disclosure.

FIG. 19 a graph illustrating a variation of the volume of a sound heard by the user and the volume of a leaked sound as a function of the distance between two point sources when the frequency of the two point sources is 300 Hz according to some embodiments of the present disclosure. FIG. 20 is a graph illustrating a variation of the volume of a sound heard by the user and the volume of a leaked sound as a function of the distance between two point sources when the frequency of the two point sources is 1000 Hz according to some embodiments of the present disclosure. As shown in FIGS. 19 and 20, in the near-field, when the frequency is 300 Hz or 1000 Hz, as the increase of the distance d of the two point sources, the volume of the sound heard by the user with a baffle between the two point sources may be greater than that without a baffle between the two point sources, which shows that at this frequency, the baffle structure between the two point sources may effectively increase the volume of the sound heard by the user in the near-field. In the far-field, the volume of the leaked sound with a baffle between the two point sources may be equivalent to that without a baffle between the two point sources, which shows that at this frequency, with or without a baffle structure arranged between the two point sources has little effect on the far-field sound leakage.

Figure 21:
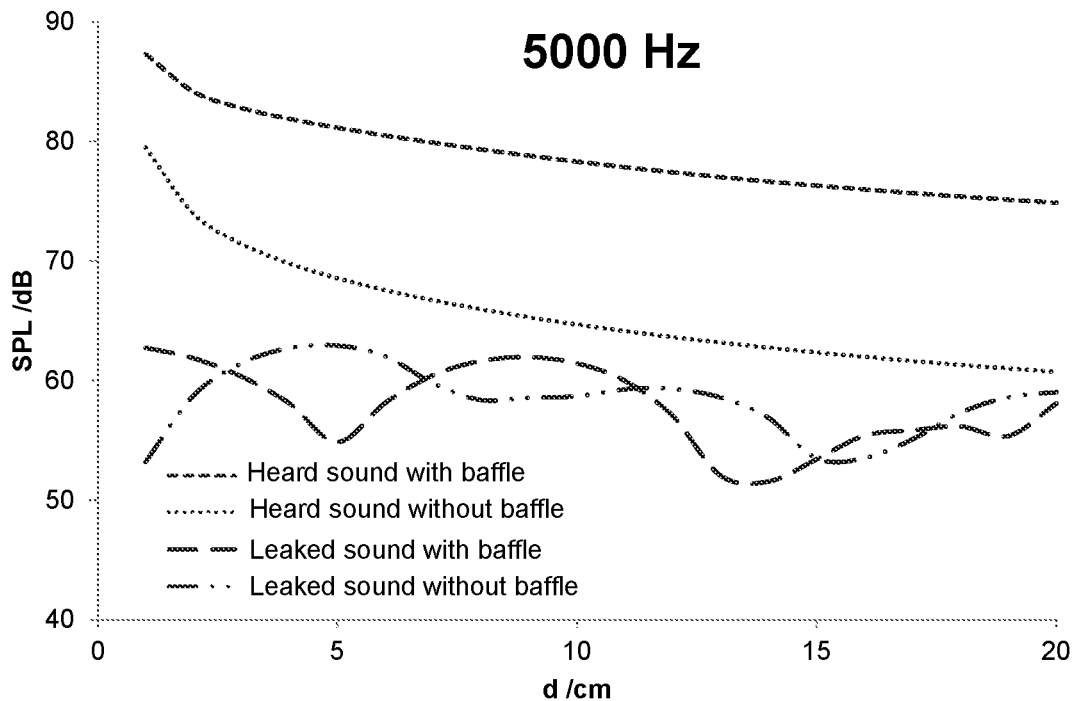
FIG. 21 is a graph illustrating a variation of a volume of sound heard by the user and a volume of the leaked sound as a function of distance at a frequency of 5000 Hz and with or without a baffle between the two point sources according to some embodiments of the present disclosure.

FIG. 21 is a graph illustrating a variation of the volume of a sound heard by the user and the volume of a leaked sound as a function of the distance when the frequency of the two point sources is 5000 Hz according to some embodiments of the present disclosure. As shown in FIG. 21, in the near-field, when the frequency is 5000 Hz, as the distance d of the two-point sound sources increases, the volume of the sound heard by the user when there is a baffle between the two-point sound sources may be greater than that when there is no baffle. In the far-field, the volume of the leaked sound of the two-point sound sources with and without baffle may be fluctuant as a function of the distance d. Overall, whether the baffle structure is arranged between the two-point sound sources has little effect on the far-field leakage.

Figure 22:
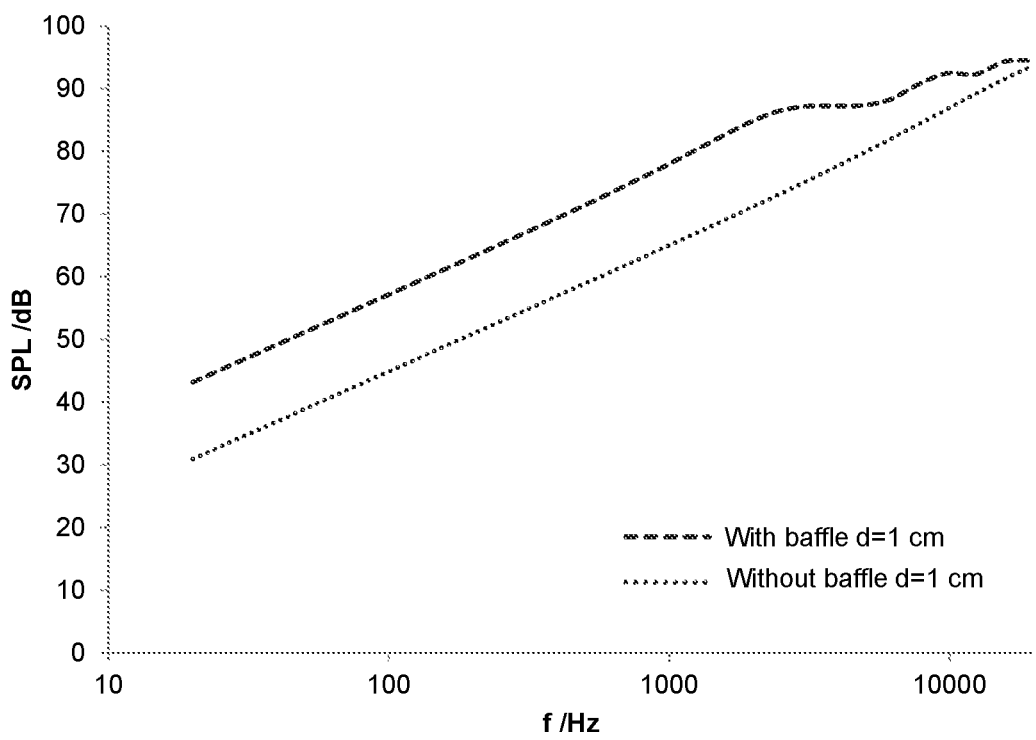
FIGS. 22-24 are graphs illustrating a variation of a volume of sound heard by the user as a function of frequency when a distance d of two point sources is 1 cm, 2 cm, 3 cm, respectively, according to some embodiments of the present disclosure.
Figure 23:
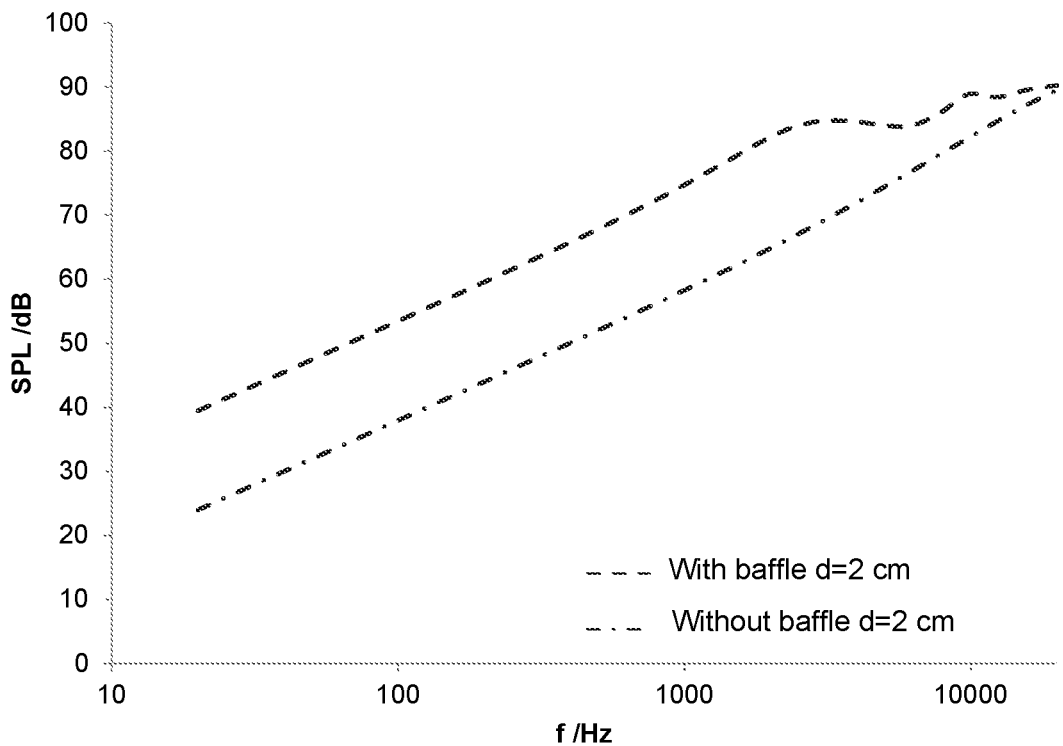
Figure 24:
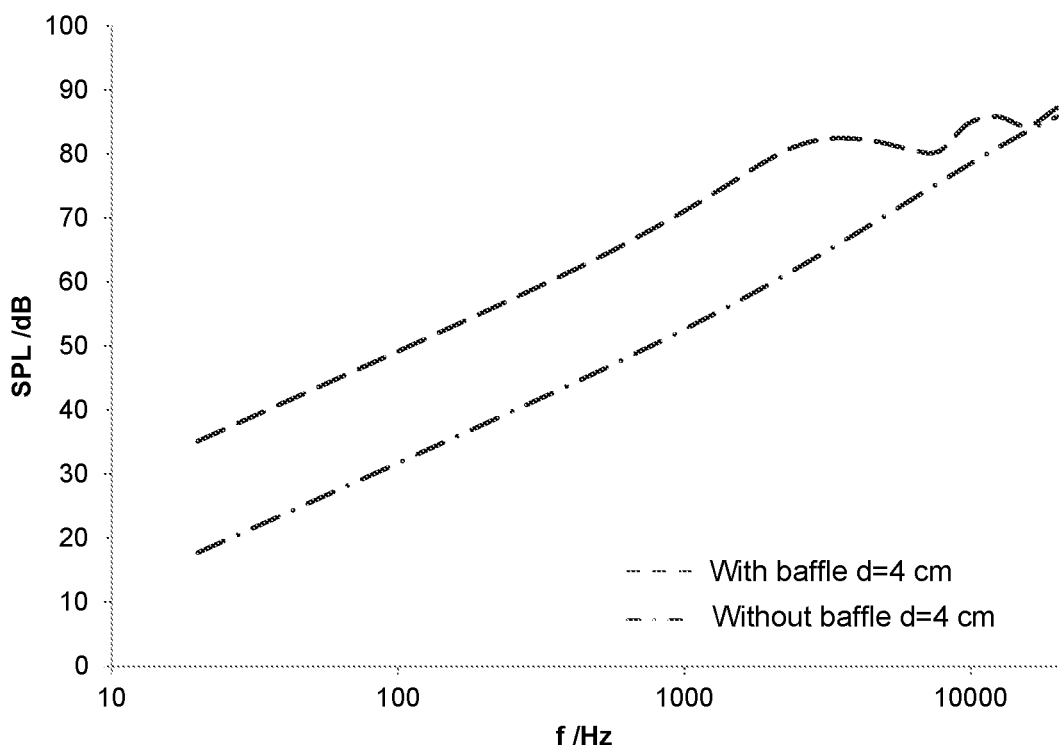
Figure 25:
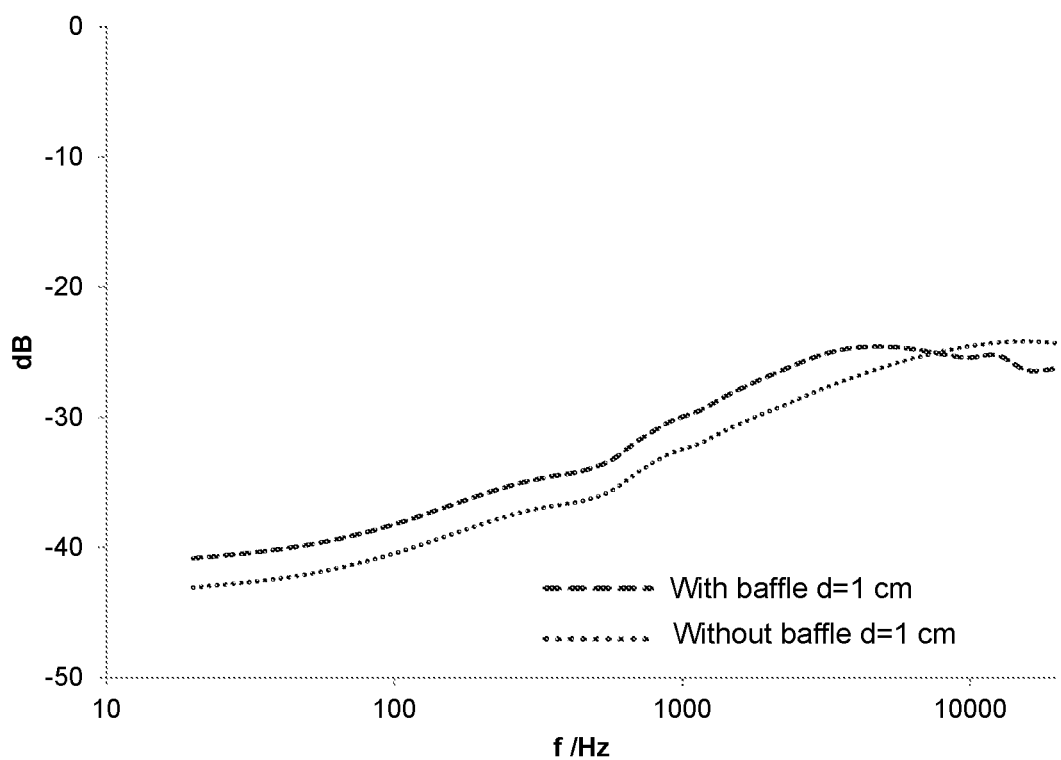
FIG. 25 is a graph illustrating a variation of a normalized parameter as a function of frequency when a distance d of two point sources is 1 cm according to some embodiments of the present disclosure.
Figure 26:
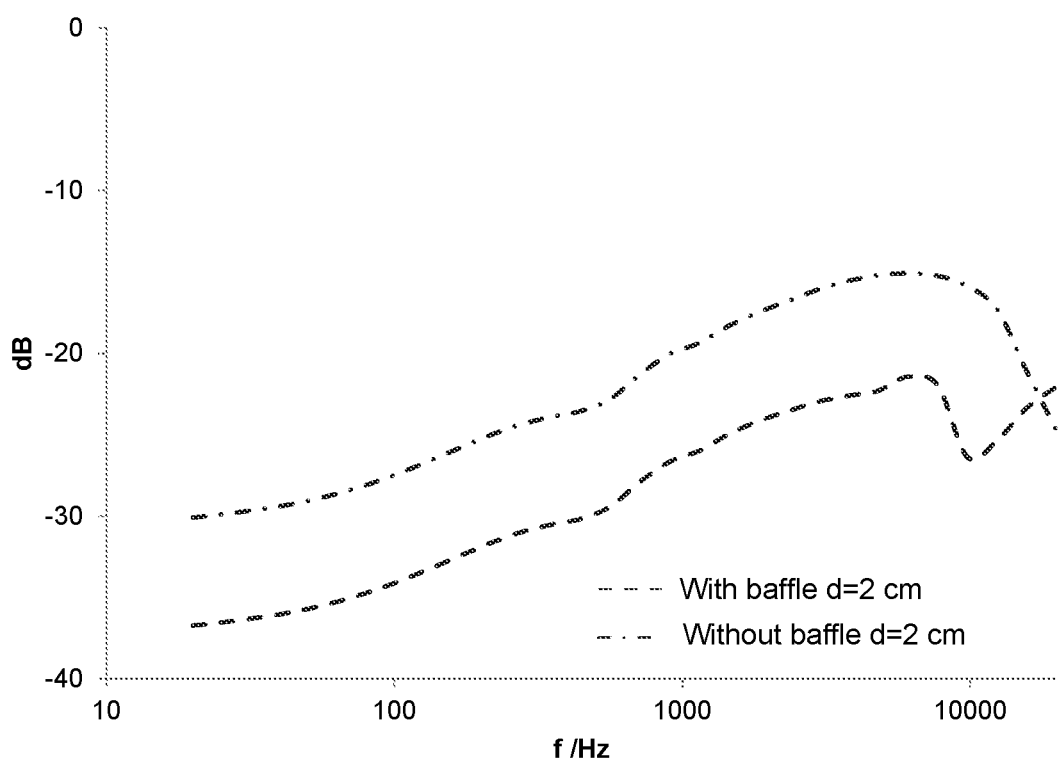
FIG. 26 is a graph illustrating a variation of a normalized parameter as a function of frequency when a distance d of two point sources is 2 cm according to some embodiments of the present disclosure.
Figure 27:
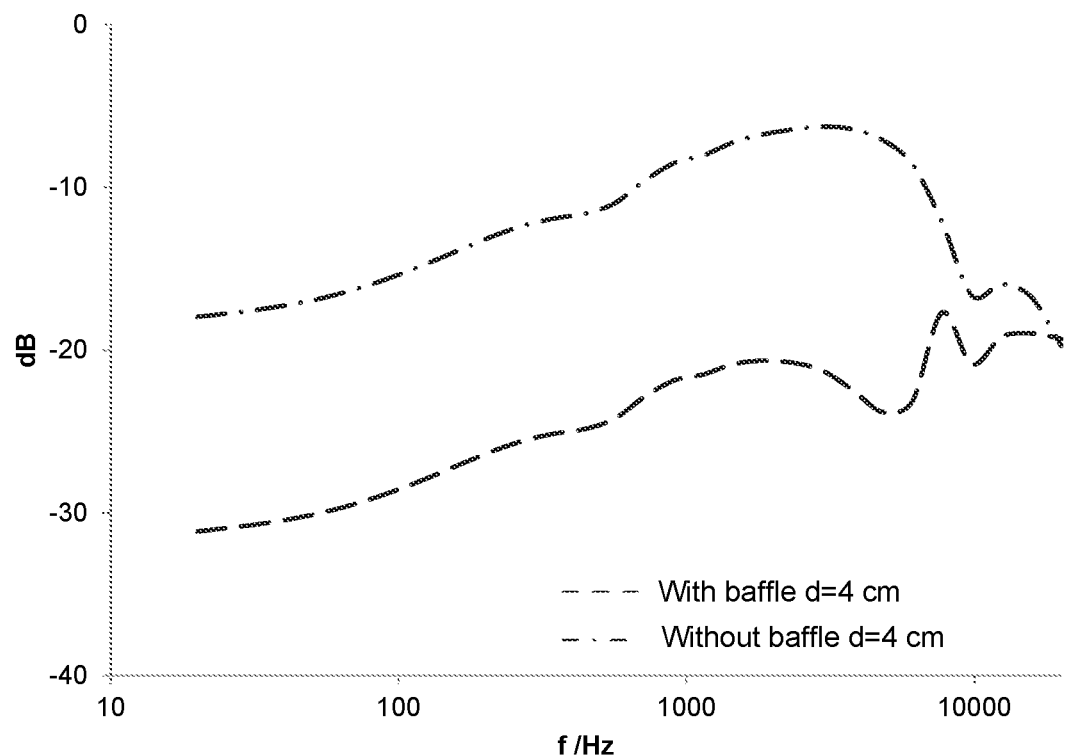
FIG. 27 is a graph illustrating a variation of a normalized parameter as a function of frequency when a distance d of two point sources is 4 cm according to some embodiments of the present disclosure.

FIG. 22 is a graph illustrating a variation of the volume of the heard sound as a function of the frequency when the distance d of the two-point sound sources is 1 cm according to some embodiments of the present disclosure. FIG. 23 is a graph illustrating a variation of the volume of the heard sound as a function of the frequency when the distance d of the two-point sound sources is 2 cm according to some embodiments of the present disclosure. FIG. 24 is a graph illustrating a variation of a normalized parameter of a far-field as a function of the frequency of sound when the distance d of two point sources is 1 cm according to some embodiments of the present disclosure. FIG. 25 is a graph illustrating a variation of a normalized parameter of a far-field as a function of the frequency of sound when the distance d of two point sources is 2 cm according to some embodiments of the present disclosure. FIG. 26 is a graph illustrating a variation of a normalized parameter of a far-field as a function of the frequency of sound when the distance d of two point sources is 4 cm according to some embodiments of the present disclosure. FIG. 27 is a graph illustrating a variation of a normalized parameter of the far-field as a function of the frequency of sound when the distance d of the two-point sound sources is 4 cm according to some embodiments of the present disclosure. As shown in FIGS. 22 through 26, for the different distance d of the sound guiding holes (for example, 1 cm, 2 cm, 4 cm), at a certain frequency, in the near-field listening position (for example, the user's ear), the sound volume that the two sound guiding holes are provided on both sides of the auricle (i.e., the "baffle effect" situation shown in the figure), respectively, may be greater than the sound volume that the two sound guiding holes are not provided on both sides of the auricle (i.e., the case of "no baffle effect" shown in the figure). The certain frequency may be below 10000 Hz, below 5000 Hz, or below 1000 Hz.

As shown in FIGS. 25 to 27, for the different distances d of the sound guiding holes (for example, 1 cm, 2 cm, and 4 cm), at a certain frequency, in the far-field position (for example, the environment position away from the user's ear), the volume of the leaked sound generated when the two sound guiding holes are provided on both sides of the auricle may be smaller than that generated when the two sound guiding holes are not provided on both sides of the auricle. It should be noted that as the distance between two sound guiding holes or two point sources increases, the destructive interference of sound at the far-field position may weaken, leading to a gradual increase in the far-field leakage and a weaker ability to reduce sound leakage. Therefore, the distance d between two sound guiding holes or the two point sources may not be too large. In some embodiments, in order to keep the output sound as loud as possible in the near-field, and suppress the sound leakage in the far-field, the distance d between the two sound guiding holes may be set to be no more than, for example, 20 cm, 12 cm, 10 cm, 6 cm, or the like. In some embodiments, considering the size of the acoustic output apparatus and the structural requirements of the sound guiding holes, the distance d between the two sound guiding holes may be set to be in a range of, for example, 1 cm to 12 cm, 1 cm to 10 cm, 1 cm to 8 cm, 1 cm to 6 cm, 1 cm to 3 cm, or the like.

It should be noted that the above description is merely for the convenience of description, and not intended to limit the scope of the present disclosure. It may be understood that, for those skilled in the art, after understanding the principle of the present disclosure, various modifications and changes in the forms and details of the acoustic output apparatus may be made without departing from this principle. For example, in some embodiments, a plurality of sound guiding holes may be set on both sides of the baffle. The number of sound guiding holes on both sides of the baffle may be the same or different. For example, the number of sound guiding holes on one side of the baffle may be two, and the number of sound guiding holes on the other side may be two or three. These modifications and changes may still be within the protection scope of the present disclosure.

Figure 28:
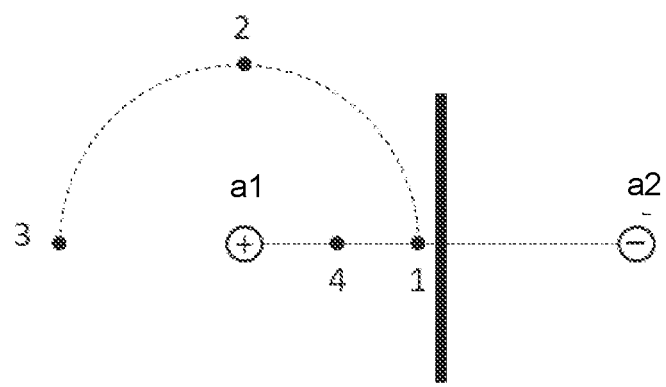
FIG. 28 is a graph illustrating exemplary distributions of different listening positions according to some embodiments of the present disclosure.

In some embodiments, on the premise of maintaining the distance between the two-point sound sources, a relative position of the listening position to the two-point sound sources may have a certain effect on the near-field sound volume and the far-field leakage reduction. In order to improve the acoustic output effect of the acoustic output apparatus, in some embodiments, the acoustic output apparatus may be provided with at least two sound guiding holes. The at least two sound guiding holes may include two sound guiding holes located on the front and back sides of the user's auricle, respectively. In some embodiments, considering that the sound propagated from the sound guiding hole located on the rear side of the user's auricle needs to bypass over the auricle to reach the user's ear canal, the acoustic route between the sound guiding hole located on the front side of the auricle and the user's ear canal (i.e., the acoustic distance from the sound guiding hole to the user's ear canal entrance) is shorter than the acoustic route between the sound guiding hole located on the rear side of the auricle and the user's ear. In order to further explain the effect of the listening position on the acoustic output effect, four representative listening positions (listening position 1, listening position 2, listening position 3, listening position 4) may be selected as shown in FIG. 28. The effects and criteria of the selection of the listening position may be explained. The listening position 1, the listening position 2, and the listening position 3 may be equal to the distance from the point sound source a1, which may be r1. The distance between the listening position 4 and the point sound source a1 may be r2, and r2<r1. The point sound source a1 and the point sound source a2 may generate sounds with opposite phases, respectively.

Figure 29:
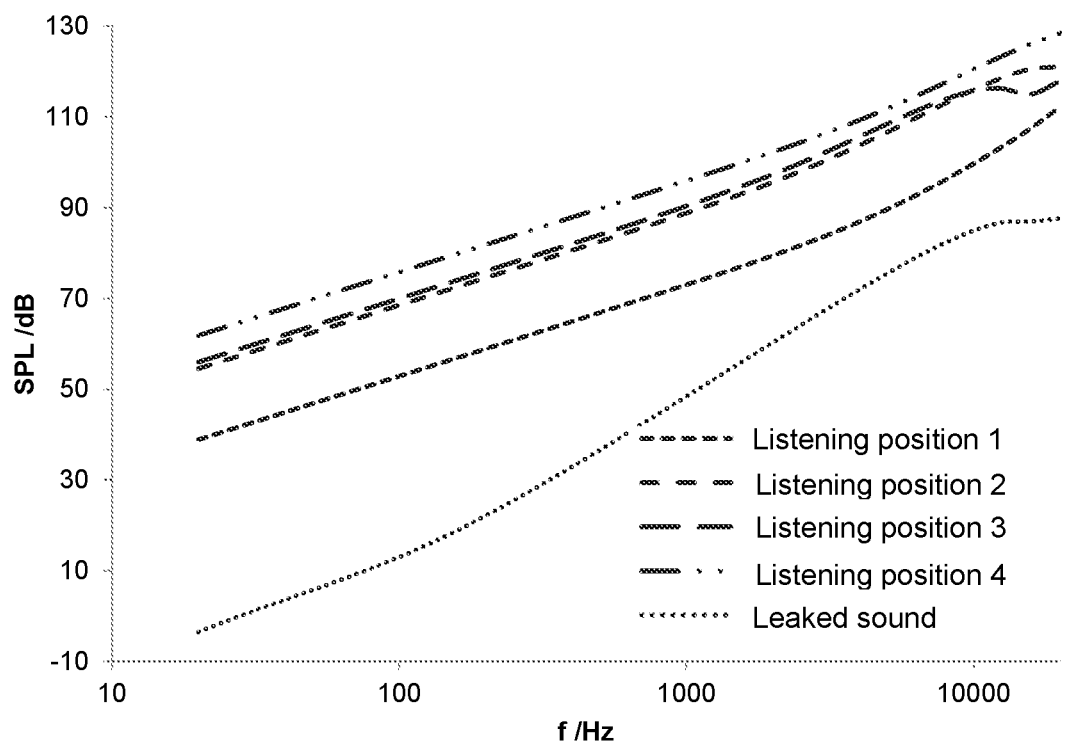
FIG. 29 is a graph illustrating a volume of sound heard by the user from a two point sources without baffle at different listening positions in a near-field as a function of frequency according to some embodiments of the present disclosure.
Figure 30:
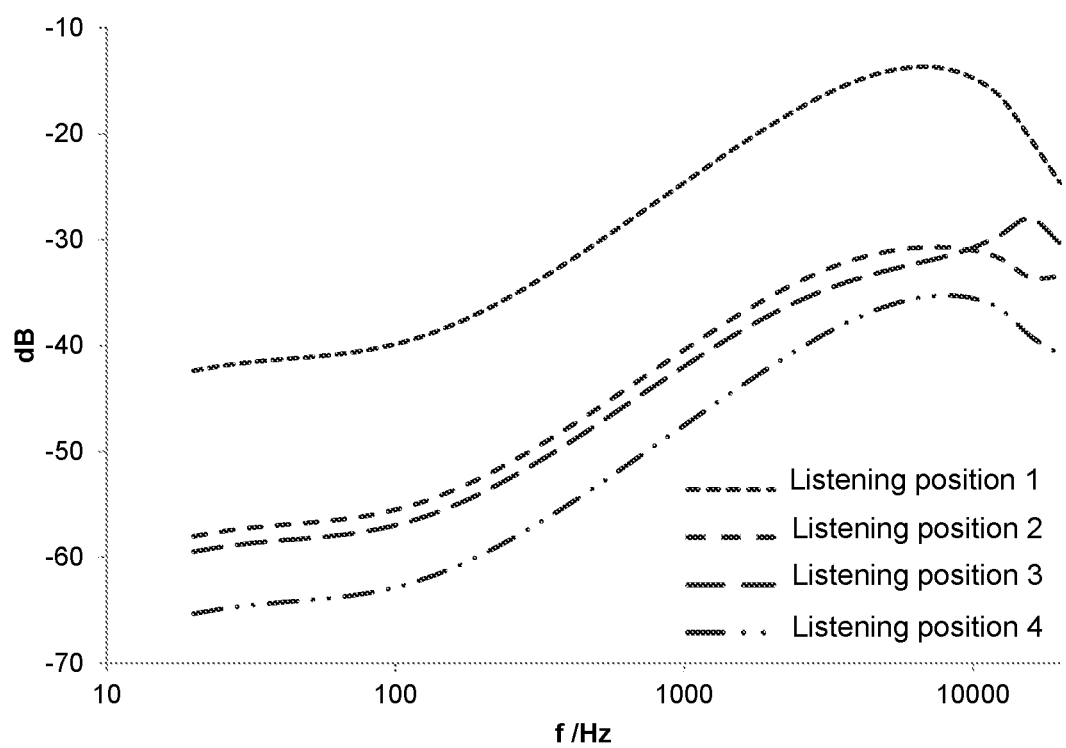
FIG. 30 is a graph illustrating a normalized parameter of two point sources without baffle at different listening positions in a near-field according to some embodiments of the present disclosure.

FIG. 29 is a graph illustrating the volume of a sound heard by a user of two point sources without baffle at different listening positions as a function of the frequency of sound according to some embodiments of the present disclosure. FIG. 30 is a graph illustrating a normalized parameter of different listening positions as a function of the frequency of sound. The normalized parameters may be obtained with reference to Equation (4) based on FIG. 29, as a function of frequency. As shown in FIGS. 29 and 30, for the listening position 1, since the difference between the acoustic routes from the point source a1 and the point source a2 to the listening position 1 is small, the difference in amplitude of the sounds produced by the two point sources at the listening position 1 may be small. Therefore, an interference of the sounds of the two point sources at the listening position 1 may cause the volume of the sound heard by the user to be smaller than that of other listening positions. For the listening position 2, compared with the listening position 1, the distance between the listening position 2 and the point source a1 may remain unchanged, that is, the acoustic route from the point source a1 to the listening position 2 may not change. However, the distance between the listening position 2 and the point source a2 may be longer, and the length of the acoustic route between the point source a2 and the listening position 2 may increase. The amplitude difference between the sound generated by the point source a1 and the sound generated by the point source a2 at the listening position 2 may increase. Therefore, the volume of the sound transmitted from the two point sources after interference at the listening position 2 may be greater than that at the listening position 1. Among all positions on an arc with a radius of r1, a difference between the acoustic route from the point source a1 to the listening position 3 and the acoustic route from the point source a2 to the listening position 3 may be the longest. Therefore, compared with the listening position 1 and the listening position 2, the listening position 3 may have the highest volume of the sound heard by the user. For the listening position 4, the distance between the listening position 4 and the point source a1 may be short. The sound amplitude of the point source a1 at the listening position 4 may be large. Therefore, the volume of the sound heard by the user at the listening position 4 may be large. In summary, the volume of the sound heard by the user at the near-field listening position may change as the listening position and the relative position of the two point sources change. When the listening position is on the line between the two point sources and on the same side of the two point sources (for example, listening position 3), the acoustic route difference between the two point sources at the listening position may be the largest (the acoustic route difference may be the distance d between the two point sources). In this case (i.e., when the auricle is not used as a baffle), the volume of the sound heard by the user at this listening position may be greater than that at other locations. According to Equation (4), when the far-field leakage is constant, the normalization parameter corresponding to this listening position may be the smallest, and the leakage reduction capability may be the strongest. At the same time, reducing the distance r1 between the listening position (for example, listening position 4) and the point source a1 may further increase the volume at the listening position, reduce the sound leakage, and improve the capability to reduce leakage.

Figure 31:
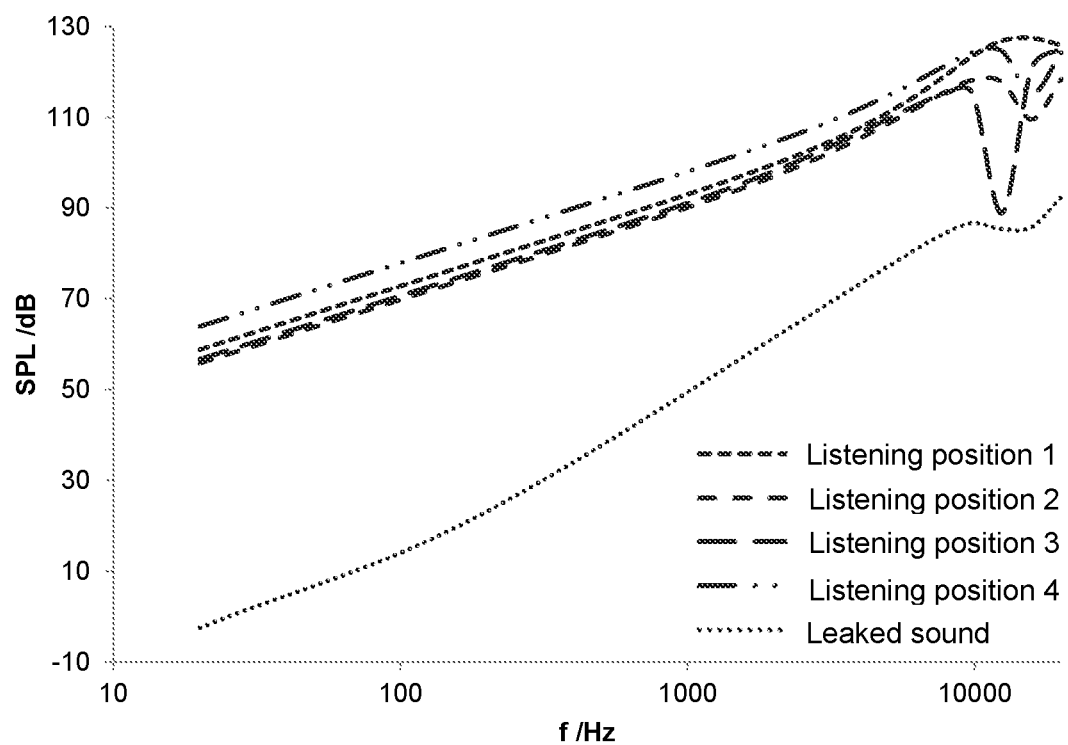
FIG. 31 is a graph illustrating a volume of sound heard by the user from two point sources with a baffle at different listening positions in a near-field as a function of frequency according to some embodiments of the present disclosure.
Figure 32:
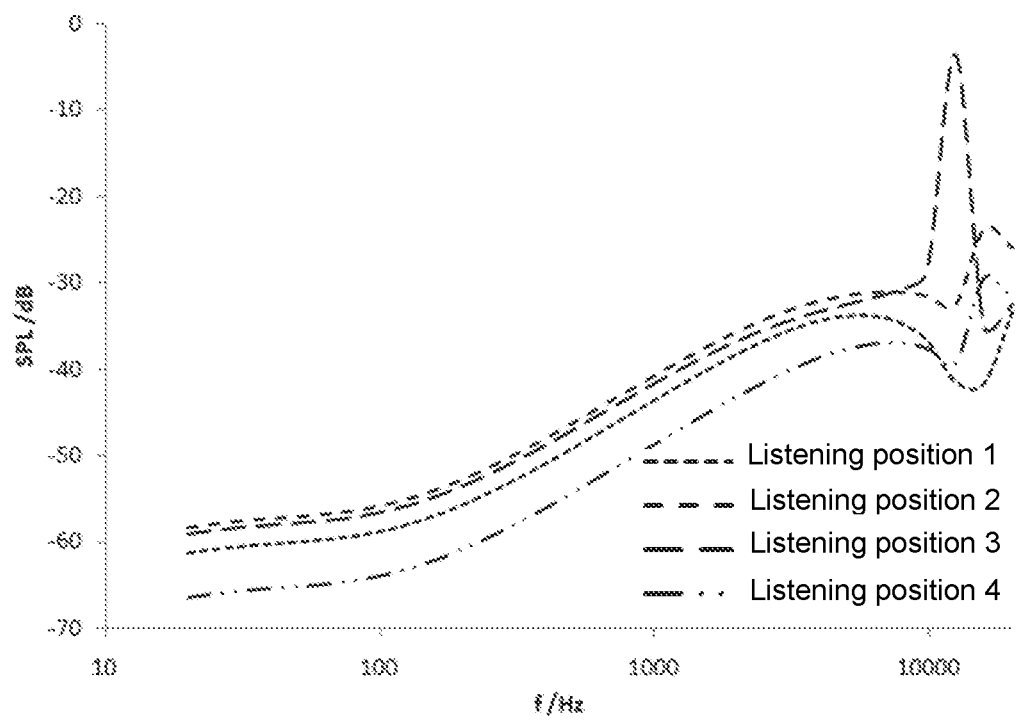
FIG. 32 is a graph illustrating a normalized parameter of two point sources with a baffle at different listening positions in a near-field according to some embodiments of the present disclosure.

FIG. 31 is a graph illustrating the volume of the sound heard by the user of two-point sound sources with baffle (as shown in FIG. 28) at different listening positions in the near-field as a function of frequency according to some embodiments of the present disclosure. FIG. 32 is a graph of the normalization parameters of different listening positions obtained with reference to Equation (4) based on FIG. 31, as a function of frequency. As shown in FIGS. 31 and 32, compared to the case without a baffle, the volume of the sound heard by the user and generated by the two point sources at listening position 1 may increase significantly when there is a baffle. The volume of the sound heard by the user at the listening position 1 may exceed that at the listening position 2 and the listening position 3. The reason may be that the acoustic route from the point source a2 to the listening position 1 may increase after a baffle is set between the two point sources. As a result, the acoustic route difference between the two point sources at the listening position 1 may increase significantly. The amplitude difference between the sounds generated by the two point sources at the listening position 1 may increase, making it difficult to produce sound destructive interference, thereby increasing the volume of the sound heard by the user generated at the listening position 1 significantly. At the listening position 4, since the distance between the listening position and the point source a1 is further reduced, the sound amplitude of the point source a1 at this position may be larger. The volume of the sound heard by the user at the listening position 4 may still be the largest among the four listening positions. For listening position 2 and listening position 3, since the effect of the baffle on the acoustic route from the point source a2 to the two listening positions is not very obvious, the volume increase effect at the listening position 2 and the listening position 3 may be less than that at the listening position 1 and the listening position 4 which are closer to the baffle.

The volume of the leaked sound in the far-field may not change with listening positions, and the volume of the sound heard by the user at the listening position in the near-field may change with listening positions. In this case, according to Equation (4), the normalization parameter of the acoustic output apparatus may vary in different listening positions. Specifically, a listening position with a large volume of sound heard by the user (e.g., listening position 1 and listening position 4) may have a small normalization parameter and strong capability to reduce sound leakage. A listening position with a low volume of sound heard by the user (e.g., listening position 2 and listening position 3) may have a large normalization parameter and weak capability to reduce leakage.

Therefore, according to the actual application scenario of the acoustic output apparatus, the user's auricle may serve as a baffle. In this case, the two sound guiding holes on the acoustic output apparatus may be arranged on the front side and the back side of the auricle, respectively, and the ear canal may be located between the two sound guiding holes as a listening position. In some embodiments, by designing the positions of the two sound guiding holes on the acoustic output apparatus, the distance between the sound guiding hole on the front side of the auricle and the ear canal may be smaller than the distance between the sound guiding hole on the back side of the auricle and the ear canal. In this case, because the sound guiding hole on the front side of the auricle is close to the ear canal, it may produce a large sound amplitude at the ear canal. The sound amplitude produced by the sound guiding hole on the back of the auricle may be smaller at the ear canal, which may avoid the destructive interference of the sound at the two sound guiding holes at the ear canal, thereby ensuring that the volume of the sound heard by the user at the ear canal is large. In some embodiments, the acoustic output apparatus may include a contact point(s) that can contact with the auricle when worn (e.g., "an inflection point" on a supporting structure to match the shape of the ear). The contact point(s) may be located on a line connecting the two sound guiding holes or on one side of the line connecting the two sound guiding holes. And a ratio of the distance between the front sound guiding hole and the contact point(s) to the distance between the rear sound guiding hole and the contact point(s) may be 0.05-20. Preferably, the ratio may be 0.1-10. More preferably, the ratio may be 0.2-5. Even more preferably, the ratio may be 0.4-2.5.

Figure 33:
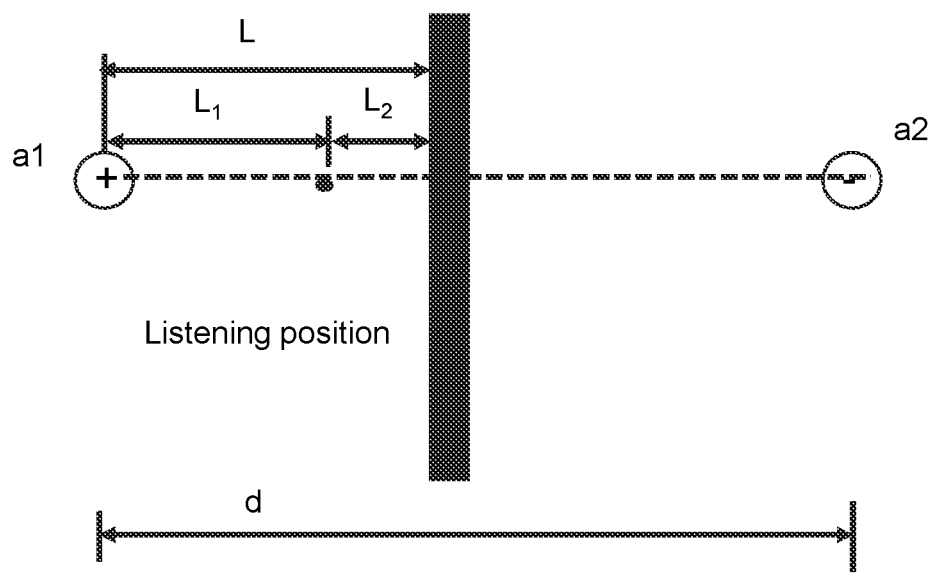
FIG. 33 is a schematic diagram illustrating two point sources and a baffle according to some embodiments of the present disclosure.

FIG. 33 is a schematic diagram illustrating two-point sound sources and a baffle (e.g., an auricle) according to some embodiments of the present disclosure. In some embodiments, a position of the baffle between the two sound guiding holes may also have a certain influence on the sound output effect. Merely by way of example, as shown in FIG. 33, a baffle may be provided between a point sound source a1 and a point sound source a2, a listening position may be located on the line connecting the point sound source a1 and the point sound source a2. In addition, the listening position may be located between the point sound source a1 and the baffle. A distance between the point sound source a1 and the baffle may be L. A distance between the point sound source a1 and the point sound source a2 may be d. A distance between the point sound source a1 and the sound heard by the user may be L1. A distance between the listening position and the baffle may be L2. When the distance L1 is constant, a movement of the baffle may cause different ratios of L to d, thereby achieving a volume of the sound heard by the user at the listening position and/or the far-field leakage volume under the different ratios.

Figure 34:
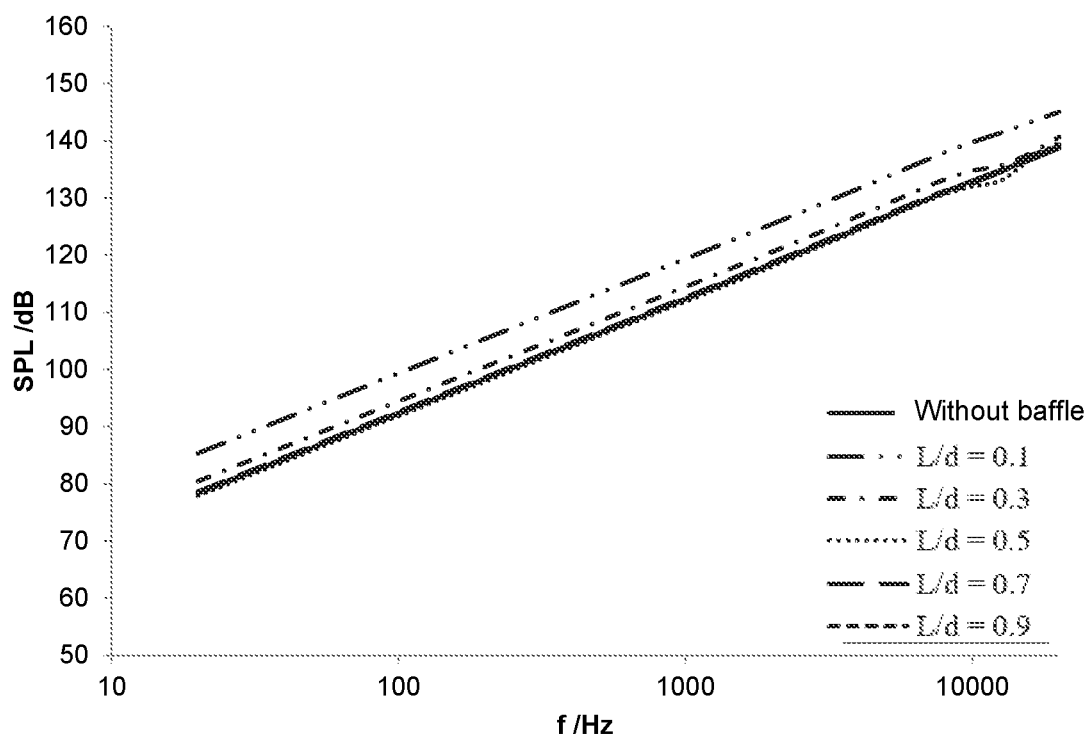
FIG. 34 is a graph illustrating a variation of a volume of the near-field sound as a function of frequency when a baffle is at different positions according to some embodiments of the present disclosure.
Figure 35:
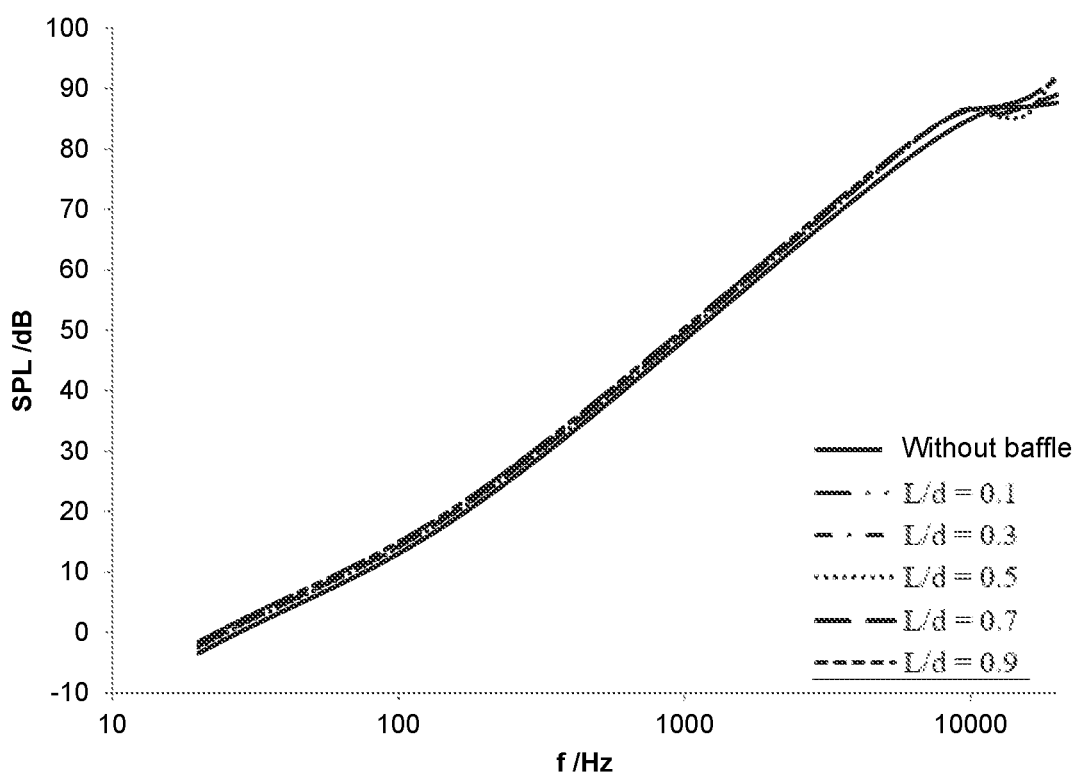
FIG. 35 is a graph illustrating a variation of a volume of the far-field leakage as a function of frequency when a baffle is at different positions according to some embodiments of the present disclosure.
Figure 36:
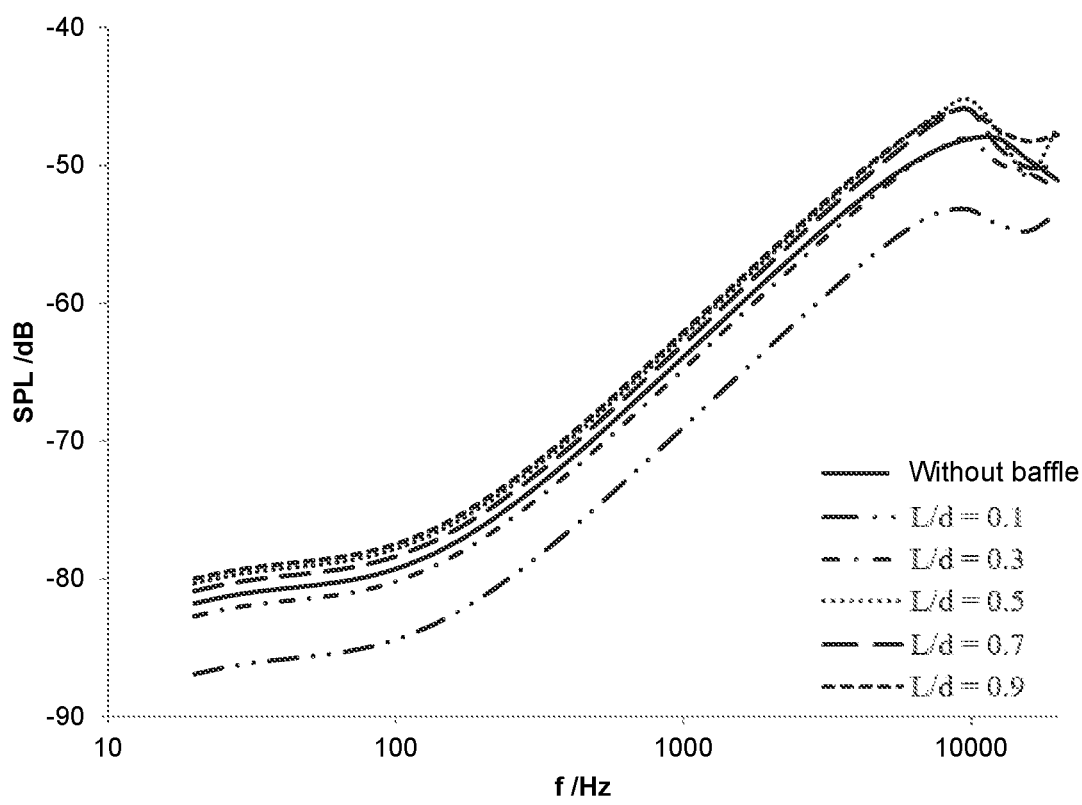
FIG. 36 is a graph illustrating a variation of a normalization parameter as a function of frequency when a baffle is at different positions according to some embodiments of the present disclosure.

FIG. 34 is a graph illustrating a variation of the volume of a near-field sound as a function of the frequency of sound when a baffle is at different positions according to some embodiments of the present disclosure. FIG. 35 is a graph illustrating a variation of the volume of a far-field leakage as a function of the frequency of sound when a baffle is at different positions according to some embodiments of the present disclosure. FIG. 36 is a graph illustrating a variation of a normalization parameter as a function of the frequency of sound when a baffle is at different positions according to some embodiments of the present disclosure. According to FIGS. 34-36, the volume of the far-field leakage may vary little with the change of the position of the baffle between the two point sources. In a situation that the distance d between the point source a1 and the point source a2 remains constant, when L decreases, the volume at the listening position may increase, the normalization parameter may decrease, and the ability to reduce leakage may be enhanced. In the same situation, when L increases, the volume at the listening position may increase, the normalization parameter may increase, and the ability to reduce leakage may be weakened. A reason for the above result may be that when L is small, the listening position may be close to the baffle, an acoustic route of the sound wave from the point source a2 to the listening position may be increased due to the baffle. In this case, an acoustic route difference between the point source a1 and the point source a2 to the listening position may be increased and the destructive interference of the sound may be reduced. As a result, the volume at the listening position may be increased after the baffle is added. When L is large, the listening position may be far away from the baffle. The baffle may have a small effect on the acoustic route difference between the point source a1 and the point source a2 to the listening position. As a result, a volume change at the listening position may be small after the baffle is added.

As described above, by designing positions of the sound guiding holes on the acoustic output apparatus, an auricle of a human body may serve as a baffle to separate different sound guiding holes when the user wears the acoustic output apparatus. In this case, a structure of the acoustic output apparatus may be simplified, and an output effect of the acoustic output apparatus may be further improved. In some embodiments, the positions of the two sound guiding holes may be designed so that a ratio of a distance between the sound guiding hole on the front side of the auricle and the auricle (or a contact point on the acoustic output apparatus for contact with the auricle) to a distance between the two sound guiding holes may be less than or equal to 0.5 when the user wears the acoustic output apparatus. Preferably, the ratio may be less than or equal to 0.3. More preferably, the ratio may be less than or equal to 0.1. In some embodiments, the ratio of the distance between the sound guiding hole on the front side of the auricle and the auricle (or a contact point on the acoustic output apparatus for contact with the auricle) to the distance between the two sound guiding holes may be larger than or equal to 0.05. In some embodiments, a second ratio of the distance between the two sound guiding holes to the height of the auricle may be larger than or equal to 0.2. In some embodiments, the second ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output apparatus may have a certain effect on the volumes of the near-field sound and far-field sound leakage. The acoustic route may be changed by adjusting a cavity length between a vibration diaphragm in the acoustic output apparatus and the sound guiding hole. In some embodiments, the acoustic driver may include a vibration diaphragm. The front and rear sides of the vibration diaphragm may be coupled to two sound guiding holes through a front chamber and a rear chamber, respectively. The acoustic routes from the vibration diaphragm to the two sound guiding holes may be different. In some embodiments, a ratio of the lengths of the acoustic routes between the vibration diaphragm and the two sound guiding holes may be, for example, 0.5-2, 0.6-1.5, or 0.8-1.2.

In some embodiments, on the premise of keeping the phases of the sounds generated at the two sound guiding holes opposite, the amplitudes of the sounds generated at the two sound guiding holes may be changed to improve the output effect of the acoustic output apparatus. Specifically, impedances of acoustic routes connecting the acoustic driver and the two sound guiding holes may be adjusted so as to adjust the sound amplitude at each of the two sound guiding holes. In some embodiments, the impedance may refer to a resistance that a medium needs to overcome during displacement when acoustic waves are transmitted. The acoustic routes may or may not be filled with a damping material (e.g., a tuning net, a tuning cotton, etc.) so as to adjust the sound amplitude. For example, a resonance cavity, a sound hole, a sound slit, a tuning net, and/or a tuning cotton may be disposed in an acoustic route so as to adjust the acoustic resistance, thereby changing the impedances of the acoustic route. As another example, an aperture of each of the two sound guiding holes may be adjusted to change the acoustic resistance of the acoustic routes corresponding to the two sound guiding holes. In some embodiments, a ratio of the acoustic impedance of the acoustic route between the acoustic driver (the vibration diaphragm) and one of the two sound guiding holes to the acoustic route between the acoustic driver and the other sound guiding hole may be 0.5-2 or 0.8-1.2.

It should be noted that the above description is only for the convenience of description, and is not intended to limit the present disclosure. It should be understood that, for those skilled in the art, after understanding the principle of the present disclosure, they may make various modifications and changes in the forms and details of the acoustic output apparatus without departing from violating this principle. For example, the listening position may not be on the line connecting the two-point sound source, but may also be above, below, or in an extension direction of the line connecting the two-point sound sources. As another example, a measurement method of the distance from a point sound source to the auricle, and a measurement method of the height of the auricle may also be adjusted according to different scenarios. These similar changes may be all within the protection scope of the present disclosure.

Figure 37:
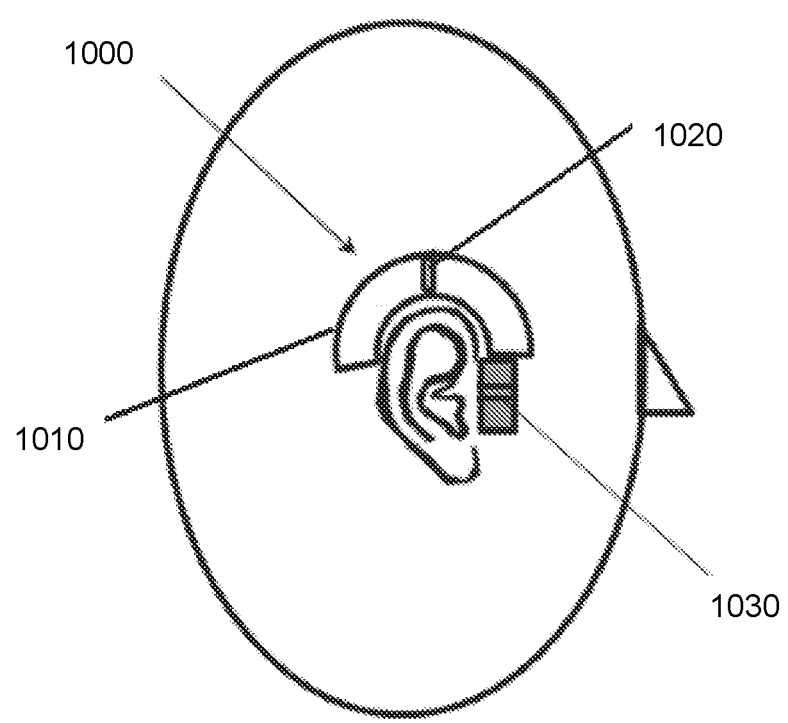
FIG. 37 is a schematic diagram illustrating another exemplary acoustic output apparatus according to some embodiments of the present disclosure.

FIG. 37 is a schematic diagram illustrating another exemplary acoustic output apparatus according to some embodiments of the present disclosure.

For human ears, the frequency band of sound that can be heard may be concentrated in a mid-low-frequency band. An optimization goal in the mid-low-frequency band may be to increase a volume of the sound heard by the user. If the listening position is fixed, parameters of the two point sources may be adjusted such that the volume of the sound heard by the user may increase significantly while a volume of leaked sound may be substantially unchanged (an increase in the volume of the sound heard by the user may be greater than an increase in the volume of the sound leakage). In a high-frequency band, a sound leakage reduction effect of the two-point sound sources may be weaker. In the high-frequency band, an optimization goal may be to reduce sound leakage. The sound leakage may be further reduced and a leakage-reducing frequency band may be expanded by adjusting the parameters of the two-point sound sources of different frequencies. In some embodiments, the acoustic output apparatus 1000 may also include an acoustic driver 1030. The acoustic driver 1030 may output sound from two of second sound guiding holes. Details regarding the acoustic driver 1030, the second sound guiding holes, and a structure therebetween may be described with reference to the acoustic driver 1020 and the first sound guiding holes. In some embodiments, the acoustic driver 1030 and the acoustic driver 1020 may output sounds of different frequencies, respectively. In some embodiments, the acoustic output apparatus may further include a controller configured to cause the acoustic driver

1020 to output sound in the first frequency range, and to cause the acoustic driver 1030 to output sound in the second frequency range, wherein the second frequency range may include frequencies higher than the first frequency range. For example, the first frequency range may be 100 Hz-1000 Hz, and the second frequency range may be 1000 Hz-10000 Hz.

In some embodiments, the acoustic driver 1020 may be a low-frequency speaker, and the acoustic driver 1030 may be a mid-high-frequency speaker. Due to different frequency response characteristics of the low-frequency speaker and the mid-high-frequency speaker, frequency bands of the output sound may also be different. High-frequency bands and low-frequency bands may be divided by using the low-frequency speakers and the mid-high-frequency speakers, and accordingly, low-frequency tow-point sound sources and mid-high-frequency two-point sound sources may be constructed to perform near-field sound output and a far-field leakage reduction. For example, the acoustic driver 1020 may provide two-point sound sources for outputting low-frequency sound through the sound guiding hole 1011 and the sound guiding hole 1012, which may be mainly used for outputting sound in low-frequency bands. The low-frequency two-point sound sources may be distributed on both sides of an auricle to increase a volume near the near-field ear. The acoustic driver 1030 may provide two-point sound sources for outputting mid-high-frequency bands through two of the second sound guiding holes. A mid-high-frequency sound leakage may be reduced by adjusting a distance between the two second sound guiding holes. The mid-high-frequency two-point sound sources may be distributed on both sides of the auricle or on the same side of the auricle. Alternatively, the acoustic driver 1020 may provide two-point sound sources for outputting full-frequency sound through the sound guiding hole 1011 and the sound guiding hole 1012 so as to further increase the volume of the near-field sound.

Further, a distance d2 between the two second sound guiding holes may be less than a distance d1 between the sound guiding hole 1011 and the sound guiding holes 1012, that is, d1 may be larger than d2. For illustration purpose, as shown in FIG. 9, it may be possible to obtain stronger sound leakage reduction capabilities than a single-point sound source and one set of two-point sound sources by setting two sets of two-point sound sources including one set of low-frequency two-point sound sources and one set of high-frequency two-point sound sources with different distances.

It should be noted that the position of the sound guiding holes of the acoustic output apparatus may be not limited to the case that the two sound guiding holes 1011 and 1012 corresponding to the acoustic driver 1020 shown in FIG. 37 are distributed on both sides of the auricle, and the case that the two sound guiding holes corresponding to the acoustic driver 1030 are distributed on the front side of the auricle. For example, in some embodiments, two second sound guiding holes corresponding to the acoustic driver 1030 may be distributed on the same side of the auricle (e.g., a rear side, an upper side, or a lower side of the auricle). As another example, in some embodiments, the two second sound guiding holes corresponding to the acoustic driver 1030 may be distributed on both sides of the auricle. In some embodiments, when the sound guiding holes 1011 and the sound guiding hole 1012 (and/or the two second sound guiding holes) are located on the same side of the auricle, a baffle may be disposed between the sound guiding holes 1011 and the sound guiding hole 1012 (and/or the two second sound guiding holes) so as to further increase the near-field sound volume and reduce the far-field sound leakage. For a further example, in some embodiments, the two sound guiding holes corresponding to the acoustic driver 1020 may also be located on the same side of the auricle (e.g., a front side, a rear side, an upper side, or a lower side of the auricle).

In practical applications, the acoustic output apparatus may include different product forms such as bracelets, glasses, helmets, watches, clothing, or backpacks, smart headsets, etc. In some embodiments, an augmented reality technology and/or a virtual reality technology may be applied in the acoustic output apparatus so as to enhance a user's audio experience. For illustration purposes, a glass with a sound output function may be provided as an example. Exemplary glasses may be or include augmented Reality (AR) glasses, virtual reality (VR) glasses, etc.

Figure 38:
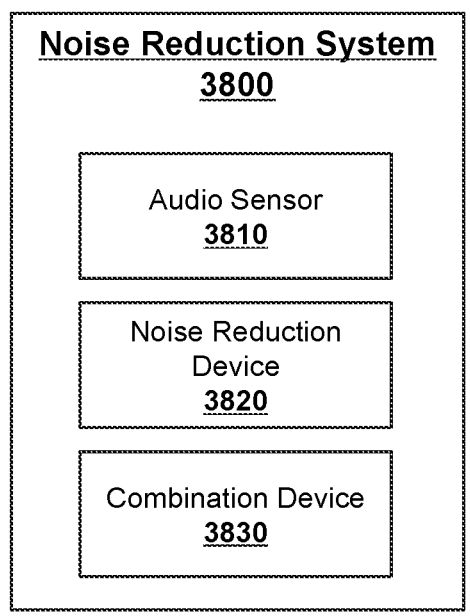
FIG. 38 is a schematic diagram illustrating an exemplary acoustic output apparatus customized for augmented reality according to some embodiments of the present disclosure.

FIG. 38 is a schematic diagram illustrating an exemplary noise reduction system 3800 according to some embodiments of the present disclosure. The noise reduction system 3800 may be used to reduce or eliminate noise (e.g., an unwanted sound that is unpleasant, loud, or disruptive to hearing). For example, the noise may include a background sound, such as traffic noise, wind noise, water noise, foreign speech. The noise reduction device 3800 may be applied in various areas and/or devices, such as a headphone (e.g., a noise-canceling headphone, a bone conduction headphone), a smart device (e.g., a smart glass like an AR/VR glass), a muffler, an anti-snoring device, or the like, or any combination thereof. The AR/VR glass may include a frame and lenses. The AR/VR glass may be provided with a plurality of components which may implement different functions. Details regarding structures and components of the AR/VR glass may be described with reference to the glass 100 illustrated in FIG. 48. In some embodiments, the noise reduction device 3800 may be an active noise reduction device that reduces a noise by generating a noise reduction signal designed to reduce the noise (e.g., a signal that has an inverted phase to the noise). In some embodiments, the noise reduction system 3800 may be a passive noise reduction system that reduces noise by differentiating sound signals collected by two microphone arrays at different positions.

As shown in FIG. 38, the noise reduction system 3800 may include an audio sensor 3810, a noise reduction device 3820, and a combination device 3830. As used herein, a connection between two components of the noise reduction system 3800 may include a wireless connection, a wired connection, any other communication connection that can enable data transmission and/or reception, and/or any combination of these connections. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. The wired connection may include, for example, a coaxial cable, a communication cable (e.g., a telecommunication cable), a flexible cable, a spiral cable, a non-metallic sheath cable, a metal sheath cable, a multi-core cable, a twisted-pair cable, a ribbon cable, a shielded cable, a double-strand cable, an optical fiber, an electrical cable, an optical cable, a telephone wire, or the like, or any combination thereof.

The audio sensor 3810 may detect a sound from the user, a smart device 4240, and/or ambient environment, and generate a plurality of sub-band sound signals in response to the detected sound. In some embodiments, the one or more microphones or microphone arrays may be generic microphones. In some embodiments, the one or more microphones or the microphone array may be customized to the augmented reality or the virtual reality. The audio sensor 3810 may include one or more microphones or a microphone array. In some embodiments, the audio sensor 3810 may include one or more low-frequency microphones and one or more high-frequency microphones. The low-frequency microphones may be used to collect a low-frequency sound signal. The high-frequency microphones may be used to collect a high-frequency sound signal. In some embodiments, the low-frequency microphone and the high-frequency microphone may be integrated into a single component. For example, the low-frequency microphones and/or the high-frequency microphones may be integrated into a centralized microphone array in the form of a straight line or a ring. In some embodiments, the low-frequency microphones and/or the high-frequency microphones may be distributedly arranged in a device (e.g., the AR/VR glass) to form a distributed microphone array. For example, the low-frequency microphones and/or the high-frequency microphones may be disposed at various positions of the device, and the microphones may be wirelessly connected.

In some embodiments, each microphone in the audio sensor 3810 may be used to detect a sound (which may include both desired sound and a noise) and generate one or more sub-band voice signals. In some embodiments, each microphone in the microphone array 3810 may be connected to a filter, which is configured to generate the one or more sub-band sound signals by processing the detected sound. A sound signal may have a specific frequency band. A sub-band sound signal refers to a signal having a frequency band narrower than and within the frequency band of the sound signal. For example, the sound signal may have a frequency band ranging from 10 Hz to 30 kHz. The frequency band of a sub-band noise signal may be 100-200 HZ, which is within the frequency band of the sound signal. In some embodiments, a combination of the frequency bands of the sub-band noise signals may cover the frequency band of the sound. Additionally or alternatively, at least two of the sub-band sound signals may have different frequency bands. Optionally, each of the sub-band sound signals may have a distinctive frequency band different from the frequency band(s) of the other sub-band sound signal(s). Different sub-band sound signals may have the same frequency bandwidth or different frequency bandwidths. In some embodiments, an overlap between the frequency bands of a pair of adjacent sub-band sound signals in the frequency domain may be avoided, so as to improve the noise reduction effect. As used herein, two sub-band sound signal whose center frequencies are adjacent to each other among the sub-band sound signals may be regarded as being adjacent to each other in the frequency domain. More descriptions regarding the frequency bands of a pair of adjacent sub-band sound signals may be found elsewhere in the present disclosure. See, e.g., FIGS. 40A and 40B and relevant descriptions thereof.

In some embodiments, the sub-band noise signals generated by the audio sensor 3810 may be digital signals or analog signals. In some embodiments, each microphone in the audio sensor 3810 may be a Micro Electro Mechanical System (MEMS) microphone. The MEMS microphone may have a low operating current, stable performance, and high voice quality. In some embodiments, all or a portion of the microphones in the audio sensor 3810 may be other types of microphones, which is not limited herein.

The noise reduction device 3820 may be configured to reduce or eliminate the noise in the sub-band sound signals generated by the audio sensor 3810. In some embodiments, the noise reduction device 3820 may perform noise estimation, adaptive filtering, audio enhancement, and the like, on the sub-band sound signals, thereby realizing noise reduction in the sub-band sound signals. For each of the sub-band sound signals, the noise reduction device 3820 may determine a sub-band noise signal according to a noise estimation algorithm, and generate a sub-band noise correction signal according to the sub-band noise signal. For example, the sub-band noise correction signal may be an analog signal or a digital signal having an inverted phase to the sub-band noise signal. In some embodiments, the noise estimation algorithm may include a time-recursive average noise estimation algorithm, a minimum tracking noise estimation algorithm, or the like, or a combination thereof. The noise reduction device 3820 may further generate a target sub-band voice signal based on the sub-band voice signal and the sub-band noise correction signal, thereby reducing the noise in the corresponding sub-band sound signals. In some embodiments, the audio sensor 3810 may include at least one pair of low-frequency microphones and at least one pair of high-frequency microphones. Each pair of the microphones may generate a sub-band sound signal within a frequency band of the corresponding pair of the microphones. For illustration, a pair of microphones including a first microphone closer to a main sound source (e.g., the mouth of a user) and a second microphone farther away from the main sound source is taken as an example to describe the noise reduction of noise reduction device 3820. The noise reduction device 3820 may take a sound signal generated by the first microphone as a sub-band sound signal, and another sound signal generated by the second microphone as a sub-band noise signal. The noise reduction device 3820 may further reduce the noise in the sub-band sound signal and generate the target sub-band voice signal by differentiating the sub-band sound signal and the sub-band noise signal. More descriptions regarding the noise reduction device 3820 and the sub-band noise signal may be found elsewhere in the present disclosure. See, e.g., FIGS. 39A, 41, and FIG. 42 and relevant descriptions thereof.

The combination device 3830 may be configured to combine the target sub-band voice signal to generate a target signal. The combination device 3830 may include any component that can combine a plurality of signals. For example, the combination device 3830 may generate a mixed signal (i.e., the target signal) according to a signal combination technique, such as a frequency division multiplexing technique.

It should be noted that the above descriptions of the noise reduction device 3800 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the noise reduction system 3800 may include one or more additional components. Additionally or alternatively, one or more components of the noise reduction system 3800 described above may be omitted. For example, a residual noise reduction device may be added to the noise reduction device 3820. In addition, two or more components of the noise reduction system 3800 may be integrated into a single component. Merely by way of example, in the noise reduction system 3800, the combination device 3830 may be integrated into the noise reduction device 3820.

Figure 39A:
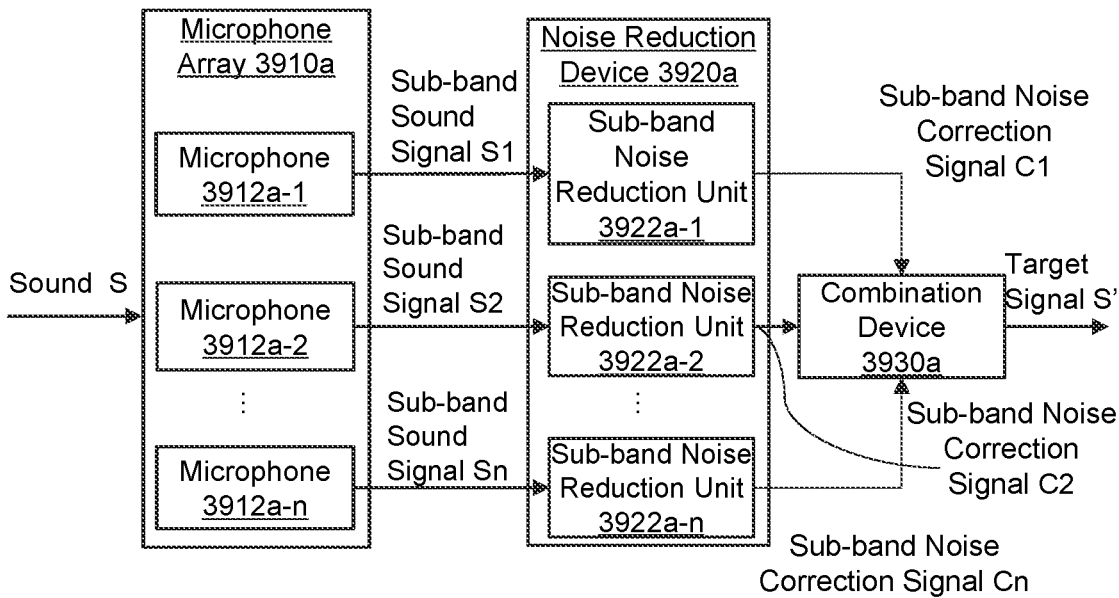
FIGS. 39A and 39B are schematic diagrams illustrating exemplary noise reduction systems according to some embodiments of the present disclosure.

FIG. 39A is a schematic diagram illustrating an exemplary noise reduction system 3900A according to some embodiments of the present disclosure. As shown in FIG. 39A, the noise reduction system 3900A may include a microphone array 3910a, a noise reduction device 3920a, and a combination device 3930*a*. The microphone array 3910*a* may include a plurality of microphones 3912*a*, for example, a microphone 3912*a*-1, a microphone 3912*a*-2, . . . , a microphone 3912*a*-*n*. The "n" may be any positive integer greater than 1, such as 5, 10, 15, or the like. The microphone array 3910*a* may be configured to detect a sound S, and generate a plurality of sub-band noise signals (e.g., sub-band sound signals S1 to Sn). A count (i.e., n) of microphones 3912*a* may be equal to a count of sub-band sound signals. The count of sub-band speech signals (i.e., n) may be related to a frequency band of the sound S and a frequency band of the generated sub-band speech signals. For example, a certain count of microphones 3912*a* may be used generate the plurality of sub-band sound signals, so that a combination of frequency bands of the sub-band sound signals may cover the frequency band of the sound S. Optionally, an overlap between the frequency bands of any pair of adjacent sub-band noise signals in the frequency domain may be avoided, so as to improve the noise reduction effect.

The microphone 3912*a* may have different frequency responses and may be configured to generate a sub-band sound signal by processing the sound S. For example, the microphone 3912*a*-1 may respond to a sound with a frequency of 20 Hz to 3 kHz. Then microphone 3912*a*-1 may generate a sub-band sound signal with a frequency range of 20 Hz to 3 kHz by processing a full-band (for example, 2 Hz to 30 kHz) sound S. In some embodiments, the sub-band sound signal generated by the microphone array 3910*a* may be a digital signal or an analog signal.

In some embodiments, the microphone 3912*a* may include an acoustic channel element and a sound-sensitive component. The acoustic channel component may form a path through which a sound S (e.g., the target sound signal and the noise mentioned in FIG. 38) is transmitted to a sound-sensitive component. For example, the acoustic channel component may include one or more chamber structures, one or more pipe structures, or the like, or a combination thereof. The sound-sensitive component may convert a sound S (for example, the original sound S or processed sound after passing through the acoustic channel component)) sent from the acoustic channel component into an electric signal. For example, the sound-sensitive component may include a diaphragm, a plate, a cantilever, etc. Taking the diagram as an example, the diaphragm may be used to convert a change of sound pressure caused by a sound signal on the diaphragm surface into a mechanical vibration of the diaphragm. The sound-sensitive component may be made of one or more materials including, for example, plastic, metal, piezoelectric material, or the like, or any composite material.

In some embodiments, the frequency response of the microphone 3912*a* may be associated with the acoustic structure of the acoustic channel component of the microphone 3912*a*. For example, the acoustic channel component of the microphone 3912*a* may have a specific acoustic structure, which may process the sound before it reaches the sound-sensitive component of the microphone 3912*a*. In some embodiments, the acoustic structure of the acoustic channel component may have a specific acoustic impedance, so that the acoustic channel component may function as a filter that filters the sound to generate a sub-band sound. The sound-sensitive component of the microphone 3912*a* may then convert the sub-band sound into a sub-band sound electrical signal.

In some embodiments, the acoustic impedance of the acoustic structure may be set according to the frequency band of the sound. In some embodiments, an acoustic structure mainly including a chamber structure may function as a high-pass filter, while an acoustic structure mainly including a pipe structure that may function as a low-pass filter. Merely by way of example, the acoustic channel component may have a chamber-pipe structure. The chamber-pipe structure may be a combination of a sound capacity and an acoustic mass in serial, and an inductor-capacitor (LC) resonance circuit may be formed. If an acoustic impedance material is used in the chamber-pipe structure, a resistor-inductor-capacitor (RLC) series loop may be formed, and the acoustic impedance of the RLC series loop may be determined according to Equation (5), as follows:

$$Z = R_a + j\left(\omega M_a - \frac{1}{\omega C_a}\right), \tag{5}$$

where Z refers to the acoustic impedance of the acoustic channel component, ω refers to an angular frequency of the chamber-pipe structure, j refers to a unit imaginary number, $M_a$ refers to the acoustic mass, $C_a$ refers to the sound capacity, and $R_a$ refers to the acoustic resistance of the RLC series loop.

The chamber-pipe structure may function as a band-pass filter (denoted as F1). The bandwidth of the band-pass filter F1 may be adjusted by adjusting the acoustic resistance $R_a$. The center frequency $\omega_0$ of the band-pass filter F1 may be adjusted by adjusting the acoustic mass $M_a$ and/or the sound capacity $C_a$. For example, the center frequency $\omega_0$ of the band-pass filter F1 may be determined according to Equation (6) as below:

$$\omega_0 = \sqrt{M_a C_a}. \tag{6}$$

In some embodiments, the frequency response of a microphone 3912*a* may be associated with a physical characteristic (e.g., the material, the structure) of the sound-sensitive component of the microphone 3912*a*. The sound-sensitive component having a specific physical characteristic may be sensitive to a certain frequency band of the sound. For example, the mechanical vibration of one or more elements in the sound-sensitive component may lead to change(s) in electric parameter(s) of the sound-sensitive component. The sound-sensitive component may be sensitive to a certain frequency band of a sound signal. The frequency band of the sound signal may cause corresponding changes in electric parameters of the sound-sensitive component. In other words, the diagram may function as a filter that processes a sub-band of the sound S. In some embodiments, the sound S may be transmitted to the sound-sensitive component through the acoustic channel component without (or substantially without) being filtered by the acoustic channel component. The physical characteristic of the sound-sensitive component may be adjusted, such that the sound-sensitive component may function as a filter that filter the sound S and convert the filtered sound into a sub-band sound electrical signal.

Merely by way of example, the sound-sensitive component may include a diaphragm, which may function as a band-pass filter (denoted as F2). The center frequency $\omega'_0$ of the band-pass filter F2 may be determined according to Equation (7) as below:

$$\omega'_0 = \sqrt{\frac{K_m}{M_m}}, \qquad (7)$$

where $M_m$ refers to the mass of the diaphragm, and $K_m$ refers to the elasticity coefficient of the diaphragm. $R_m$ refers to a damping of the diaphragm. The bandwidth of the band-pass filter F2 may be adjusted by adjusting $R_m$. The center frequency $\omega'_0$ of the band-pass filter F2 may be adjusted by adjusting the mass of the diaphragm and/or the elasticity coefficient of the diaphragm.

As described above, the acoustic channel component or the sound-sensitive component of the microphone 3912a may function as a filter. The frequency response of the acoustic-electric transducer 610 may be adjusted by modifying parameter(s) of the acoustic channel component (e.g. $R_a$, $M_a$, and/or $C_a$) or parameter(s) the sound-sensitive component (e.g. $K_m$, and/or $R_m$). In some alternative embodiments, a combination of the acoustic channel component and the sound-sensitive component may function as a filter. By modifying parameters of the acoustic channel component and the sound-sensitive component, the frequency response of the combination of the acoustic channel component and the sound-sensitive component may be adjusted accordingly. More descriptions regarding the acoustic channel component and/or the sound-sensitive component which function as a band-pass filter may be found in, for example, PCT Application No. PCT/CN2018/105161 filed on Sep. 12, 2018 entitled "SIGNAL PROCESSING DEVICE HAVING MULTIPLE ACOUSTIC-ELECTRIC TRANSDUCERS," the contents of which are hereby incorporated by reference.

The sub-band noise reduction device 3920a may include a sub-band noise reduction unit 3922a-1, a sub-band noise reduction unit 3922a-2, ..., and a sub-band noise reduction unit 3922a-n as shown in FIG. 39A. In some embodiments, the count (or number) of the sub-band noise reduction units 3922a may be equal to the count (or number) of the sub-band noise signals generated by the microphones 3912a. Each of the sub-band noise reduction units 3922a may be configured to receive one of the sub-band sound signals from the microphones 3912a, and generate a sub-band noise correction signal for reducing a noise (also referred to as a sub-band noise) in the received sub-band sound signal. For example, as shown in FIG. 39A, a sub-band noise reduction module 3922a-i (i being a positive integer equal to or smaller than n) may receive a sub-band sound signal Si from the microphones 3912a and generate a sub-band noise correction signal Ci for reducing the noise in the sub-band sound signal Si. In some embodiments, the sub-band noise reduction unit 3922a may include a sub-band noise estimation sub-unit (not shown) and a sub-band noise suppression sub-unit (not shown). The sub-band noise estimation sub-unit may be configured to estimate noise in a sub-band sound signal. The sub-band noise suppression sub-unit may be configured to receive the noise in the sub-band sound signal from the sub-band noise estimation sub-unit, and generate a sub-band noise correction signal to reduce a sub-band noise in the sub-band sound signal.

In some embodiments, the sub-band sound signals may be transmitted via parallel transmitters from the microphones 3912a to the sub-band noise reduction units 3922a. Optionally, a sub-band sound signal may be transmitted via a transmitter according to a certain communication protocol for transmitting digital signals. Exemplary communication protocols may include AES3 (audio engineering society), AES/EBU (European broadcast union)), EBU (European broadcast union), ADAT (Automatic Data Accumulator and Transfer), I2S (Inter-IC Sound), TDM (Time Division Multiplexing), MIDI (Musical Instrument Digital Interface), CobraNet, Ethernet AVB (Ethernet Audio/VideoBridging), Dante, ITU (International Telecommunication Union)-T G.728, ITU-T G.711, ITU-T G.722, ITU-T G.722.1, ITU-T G.722.1 Annex C, AAC (Advanced Audio Coding)-LD, or the like, or a combination thereof. The digital signal may be transmitted in a certain format including a CD (Compact Disc), WAVE, AIFF (Audio Interchange File Format), MPEG (Moving Picture Experts Group)-1, MPEG-2, MPEG-3, MPEG-4, MIDI (Musical Instrument Digital Interface), WMA (Windows Media Audio), RealAudio, VQF (Transform-domain Weighted Nterleave Vector Quantization), AMR (Adaptibve Multi-Rate), APE, FLAC (Free Lossless Audio Codec), AAC (Advanced Audio Coding), or the like, or a combination thereof. In some alternative embodiments, the sub-band sound signals may be processed to a single-channel signal using, e.g., a frequency-division multiplexing technique, and transmitted to the sub-band noise reduction units 3922a.

In some embodiments, the sub-band noise reduction unit 3922a-i may first estimate a sub-band noise signal $N_i$, and perform a phase modulation and/or an amplitude modulation on the sub-band noise signal $N_i$ to generate the corresponding sub-band noise correction signal $N_i'$. In some embodiments, the phase modulation and the amplitude modulation may be performed in sequence or simultaneously on the sub-band noise signal $N_i'$. For example, the sub-band noise reduction unit 3922a-i may first perform a phase modulation on the sub-band noise signal $N_i$ to generate a phase modulated signal, and then perform an amplitude modulation on the phase modulated signal to generate the corresponding sub-band noise correction signal $N_i'$. The phase modulation of the sub-band noise signal $N_i$ may include an inversion of the phase of the sub-band noise signal $N_i$. Optionally, in some embodiments, a phase displacement (or shift) of the sub-band noise may occur during its transmission from a location at the microphone 3912a to a location at the sub-band noise reduction unit 3922a-i. The phase modulation of the sub-band noise signal $N_i$ may further include a compensation of the phase displacement of the sub-band noise signal $N_i$ during signal transmission. Alternatively, the sub-band noise reduction unit 3922a-i may first perform an amplitude modulation on the sub-band noise signal $N_i$ to generate an amplitude modulated signal, and then perform a phase modulation on the amplitude modulated signal to generate the sub-band noise correction signal More descriptions regarding the sub-band noise reduction unit 3922a-i may be found elsewhere in the present disclosure. See, e.g., FIGS. 41 to 42 and relevant descriptions thereof.

In some embodiments, the noise reduction device 3920a may perform noise reduction using two sets of microphones (e.g., two microphone arrays 3910a) having the same configuration according to the dual microphone noise reduction principle. Each set of microphones may include a plurality of microphones that may generate a plurality of sub-band sound signals having different frequency bands. For illustration, the two sets of microphones with the same configuration may be referred to as a first microphone set and a second microphone set. The first microphone set may be closer to a main sound source (e.g., the mouth of a user) than the second microphone set. Each first microphone in the first microphones set may correspond to one second microphones in the second microphone set. For example, a first microphone having a frequency band of 20 Hz to 3 kHz may correspond to a second microphone having a frequency band of 20 Hz to 3 kHz. A signal generated by the first microphone may be used as a sub-band sound signal, and a signal generated by the second microphone may be used as a sub-band noise signal. The noise reduction device 3920a may generate a target sub-band sound signal based on the sub-band voice signal and the sub-band noise signal. More descriptions regarding the noise reduction using two microphone arrays may be found elsewhere in the present disclosure. See, e.g., FIG. 46 and relevant descriptions thereof.

The combination device 3930a may be configured to combine the target sub-band sound signals to generate a target signal S'.

Figure 39B:
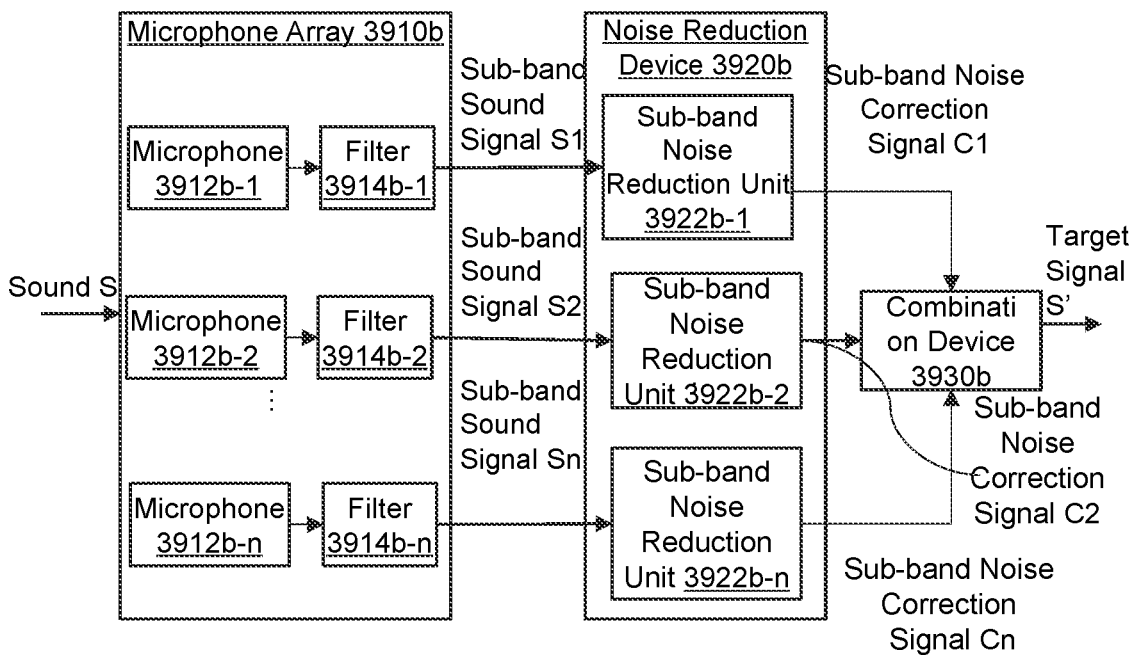

FIG. 39A is a schematic diagram illustrating another exemplary noise reduction system 3900B according to some embodiments of the present disclosure. The noise reduction device 3900B may be similar to the noise reduction device 3900A, except for certain components or features. As shown in FIG. 39B, the noise reduction system 3900B may include a microphone array 3910b, a noise reduction device 3920b, and a combination device 3930b. The microphone array 3910b may include a plurality of microphones 3912b and a plurality of filters 3914b. A count of microphones 3912b, a count of filters 3914b, and a count of sub-band voice signals may be equal. The microphones 3912b may have the same configuration. In other words, each microphone 3912b may have the same frequency response. Each microphone 3912b may be coupled to a filter 3914b. The filter 3914b may have different frequency responses to the sound S. The microphone array 3910b may detect the sound S by the microphones 3912b, and generate a plurality of sub-band sound signals by the corresponding filter 3914b in response to the detected sound S. Exemplary filters 3914b may include passive filters, active filters, analog filters, digital filters, or the like, or a combination thereof.

The noise reduction device 3920b may include a plurality of sub-band noise reduction units 3922b. Each sub-band noise reduction unit 3922b may be coupled to a filter 3914b (or a microphone 3912b). The noise reduction device 3920b may have the same configuration and function as that of the noise reduction device 3920a, and the combination device 3930b may have the same configuration and function as that of the combination device 3930a. More descriptions regarding the noise reduction device 3920b and the combination device 3930b may be found elsewhere in the present disclosure. See, e.g., FIG. 39A and relevant descriptions thereof.

It should be noted that the above descriptions of the noise reduction device 3900A and 3900B are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the noise reduction system 3900A and/or 3900B may include one or more additional components. Additionally or alternatively, one or more components of the noise reduction system 3900A and/or 3900B described above may be omitted. In addition, two or more components of the noise reduction system 3800A and/or 3900B may be integrated into a single component.

Figure 40A:
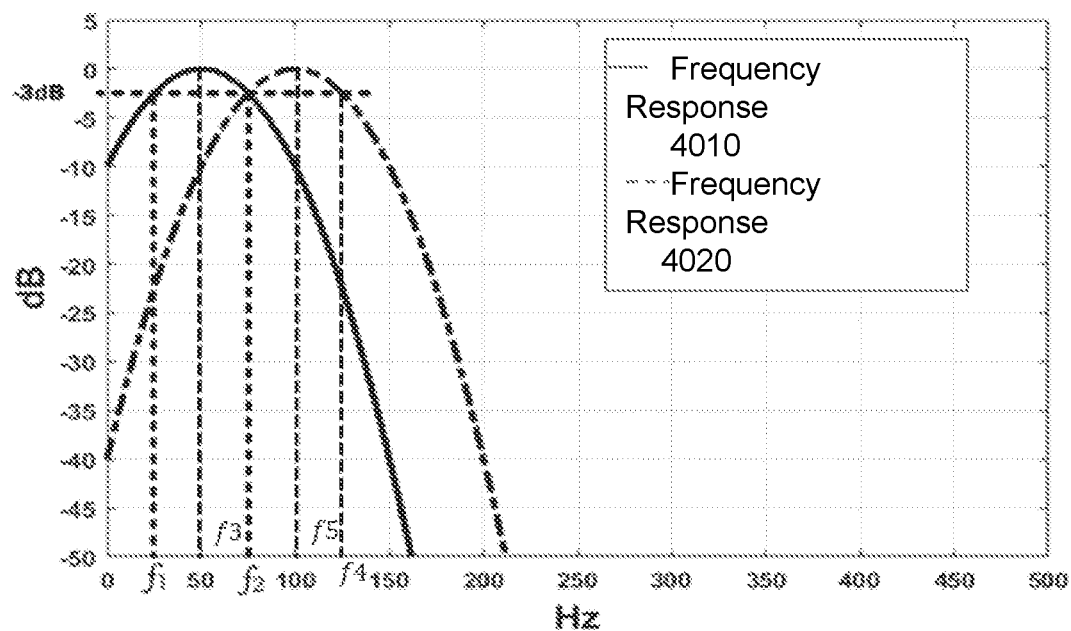
FIGS. 40A and 40B illustrate exemplary frequency responses of a third microphone and exemplary frequency responses of a fourth microphone according to some embodiments of the present disclosure.
Figure 40B:
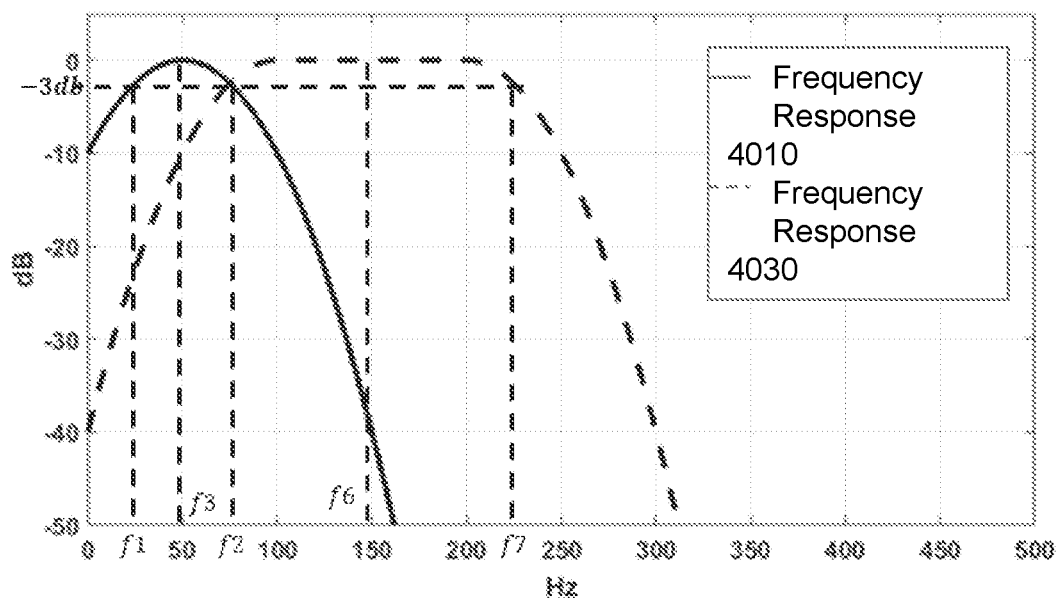

FIG. 40A illustrates an exemplary frequency response 4010 of a third microphone and an exemplary frequency response 4020 of a fourth microphone according to some embodiments of the present disclosure. FIG. 40B illustrates the frequency response 4010 of the third microphone and another exemplary frequency response 4030 of the fourth microphone according to some embodiments of the present disclosure. The third microphone may be configured to process a sound to generate a first sub-band sound signal. The fourth microphone may be configured to process a sound to generate a second sub-band sound signal. The second sub-band sound signal may be adjacent to the first sub-band sound signal in the frequency domain.

In some embodiments, the frequency responses of the third and fourth microphone s may have the same frequency bandwidth. For example, as shown in FIG. 40A, the frequency response 4010 of the third microphone has a lower half-power point $f_1$, an upper half-power point $f_2$, and a center frequency $f_3$. As used herein, a half power point of a certain frequency response may refer to a frequency point with a specific attenuation of power level (e.g., −3 Db). The frequency bandwidth of the frequency response 4010 may be equal to a difference between $f_2$ and $f_1$. The frequency response 4020 of the fourth microphone has a lower half-power point $f_2$, an upper half-power point $f_4$, and a center frequency $f_5$. The frequency bandwidth of the frequency response 4020 may be equal to a difference between $f_4$ and $f_2$. The frequency bandwidths of the third and fourth microphones may be equal to each other.

Alternatively, the frequency responses of the third and fourth microphones may have different frequency bandwidths. For example, as shown in FIG. 40B, the frequency response 4030 of the fourth microphone has a lower half-power point $f_2$, an upper half-power point $f_7$ (which is greater than $f_4$), and a center frequency $f_6$. The frequency bandwidth of the frequency response 4030 of the fourth microphone may be equal to a difference between $f_7$ and $f_2$, which may be greater than that of the frequency response 4010 of the third microphone. In this way, fewer microphones may be needed in the microphones 3910a to generate a plurality of sub-band sound signals to cover the frequency band of the original sound (i.e., the sound S).

In some embodiments, the frequency responses of the third microphone and the fourth microphone may intersect at a certain frequency point, which may cause a certain overlap between the third and fourth frequency responses. Ideally, there may be no overlap between the frequency response of the third and fourth microphones. However, in practice, there may be a certain overlap range, which may cause an overlap between the frequency bands of the first and second sub-band sound signals in the frequency domain, further affecting the quality of the first and second sub-band sound signals. For example, the larger the overlap range, the lower the quality of the first and second sub-band sound signals may be.

In some embodiments, the certain frequency point at which the frequency responses of the third and the fourth microphones intersects may be near a half-power point of the frequency response of the third microphone and/or a half-power point of the frequency response of the fourth microphone. Taking FIG. 40A as an example, the frequency response 4010 and the frequency response 4020 intersect at the upper half-power point $f_2$ of the frequency response 4010, which is also the lower half-power point of the frequency response 4020. As used herein, a frequency point may be considered to be near a half-power point if a power level difference between the frequency point and the half-power point is no larger than a threshold (e.g., 2 Db). In such cases, there may be less loss or repetition of energies in the frequency responses of the third and fourth microphones, which may result in a proper overlap range between the frequency responses of the third and fourth microphones. In some embodiments, the overlap range may be deemed relatively small when the frequency responses intersect at a frequency point with a power level larger than −5 Db and/or smaller than −1 Db. In some embodiments, center frequencies and/or bandwidths of the frequency responses of the third and fourth microphones may be adjusted to obtain a narrower or proper overlap range between the frequency responses of the third and fourth microphones, so as to avoid an overlap between the frequency bands of the first and second sub-band noise signals.

It should be noted that the examples shown in FIGS. 40A and 40B are intended to be illustrative, and not to limit the scope of the present disclosure. For a person having ordinary skill in the art, multiple variations and modifications may be made under the teachings of the present disclosure. However, those variations and modifications do not depart from the scope of the present disclosure. For example, one or more parameters (e.g., the frequency bandwidth, an upper half power point, a lower half power point, and/or a center frequency) of a frequency response of the third microphone and/or the fourth microphone may be variable.

Figure 41:
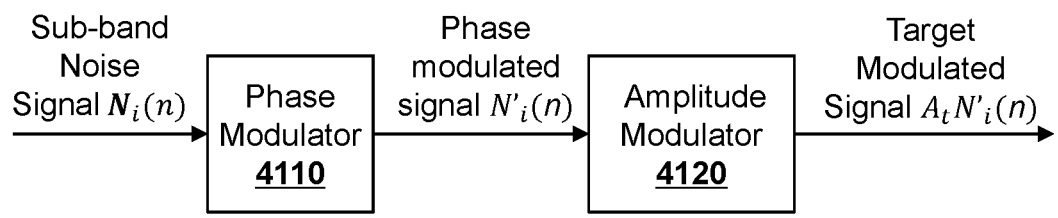
FIG. 41 is a schematic diagram illustrating an exemplary user-interface of an acoustic output apparatus according to some embodiments of the present disclosure.

FIG. 41 is a schematic diagram illustrating an exemplary sub-band noise suppression sub-unit 4100 according to some embodiments of the present disclosure. As described in FIG. 39A, the sub-band noise suppression sub-unit 4100 may be included in the sub-band noise reduction units 3922a. The sub-band noise suppression sub-unit 4100 may be configured to receive a sub-band noise signal $N_i(n)$ from a sub-band noise estimation sub-unit of a sub-band noise reduction unit 3912a or 3912b, and generate a sub-band noise correction signal $A_t N'_i(n)$ for reducing the sub-band noise signal $N_i(n)$. $A_t$ may refer to an amplitude attenuation coefficient relating to a noise to be reduce.

Figure 42:
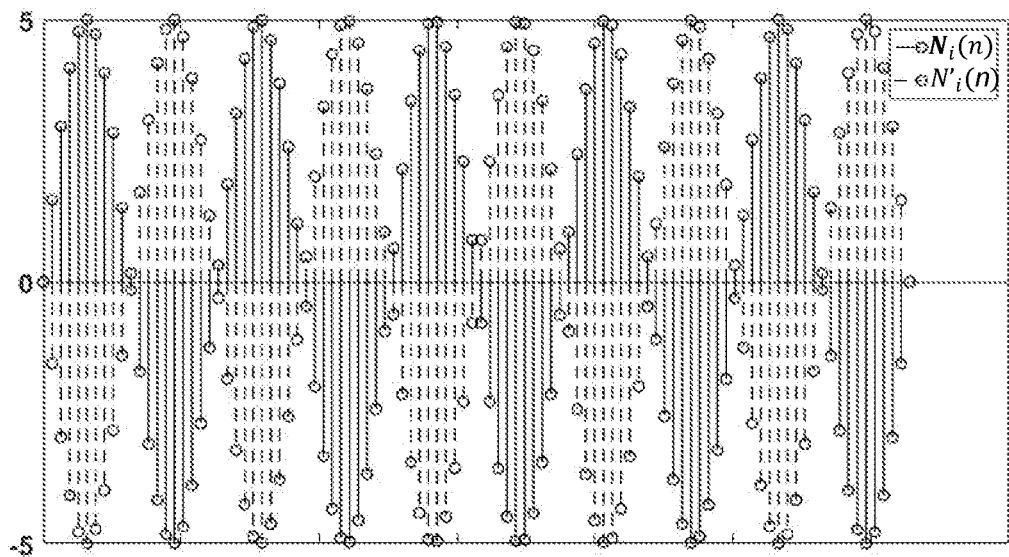
FIG. 42 is a schematic diagram illustrating an exemplary phase-modulated signal according to some embodiments of the present disclosure.

As shown in FIG. 41, the sub-band noise suppression sub-unit 4100 may include a phase modulator 4110 and an amplitude modulator 4120. The phase modulator 4110 may be configured to receive the sub-band noise signal $N_i(n)$ and generate a phase-modulated signal $N'_i(n)$ by inversing the phase of the sub-band noise signal $S_i(n)$. For example, as shown in FIG. 42, the phase-modulated signal $N'_i(n)$ may have an inverted phase to the sub-band noise signal $N_i(n)$. In some embodiments, a phase displacement (or shift) of the noise may occur during its transmission from a location at the microphones 3912a-i to a location at the corresponding sub-band noise reduction unit 3922a-i. In some embodiments, the phase displacement may be neglected. The phase modulator 4110 may generate the phase-modulated signal $N'_i(n)$ by merely performing a phase inversion on the sub-band noise signal $N_i(n)$. A sound may be transmitted in the form of a plane wave in an external auditory canal if a frequency of the sound is lower than a cutoff frequency of the external auditory canal. When a noise is transmitted in a form of a plane wave along a single direction during its transmission from a location at the microphones 3912a-i to a location at the corresponding sub-band noise reduction unit 3922a-i, if the phase displacement is less than a threshold, the phase displacement may be neglected in generating the phase-modulated signal $N_i'(n)$; if the phase displacement is greater than a threshold, a phase compensation may be performed on the sub-band noise signal $N_i(n)$.

Merely by way of example, the phase of the sub-band noise signal $S_i(n)$ may have a phase displacement $\Delta\varphi$ during its transmission from a location at the microphones 3912a-i to a location at the corresponding sub-band noise reduction unit 3922a-i. The phase displacement $\Delta\varphi$ may be determined according to Equation (8) as below:

$$\Delta\varphi = \frac{2\pi f_0}{c}\Delta d,$$ Equation (8)

where $f_0$ may refer to a center frequency of the sub-band noise signal $N_i(n)$, and c may refer to a travelling speed of sound. If the noise is a near-field signal, $\Delta d$ may refer to a difference between a distance from the sound source to the microphones 3912-i and a distance from the sound source to the corresponding sub-band noise reduction unit 3922a-i (or a portion thereof). If the noise 210 is a far-field signal, $\Delta d$ may be equal to d cos θ, wherein d may refer to a distance between the microphones 3912-i and the corresponding sub-band noise reduction unit 3922a-i (or a portion thereof), and θ refers to an angle between the sound source and the microphones 3912-i and the corresponding sub-band noise reduction unit 3922a-i (or a portion thereof).

In order to compensate for the phase displacement $\Delta\varphi$, the phase modulator 4110 may perform a phase inversion as well as a phase compensation on the sub-band noise signal $N_i(n)$ to generate a phase modulated signal. In some embodiments, the phase modulator 710 may include an all-pass filter. A filter function of the all-pass filter may be denoted as H(w), wherein w refers to an angular frequency. In an ideal situation, an amplitude response |H(w)| of the all-pass filter may be equal to 1, and a phase response of all-pass filter may be equal to the phase displacement $\Delta\varphi$. The all-pass filter may delay the sub-band noise signal $S_i(n)$ by a time delay $\Delta T$ to perform the phase compensation, $\Delta T$ may be determined according to Equation (9) as below:

$$\Delta T = \frac{\Delta\varphi}{2\pi f_0} = \frac{\Delta d}{c}.$$ Equation (9)

In such cases, the phase modulator 4110 may perform a phase inversion and a phase compensation on the sub-band noise signal $N_i(n)$ to generate a target modulated signal $A_t N'_i(n)$.

The amplitude modulator 4120 may be configured to receive the phase-modulated signal $N'_i(n)$, and generate the correction signal $A_t N'_i(n)$ by modulating the amplitude of the phase-modulated signal $N'_i(n)$. In some embodiments, an amplitude the noise may attenuate during its transmission. An amplitude attenuation coefficient $A_t$ may be determined to measure the amplitude attenuation of the noise during the transmission. The amplitude attenuation coefficient $A_t$ may be associated with one or more factors including, for example, the material and/or the structure of an acoustic channel component along which the noise is transmitted, a location of the microphones 3912a-i relative to and the corresponding sub-band noise reduction unit 3922a-i, or the like, or any combination thereof. In some embodiments, the amplitude attenuation coefficient $A_t$ may be a default setting of a noise reduction system (e.g., the noise reduction system 3800) or previously determined by an actual or simulated experiment. Merely by way of example, the amplitude attenuation coefficient $A_t$ may be determined by comparing an amplitude of a sound signal near the microphones 3912a-i (e.g., before it enters an audio broadcast device) and an amplitude of the sound signal after it is transmitted to a location at the corresponding sub-band noise reduction unit 3922a-. In some alternative embodiments, the amplitude attenuation of the noise may be neglected, for example, if the amplitude attenuation during the transmission of the noise is smaller a threshold and/or the amplitude attenuation coefficient $A_t$ is substantially equal to 1. In such cases, the phase-modulated signal $N'_i(n)$ may be designated as the sub-band noise correction signal of the sub-band noise signal $N_i(n)$.

The sub-band noise suppression sub-unit 4100 may include a sub-band sound signal generator (not shown). The sub-band sound signal generator may generate a sub-band noise correction sound signal Ci (n) according to the target modulated signal $A_tN'_i(n)$ and the corresponding sub-band sound signal $S_i(n)$, and transmit it to the combination device 3830. The combination device 3830 may combine a plurality of sub-band noise correction into one target signal S'(n) according to Equation (10) as below:

$$S'(n)=\Sigma_{i=1}^{m}C_i(n).$$  Equation (10)

It should be noted that the examples shown in FIGS. 41 and 42 are intended to be illustrative, and not to limit the scope of the present disclosure. For a person having ordinary skill in the art, multiple variations and modifications may be made under the teachings of the present disclosure. However, those variations and modifications do not depart from the scope of the present disclosure. For example, the sub-band noise suppression sub-unit 4100 may include one or more additional components, such as a signal combination unit. Additionally or alternatively, one or more components in the above-mentioned sub-band noise suppression subunit 4100 may be omitted, for example, the amplitude modulator 4120.

Figure 43A:
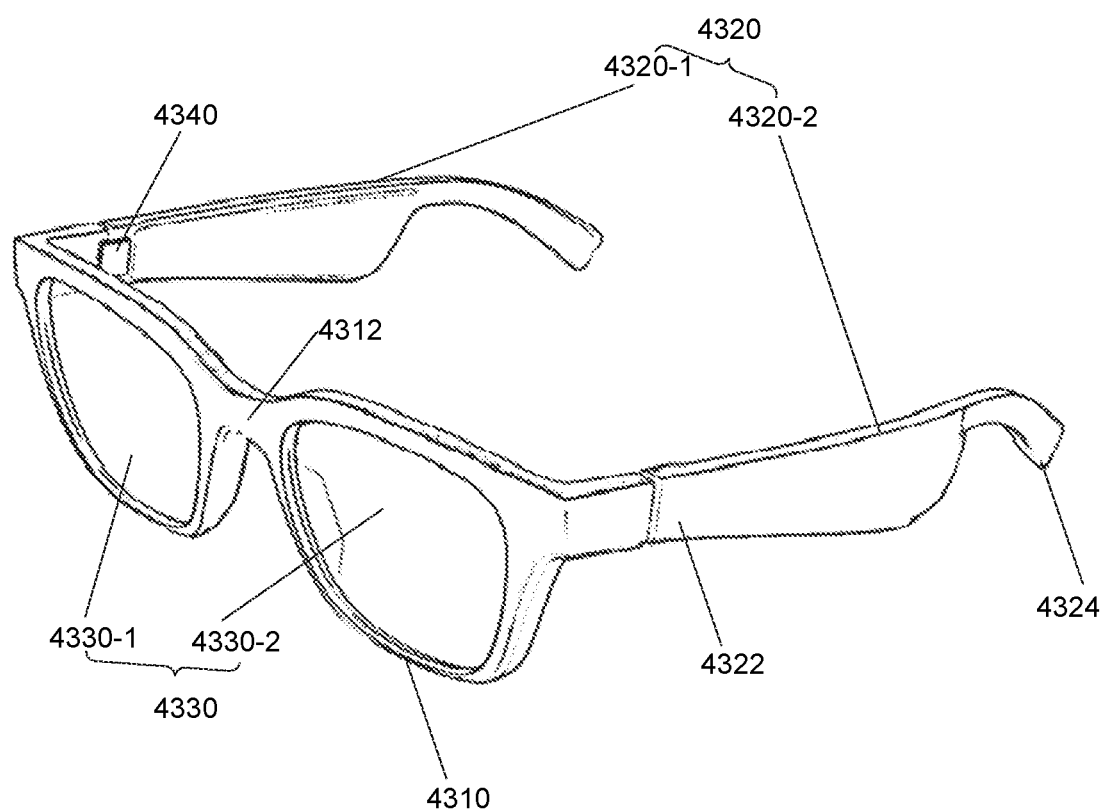
FIGS. 43A and 43B are schematic diagrams of exemplary smart glasses according to some embodiments of the present disclosure.
Figure 43B:
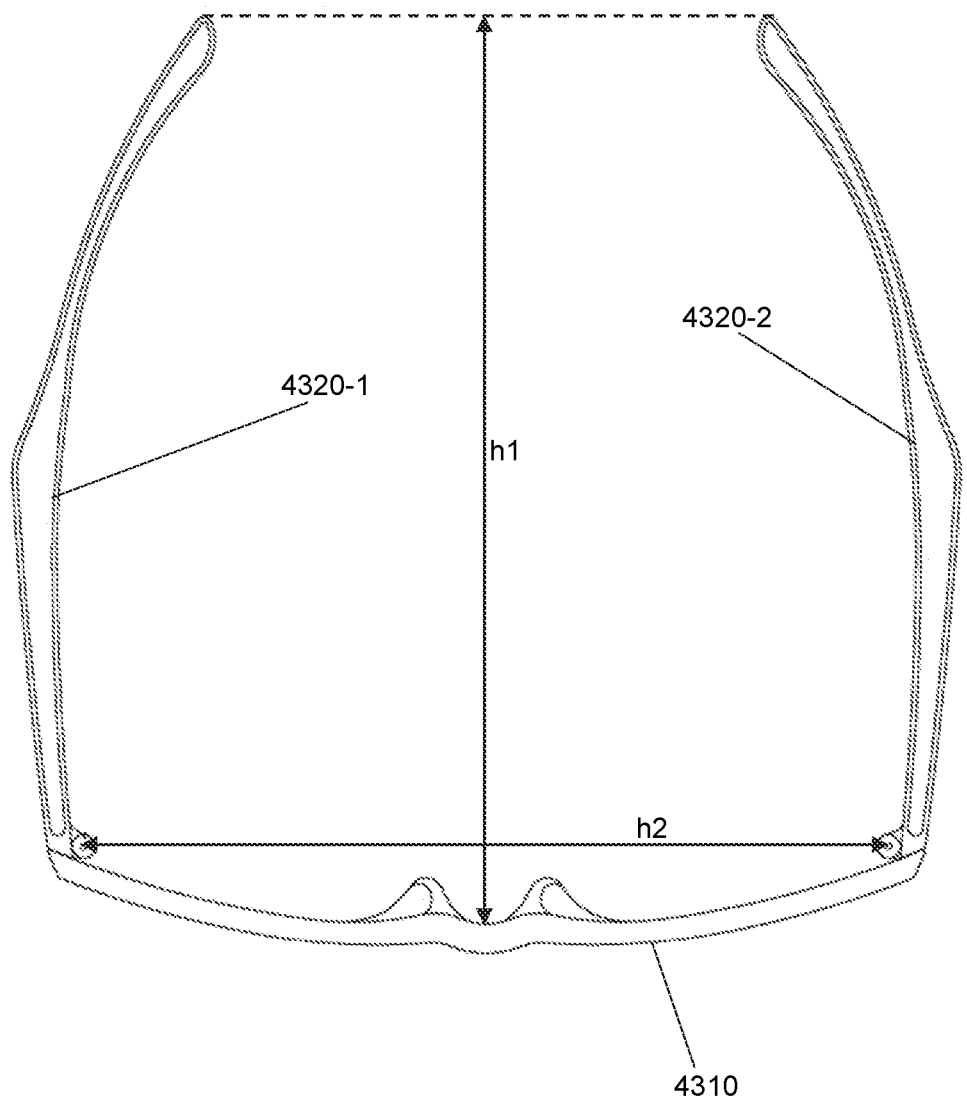

FIGS. 43A and 43B are schematic diagrams of exemplary smart glasses according to some embodiments of the present disclosure. The smart glasses 4300 may include a supporting structure to be worn on a user's body and lenses 4330 (for example, lenses 4330-1 and 4330-2). The supporting structure may include a frame 4310 and legs 4320 (including a right leg 4320-1 and a left leg 4320-2). The frame 4310 may include a noise pad 4312. The frame 4310 may be used to support the lens 4330. The noise pad 4312 may be provided in the middle of the mirror frame 4310 and may be placed on the bridge of a user's nose when wearing the smart glasses 4300. The legs 4320 may be placed on the user's ear when wearing the smart glasses 4300. In some embodiments, the frame 4310 may be connected to the legs 4320 through a connection structure 4340 to form a pair of glasses with foldable legs 4320. In some embodiments, the frame 4310 may be detachably connected to the legs 4320. Exemplary connection structure 4340 may include a snap-in structure, a plug-in structure, a hinge structure, or the like, or a combination thereof. In some embodiments, the frame 4310 and the legs 4320 may be integrally formed into one piece.

The lenses 4330 may be of any suitable type. For example, the lenses 4330 may include a plano lens, a diopter lens (e.g., a hyperopia lens, a myopia lens), a sunglasses lens, a 3D lens, or the like. As another example, the lenses 4330 may include a lens having an augmented reality (AR) function and/or a virtual reality (VR) function. In some embodiments, the smart glasses 4300 may receive an instruction (e.g., a mode switching instruction among a normal mode, a VR mode, and an AR mode). The lenses 4330 may automatically adjust its light transmittance and/or haze according to the received instruction and call a mini projection device (not shown) to achieve a mode switching instruction among a normal mode, a VR mode, and an AR mode. For example, after receiving the instruction to switch to the AR mode, the smart glasses 4300 may control the light transmittance of the lenses 4330 to decrease by an appropriate amount, and project an AR image or video in front of the user's line of sight via calling the mini projection device. As another example, after receiving the instruction to switch to the VR mode, the smart glasses 4300 may control the haze of the lenses 4330 to increase by nearly 100%, and project a VR image or video inside the lenses 4330 via calling the mini projection device. In some embodiments, the lenses 4330 may include a spherical surface, an aspherical surface, a toric surface, or the like, or any combination thereof. In some embodiments, the lenses 4330 may be made of plastic materials (e.g., polyurethane, epoxy plastic, allyl diethylene glycol carbonate plastic), a glass material (e.g., mineral glass, plexiglass), etc.

The legs 4320 (for example, the left 4320-2) may include a front end 4322 and a hook-shaped structure that is integrally formed with the front end 4322 into one piece. The hook-shaped structure may be hooked at the rear end 4324 of the user's ear when the user wears the smart glasses 4300. In some embodiments, in order to save material and improve wearing comfort, a cross-sectional area of the rear end 4324 may be smaller than that of the front end 4322, that is, the rear end 4324 is thinner than the front end 4322. In some embodiments, a stable structure (e.g., a stable structure 4660 shown in FIG. 46A) may be provided at the middle portion of the legs 4320. The stable structure may be used to fix the smart glasses 4300 on the user's ear, avoiding the smart glasses 4300 from easily slipping off the user's ear.

The supporting structure may be made of any suitable materials. In some embodiments, the frame may be integrally formed, or assembled by plugging, snapping, or the like. In some embodiments, the materials used to make the frame may include, but not limited to, metal, alloy, plastic, fiber, and other single or composite materials. The metal may include, but not limited to, copper, aluminum, titanium, gold, stainless steel, carbon steel, or the like. The alloy may include, but is not limited to, aluminum alloy, chromium-molybdenum steel, rhenium alloy, magnesium alloy, titanium alloy, magnesium-lithium alloy, nickel alloy, or the like. The plastic may include, but not limited to, acrylonitrile-butadiene-styrene copolymer (Acrylonitrile butadiene styrene, ABS), polystyrene (PS), high impact polystyrene (HIPS), polypropylene (PP), polyethylene terephthalate (PET), polyester (PES), polycarbonate (PC), polyamide (PA), polyvinyl chloride (PVC), polyethylene and blown nylon, or the like. The fiber may include acetate fiber, propionate fiber, carbon. The single or composite materials may include, but not limited to, glass fiber, carbon fiber, boron fiber, graphite fiber, graphene fiber, silicon carbide fiber, aramid fiber and other reinforcing materials; or a composite of other organic and/or inorganic materials, such as glass fiber reinforced unsaturated polyester, various types of glass steel with epoxy resin or phenolic resin, etc. In some embodiments, the materials of the frame 4310 and the legs 4320 may be the same or different. For example, the frame 4310 may be made of plastic material, and the legs 4320 may be made of a metal material. For another example, the frame 4310 may be made of plastic material, and the legs 4320 may be made of a metal material and a plastic material. In some embodiments, a sheath may be provided on the leg 4320-1 and/or the leg 4320-2. The sheath may be made of soft material with a certain elasticity, such as silicone, rubber, etc., so as to provide a better touch for the user.

As shown in FIG. 43B, a vertical distance h1 of a line connecting a symmetrical center point of the frame 4310 to a center point of the ends of the two legs 4320-1 and 4320-2 may be equal to 8 cm-20 cm. Preferably, a range of h1 may be 8.5 cm-19 cm; more preferably, the range of h1 may be 9 cm-18 cm; more preferably, the range of h1 may be 9.5 cm-17 cm; more preferably, the range of h1 may be 10 cm-16 cm; more preferably, the range of h1 may be 10.5 cm-15 cm; more preferably, the range of h1 may be 11 cm-14 cm; more preferably, the range of h1 may be 11.5 cm-13 cm. A distance h2 between center points of two connecting structures connected to the two legs 4320-1 and 4320-2 may range from 7 cm to 17 cm. Preferably, the range of h2 may be 7.5 cm-16 cm; more preferably, the range of h2 may be 8 cm-15 cm; more preferably, the range of h2 may be 8.5 cm-14 cm; more preferably, the range of h2 The range may be 9 cm-13 cm; more preferably, the range of h2 may be 9.5 cm-12 cm; more preferably, the range of h2 may be 10 cm-11 cm.

In some embodiments, the smart glasses 4300 may be provided with a plurality of components which may implement different functions. Exemplary components may include a power source assembly for providing power, an acoustic driver for generating sound, a microphone for detecting external sound, a Bluetooth module for connecting to other devices, a controller for controlling the operation of other components, or the like, or any combination thereof. In some embodiments, the interior of the frame 4310, and the leg 110 and/or the leg 120 may be provided as a hollow structure for accommodating the one or more components. For example, an acoustic output devices (e.g., the acoustic output device 400, the acoustic output apparatuses 500A/500B, the acoustic output apparatuses 600A/600B, the acoustic output apparatuses 700A/700B), a noise reduction system (e.g., the noise reduction system 3800, the noise reduction systems 3900A/3900B), a circuit board, a battery slot, etc. may be set in the hollow structure.

Figure 46A:
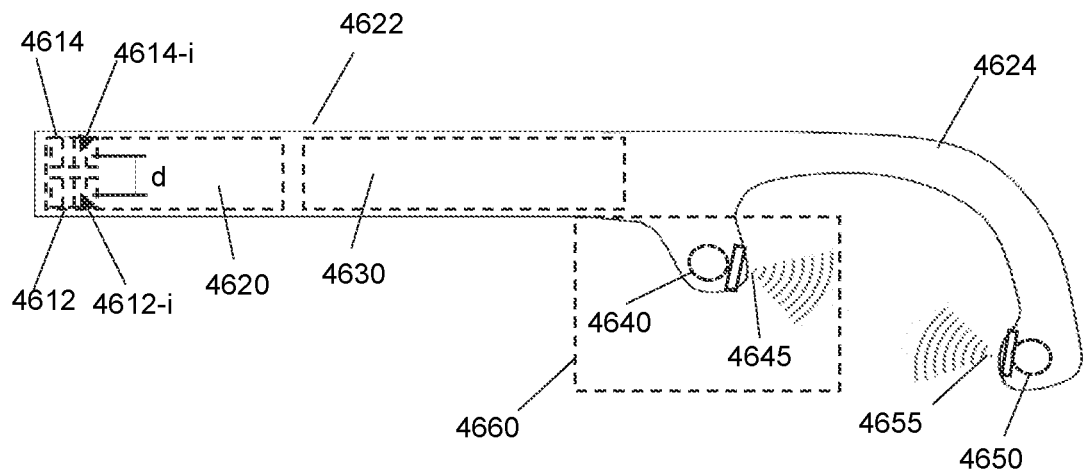
FIG. 46A is a schematic diagram of an exemplary leg of the smart glasses according to some embodiments of the present application.

The acoustic output device may be used to output sound to a user. In some embodiments, the acoustic output device may include a plurality of sets of low-frequency acoustic drivers and a plurality of sets of high-frequency acoustic drivers. One or more sound guiding holes may be connected to the low-frequency acoustic drivers and the high-frequency acoustic drivers, respectively. In some embodiments, when a distance between the sound guiding holes coupled to the high-frequency acoustic driver is smaller than a distance between the sound guiding holes coupled to the low-frequency acoustic driver, a sound volume to be heard by the user's ear may be increased, so as to reduce the sound leakage of the acoustic output apparatus, thereby preventing sounds from being heard by others near the acoustic output device. In some embodiments, the acoustic output device may include a plurality of sets of acoustic drivers. For example, as shown in FIG. 46A, the sets of acoustic drivers may include an acoustic driver 4640 and an acoustic driver 4650. The leg 4600A may be provided with a sound guiding hole 4645 and a sound guiding hole 4655, which are coupled to the acoustic driver 4640 and the acoustic driver 4650, respectively. The acoustic driver 4650 and the sound guiding hole 4655 may be provided at the rear end 4624 of the leg 4600A. The sound guiding hole 4645 and the sound guiding hole 4655 may be regarded as two point sound sources. In some embodiments, a baffle structure may be provided on the acoustic output apparatus, so that the at least two sound guiding holes may be distributed on both sides of the baffle, respectively. In general, a baffle structure may be provided between the two point sound sources, which may significantly increase the sound volume in the near-field without significantly increasing the sound leakage volume in the far-field leakage, thereby improving the user's listening experience. When the user wears the smart glasses with legs 4600A, the sound guiding hole 4645 may be located on the front side of the ear, and the sound guiding hole 4655 may be located on the back side of the ear. At this time, the auricle may serve as a baffle structure between the sound guiding hole 4645 and the sound guiding hole 4655. The auricle may increase a distance between the sound guiding hole 4645 and the sound guiding hole 4655. When the smart glasses 4300 are playing sound, the baffle structure may significantly increase the sound volume in the near-field, which may improve the user's listening experience. More descriptions regarding the acoustic output apparatus may be found elsewhere in the present disclosure. See, e.g., FIGS. 1-37 and relevant descriptions thereof.

The noise reduction system may include a microphone array, a noise reduction device, a combination device, and the like. The microphones in the microphone array may be used to generate sub-band sound signals. The noise reduction device may be configured to generate a target modulated signal having an inverted phase to the sub-band noise signal according to a sub-band noise signal in the sub-band voice signal, to reduce a noise of the sub-band sound signal and generate a corresponding sub-band noise reduction signal. A plurality of sub-band noise reduction signals may be transmitted to a combination device to be combined into a target signal. More descriptions regarding the noise reduction system may be found elsewhere in the present disclosure. See, e.g., FIGS. 38, 39A, 39B and relevant descriptions thereof. In some embodiments, the microphone array may be disposed on the leg 4320 and/or the frame 4310. More descriptions regarding positions of the microphone array may be found elsewhere in the present disclosure. See, e.g., FIGS. 44A, 44B, 45A, and 45B and relevant descriptions thereof.

In some embodiments, the positions of the noise reduction device and the combination device in the smart glasses 4300 may be randomly set, which is not limited herein. For example, the noise reduction device and the combination device may be integrated together on a circuit board. As another example, the noise reduction device and the synthesis device may be disposed at the leg 4320 and the frame 4310, respectively. In some embodiments, a Bluetooth module may be integrated on the circuit board. A battery slot on the circuit board may be used to install a battery to provide power for the circuit board. Through the integrated Bluetooth module, the smart glasses 4300 may implement functions such as making and receiving calls, and listening to music.

Figure 44A:
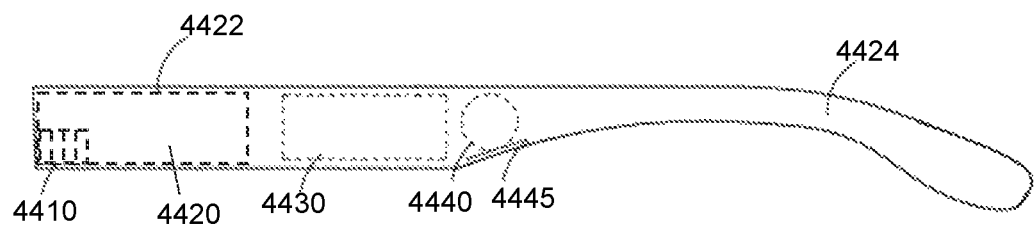
FIGS. 44A and 44B are schematic diagrams of exemplary legs of the smart glasses according to some embodiments of the present disclosure.
Figure 44B:
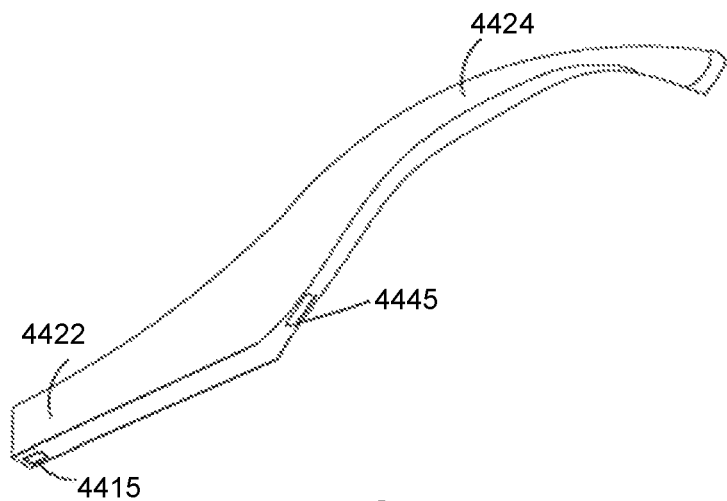

FIGS. 44A and 44B are schematic diagrams of exemplary legs according to some embodiments of the present disclosure. As shown in FIGS. 44A and 44B, the legs 4320 may be a hollow structure. A microphone array 4410 (for example, a microphone array 3810 in the microphone noise reduction system 3800), a circuit board 4420, a battery slot 4430, an acoustic output device 4440, and the like, may be disposed in the hollow structure. In some embodiments, the hollow structure may further include a noise reduction device and a combination device (not shown). The leg 4320 may further be provided with a sound inlet 4415 (or a sound input hole) that cooperates with the microphone array 4410, and a sound outlet 4445 (or sound guiding hole) that cooperates with the acoustic output device 4440 (as shown in FIG. 44B). It should be noted that the positions of components such as the microphone array 4410, the circuit board 4420, the battery slot 4430, and the acoustic driver 4440 may be adjusted in the hollow structure according to needs during the setting, and need not be the same as those in FIG. 44A. For example, the battery slot 4430 and the circuit board 4420 may be swapped. As another example, the microphone array 4410 may be disposed at the rear end 4424. In some embodiments, the microphone array may also be disposed in the frame 4310 (such as the noise pad 4312).

Figure 45A:
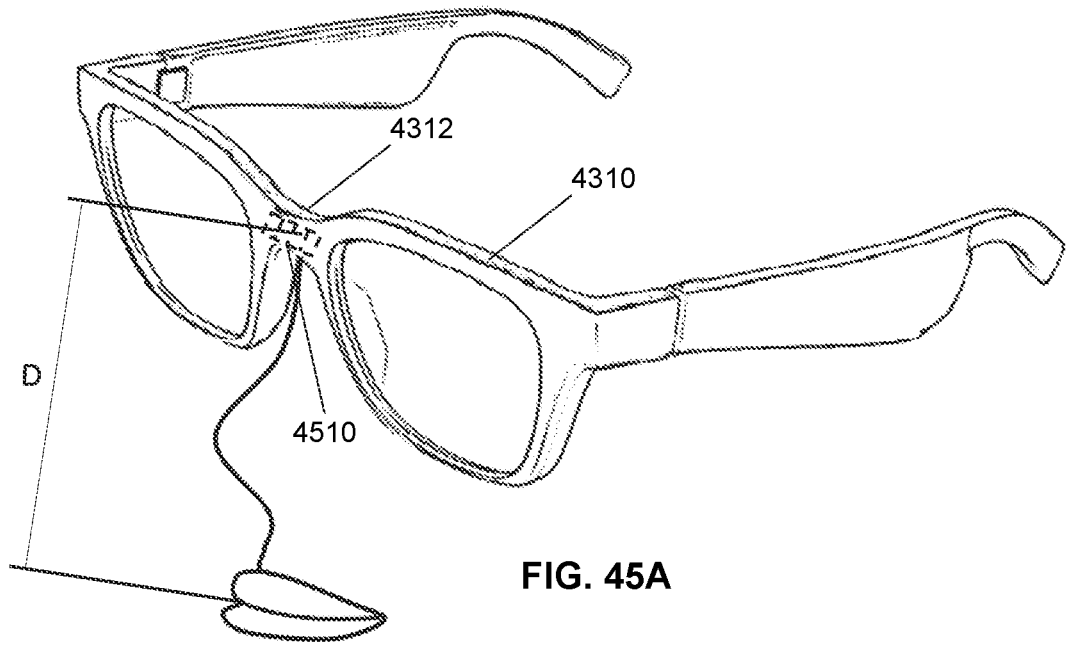
FIGS. 45A and 45B are schematic diagrams of another exemplary smart glasses according to some embodiments of the present disclosure.
Figure 45B:
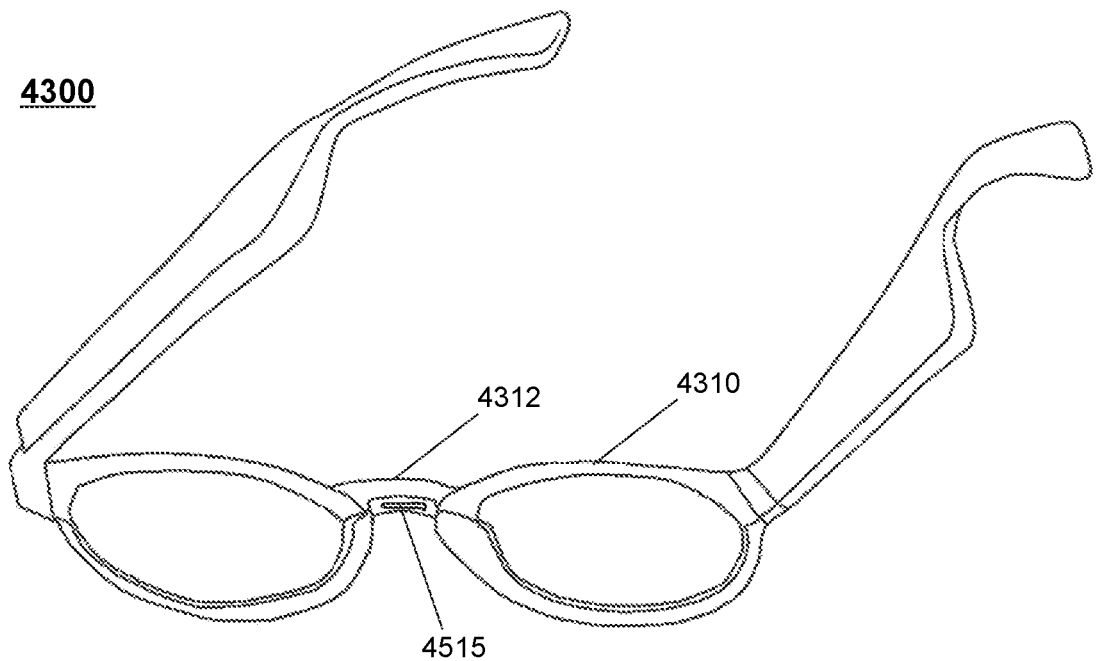

FIGS. 45A and 45B are schematic diagrams of exemplary smart glasses according to some embodiments of the present disclosure. As shown in FIGS. 45A and 45B, the microphone array 4510 may be disposed at nose pad 4312. The nose pad 4312 may also be provided with the sound inlet hole 4515 that cooperates with the microphone array 4510.

In some embodiments, when a user wears the smart glasses 4300, a distance D between a center point of the microphone array 4410 or 4510 and a center point of the user's mouth (i.e., the main sound source) may range from 2 cm to 20 cm. Preferably, the range of D may be 2.5 cm-18 cm; more preferably, the range of D may be 3 cm-16 cm; more preferably, the range of D may be 3.5 cm-14 cm; more preferably, the range of D The range may be 4 cm-12 cm; more preferably, the range of D may be 4.5 cm-10 cm; more preferably, the range of D may be 5 cm-8 cm; more preferably, the range of D may be 5.5 cm-7.5 cm; more preferably, the range of D may be 6 cm-7 cm.

In some embodiments, the microphone array may include at least one pair of low-frequency microphones and at least one pair of high-frequency microphones. The microphones of each pair of microphones may have the same configuration. The microphones of each pair of microphones may correspond to a sub-band sound signal having the same frequency band. A distance between each pair of low-frequency microphones is equal to a distance between each pair of high-frequency microphones. For illustration, a microphone closer to the main sound source (e.g., a user's mouth) in each pair of microphones may be referred to as a first microphone, and a microphone farther away from the main sound source in the pair of microphones may be referred to as a second microphone. FIG. 46A is a schematic diagram of an exemplary leg according to some embodiments of the present application. As shown in FIG. 46A, in the hollow structure of the leg 4600A, two sets of microphones corresponding to each other may be provided (that is, the microphone array may include two sets of microphones corresponding to each other), for example, a first microphone set 4612 and a second microphone set 4614. Each of the first microphone set 4612 and the second microphone set 4614 may include a plurality of microphones configured to a plurality of sub-band sound signals having different frequency bands. One first microphone in the first microphone set 4612 may match with one second microphone in the second microphone set 4614. Each microphone in the first microphone set 4612 and/or the second microphone set 4614 may decompose a sound signal into the sub-band sound signals. For example, after the sound signal is processed by the corresponding first microphone and the second microphone, the sub-band sound signals having the same frequency band may be obtained.

A distance between the first microphone set 4612 and the main sound source (e.g., the user's mouth) may be shorter than a distance between the second microphone set 4614 and the main sound source. In some embodiments, the first microphone set 4612 and the second microphone set 4614 may be distributed in the leg 4600A in a specific manner so that the main sound source is located in a direction from the second microphone set 4614 to the first microphone set 4612.

In some embodiments, when the user wears the smart glasses 4300 equipped with leg 4600A, since the user's mouth (that is, the main sound source) is closer to a first microphone 4612-$i$ and a corresponding second microphone 4614-$i$ than other sound sources (e.g., noise sources) in the environment, the mouth may be considered as a near-field sound source of the first microphone 4612-$i$ and second microphone 4614-$i$. A volume of the sound outputted from the near-field sound source and received by the first microphone 4612-$i$ and second microphone 4614-$i$ may be associated with the distance between the near-field sound source and the first microphone 4612-$i$ or the second microphone 4614-$i$. Since the first microphone 4612-$i$ is closer to the main sound source than the second microphone 4612-$i$, the first microphone 4612-$i$ may detect a sound and generate a sub-band sound signal $V_{J1}$ with a larger sound volume, and the second microphone 4612-$i$ may detect the sound and generate a sub-band sound signal $V_{J2}$ with a smaller sound volume.

In some embodiments, since a noise source in the environment is far away from the first microphone 4612-$i$ and the second microphone 4614-$i$, the noise source may be considered as a far-field sound source of the first microphone 4612-$i$ and the second microphone 4614-$i$. The first microphone 4612-$i$ may detect a noise and generate a sub-band noise signal $V_{r1}$, and the second microphone 4614-$i$ may detect the noise and generate a sub-band noise signal $V_{r2}$. The sound volume of sub-band noise signal $V_{r1}$ may approximate to the sound volume of sub-band noise signal of $V_{r2}$, that is, $V_{Y1} \approx V_{Y2}$.

Thus, a combination signal $V_1$ generated by the first microphone 4612-$i$ may be determined according to Equation (11), as below:

$$V_1 = V_{J1} + V_{Y1}, \qquad (11)$$

And a combination signal $V_2$ generate by the second microphone 4614-$i$ may be determined according to Equation (12), as below:

$$V_2 = V_{J2} + V_{Y2}, \qquad (12)$$

In order to eliminate or reduce the sub-band noise signal(s) in the combined signal(s), a differential signal V may be determined by differentiating combination signal $V_1$ and the combination signal $V_2$ according to Equation (13), as below:

$$V = V_1 - V_2 = (V_{J1} - V_{J2}) + (V_{Y1} - V_{Y2}) \approx V_{J1} - V_{J2}, \qquad (13)$$

Further, the sub-band sound signals $V_{J1}$ and $V_{J2}$, which is actually obtained from the main sound source by the first microphone 4612-$i$ or the second microphone 4614-$i$, may be determined based on the determined differential signal V and the distances of the first microphone 4612-$i$ and the second microphone 4614-$i$ with respect to the main sound source. In some embodiments, the differential signal V of each sub-band sound signal may be amplified, and then inputted to a combination device (not shown) for further processing, so as to generate a target signal. The target signal may be propagated to the user via the acoustic driver 4640 and/or the acoustic driver 4650.

Figure 46B:
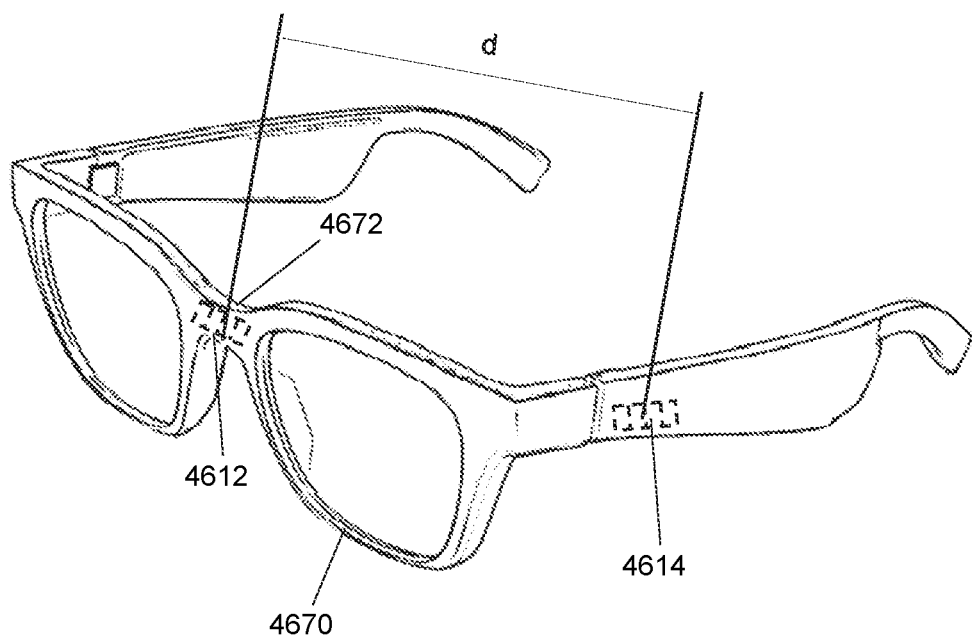
FIG. 46B is a schematic diagram of the other exemplary smart glasses according to some embodiments of the present application.

In some embodiments, the first microphone group 4612 and/or the second microphone group 4614 may be disposed on the leg 4600A and/or the frame 4670 (as shown in FIGS. 46A and 46B). To ensure the quality of the sub-band sound signals $V_{J1}$ and $V_{J2}$, the differential signal V determined according to the Equation (13) may be made as large as possible, that is, $V_{J1} \gg V_{J2}$. In some embodiments, a position of the first microphone set 4612 may be as close as possible to the main sound source (e.g., the user's mouth), and a position of the second microphone set 4614 may be as far away as possible from the main sound source. In some embodiments, a baffle structure may be provided between the two microphone sets. For example, the first microphone set 4612 may be disposed at the front end 4622 of the leg 4600A, and the second microphone set 4614 may be disposed at the rear end of the leg 4624. When a user wears a smart glass (e.g., the smart glasses 4300) with the leg 4600A, the auricle may function as a baffle structure between the first microphone set 4612 and the second microphone set 4614, which enlarges a distance between the first microphone set 4612 and the second microphone set 4614. In some embodiments, the distance from the main sound source to the first microphone set 4612 may be the equal to the distance from the main sound source to the microphone array 4410 or the microphone array 4510. In some embodiments, a distanced between the first microphone set 4612 and the second microphone set 4614 (as shown in FIG. 46A or 46B) may be not less than 0.2 cm. Preferably, d may be not less than 0.4 cm; more preferably, d may be not less than 0.6 cm; more preferably, d may be not less than 0.8 cm; more preferably, d may be not less than 1 cm; more preferably, d may be not less than Less than 2 cm; more preferably, d may be not less than 3 cm; more preferably, d may be not less than 4 cm; more preferably, d may be not less than 5 cm; more preferably, d may be not less than 6 cm; more preferably Ground, d may be not less than 7 cm; more preferably, d may be not less than 8 cm; more preferably, d may be not less than 9 cm; more preferably, d may be not less than 10 cm; more preferably, d may be not less than 11 cm; more preferably, d may be not less than 12 cm; more preferably, d may be not less than 13 cm; more preferably, d may be not less than 14 cm; more preferably, d may be not less than 15 cm; more preferably, d may be not less than 17 cm; more preferably, d may be not less than 19 cm; more preferably, d may be not less than 20 cm.

Figure 47:
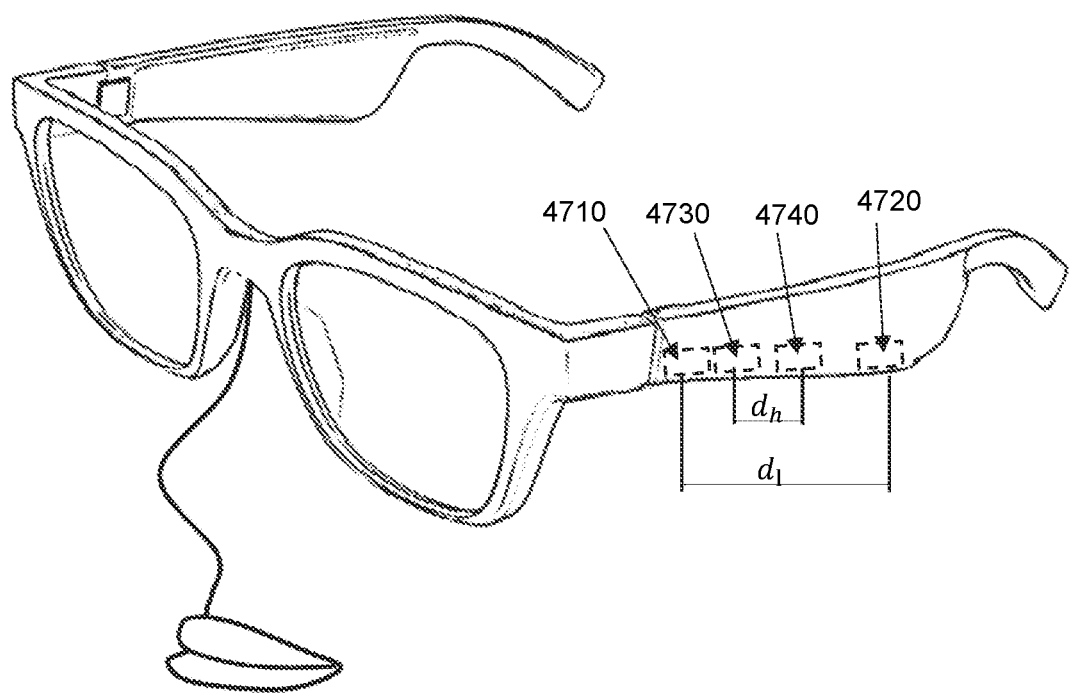
FIG. 47 is a schematic diagram of another exemplary smart glasses according to some embodiments of the present disclosure.

In some embodiments, a distance between each pair of microphones in the microphone array may be different. A distance between the low-frequency microphones may be greater than a distance between the high-frequency microphones. FIG. 47 is a schematic diagram of exemplary smart glasses according to some embodiments of the present disclosure. As shown in FIG. 47, the smart glasses 4700 may include at least one pair of low-frequency microphones (e.g., a low-frequency microphone 4710 and a low-frequency microphone 4720) and at least one pair of high-frequency microphones (e.g., a high-frequency microphone 4730 and a high-frequency microphone 4740). A distance between the low-frequency microphones 4710 and 4720 may be greater than a distance between the high-frequency microphones 4730 and 4740. By setting different distances for microphones having different frequencies, a sound receiving effect of the smart glasses 4700 can be improved. The reason is that, when a position of a far-field sound source is constant, a low-frequency sound outputted by the far-field sound source may have a low-frequency and a long period, and a high-frequency sound outputted by the far-field sound source may have a high-frequency and a short period. Properly increasing the distance between the low-frequency microphones 4710 and 4720 may significantly improve a near-field sound receiving effect without significantly increasing a far-field low-frequency noise, since a phase shift caused by the increasing distance between the low-frequency microphones 4710 and 4720 only occurred at a small portion of the period. Properly increasing the distance between the high-frequency microphones 4730 and 4740 may gradually reduce a phase difference between the far-field high-frequency noise generated by the high-frequency microphones 4730 and 4740, which may well eliminate the high-frequency noise. Therefore, by setting the distance between the high-frequency microphones to be smaller than the distance between the low-frequency microphones, and then using a differential operation for a noise reduction, the far-field noise (including a far-field low-frequency noise and a far-field high-frequency noise) may be eliminated or approximately eliminated. It should be noted that the positions of the low-frequency microphone 4710, the low-frequency microphone 4720, the high-frequency microphone 4730, and the high-frequency microphone 4740 shown in FIG. 47 are merely for illustration, and each microphone of them may be disposed at another suitable position of the smart glasses 4700. For example, the low-frequency microphone 4710 and the low-frequency microphone 4720 may be disposed on a frame, and the high-frequency microphone 4730 and the high-frequency microphone 4740 may be disposed on a leg. As another example, the low-frequency microphone 4710 may be disposed on the frame, and the low-frequency microphone 4720, the high-frequency microphone 4730, and the high-frequency microphone 4740 may be disposed on the leg. In some embodiments, the distance $d_l$ between the low-frequency microphones 4710 and 4720 may be 0.8 cm-20 cm; preferably, the r distance $d_l$ may be 1 cm-18 cm; more preferably, the distance $d_l$ may be 1.2 cm-16 cm; more preferably, the distance $d_l$ may be 1.4 cm-14 cm; more preferably, the distance $d_l$ may be 1.6 cm-12 cm; more preferably, the distance $d_l$ may be 1.8 cm-10 cm; more preferably, the distance $d_l$ may be 2 cm-8 cm; more preferably, the distance $d_l$ may be 2.2 cm-6 cm; more preferably, the distance $d_l$ may be 2.4 cm-4 cm; more preferably, the distance $d_l$ may be 2.6 cm-3.8 cm; more preferably, the distance $d_l$ may be 2.8 cm-3.6 cm; more preferably, the distance $d_l$ may be 3 cm. In some embodiments, the distance $d_h$ between the high-frequency microphones 4730 and 4740 may range from 1 mm to 12 mm; preferably, the distance $d_h$ may be 1.2 mm to 11 mm; more preferably, the distance $d_h$ may be 1.2 mm-10 mm; more preferably, the distance $d_h$ may be 1.4 mm-9 mm; more preferably, the distance $d_h$ may be 1.6 mm-8 mm; more preferably, the distance $d_h$ may be 1.8 mm-7.5 mm; more preferably, the distance $d_h$ may be 2 mm-7 mm; more preferably, the distance $d_h$ may be 2.5 mm-6.5 mm; more preferably, the distance $d_h$ may be 3 mm-6 mm; more Preferably, the distance $d_h$ may be 3.5 mm-5.5 mm; more preferably, the distance $d_h$ may be 4 mm-5.3 mm; more preferably, distance $d_h$ may be 5 mm. In some embodiments, a frequency band of the human voice may mainly be within a low and medium frequency bands. The low-frequency microphone 4710 may be set closer to the main sound source than the high frequency microphone 4730, so as to receive a stronger signal that is within the low and medium frequency band. The distance between the low-frequency microphones 4710 and the main sound source may be the same as the distance between the microphone array 4410 and the main sound source, and details are not repeated herein.

It should be noted that the above descriptions of smart glasses (for example, smart glasses 4300, smart glasses 4600B, and smart glasses 4700) and/or legs (for example, leg 4320, leg 4600A) are merely provided for the purposes of illustration, and not intended to limit the scope of the present disclosure. For persons having ordinary skills in the art, various modifications and changes in the forms and details of the above smart glasses may occur without departing from the principles of the present disclosure. However, these changes and modifications do not depart from the scope of the present application. For example, the lens 4330 may be omitted from the smart glasses 4300. As another example, the smart glasses 4300 may include only one lens.

The stable structure 4660 may be integrally formed with the leg 4600A, or may be detachably disposed on the leg 4600A.

In some embodiments, a noise reduction system in smart glasses (for example, smart glasses 4300, smart glasses 4600B, smart glasses 4700) may detect a sound of a user wearing the smart glasses through a sound inlet hole, and generate a target signal (an electrical signal) by processing the detected sound, and transmit the target signal to an object or device that communicates with the smart glasses. In some embodiments, an acoustic output device in the smart glasses may receive the target signal transmitted by the object or device that communicates with the smart glasses, convert the target signal into a target sound (an audio signal), and output the target sound to a user wearing the smart glasses through a sound guiding hole.

Figure 48:
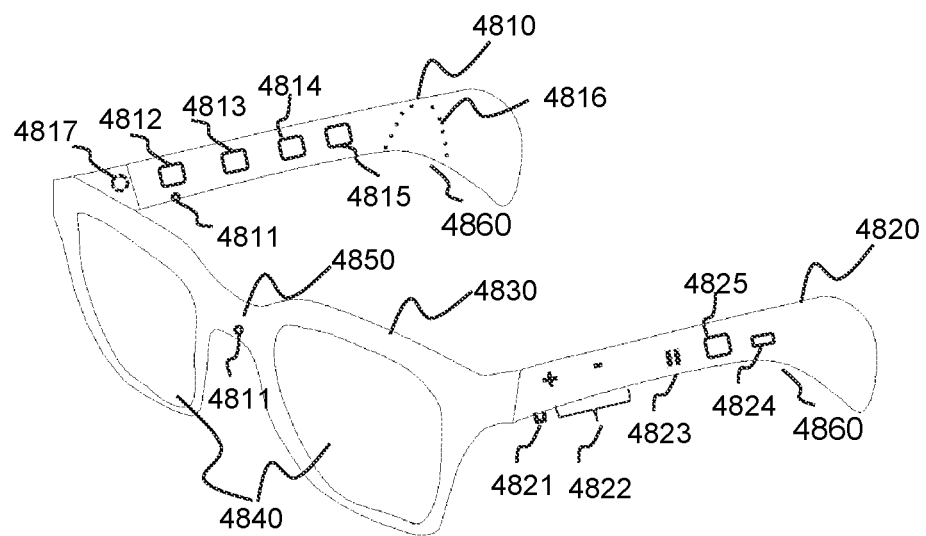
FIG. 48 is a schematic diagram of an exemplary acoustic output apparatus according to some embodiments of the present disclosure.

FIG. 48 is a schematic diagram of an exemplary acoustic output apparatus according to some embodiments of the present disclosure. In some embodiments, the acoustic output apparatus 4800 may have a similar configuration as that of the smart glasses 4300. As shown in FIG. 48, the acoustic output apparatus 4800 may include a supporting structure that enables the acoustic output apparatus 4800 to be located off a user ear (e.g., worn by a user over the head), and lenses 4840. The supporting structure may include a frame 4830, legs 4810 and 4820, a nose pad 4850, or the like. At least a part of the abovementioned components of the acoustic output apparatus 4800 may be similar to or the same as that of smart glasses 4300, and detailed descriptions thereof are not repeated herein.

The acoustic output apparatus 4800 may be provided with a plurality of hollow structures. In some embodiments, shapes, sizes, and counts of the one or more hollow structures on the acoustic output apparatus 4800 may vary according to actual needs. For example, the shapes of the hollow structures may include, but not limited to, a square shape, a rectangle shape, a triangle shape, a polygon shape, a circle shape, an ellipse shape, an irregular shape, or the like. As shown in FIG. 48, the leg 4810 may be a hollow structure provided with a sound inlet hole 4811 and may contain an audio sensor 4812, a controller 4813, a target sound generation module 4814, an acoustic driver 4815, one or more sound guiding holes 4816, a scene information generating module 4817, or the like. The leg 4820 may include one or more components in the leg 4810. As another example, the frame 4850 may be a hollow structure provided with a sound inlet hole 4811, and housing one or more components in the leg 4810. As another example, the leg 4820 may be a hollow structure containing a power button 4821, a sound adjustment button 4822, a playback control button 4823, a Bluetooth button 4824, a power interface 4825, or the like. As yet another example, a noise reduction system (e.g., the noise reduction system 3800, the noise reduction systems 3900A/3900B), etc., may be set in the acoustic output apparatus 4800.

The sound inlet hole 4811 may be used to transmit external sounds emitted from a sound source (e.g., a user wearing the acoustic output apparatus 4800, the acoustic output apparatus 4800, and/or ambient environment) to the audio sensor 4812 in the acoustic output apparatus 4800. The sound inlet hole 4811 may be provided at a position facilitating the acquisition of the user's voice on the glasses 4800, for example, a position near the user's mouth on the leg 4810 and/or 4820, a position near the user's mouth under the frame 4830, a position on the nose pad 4850, or any combination thereof. In some embodiments, the user may interact with the acoustic output apparatus 4800 by speaking one or more words. The voice of the user may be acquired by the acoustic output apparatus 4800 via the sound inlet hole 4811. It should be noted that the sound inlet hole 4811 can be optional. For example, when there is no need to acquire external sounds emitted from the sound source(s) around the acoustic output apparatus 4800, there may be no sound inlet holes 4811.

The audio sensor 4812 may be configured to detect a sound via the sound inlet hole 4811, and generate a sound signal in response to the detected sound. The audio sensor 4812 may include a plurality of microphones or a microphone array as described elsewhere in the present disclosure, for example, the microphone array 3910a or the microphones 3912a. As described in connection with FIG. 39A, the audio sensor 4812 may generate a plurality of sub-band sound signals according to the frequency responses of the microphones in the audio sensor 4812. The audio sensor 4812 may be electrically coupled to the controller 4812. The sound signal may be transmitted to the controller 4813.

The target sound generation module 4814 may be configured to simulate a target sound that seems to originate from a virtual object in a virtual reality (VR) scene or an augmented reality (AR) scene. The target sound generation module 4814 may generate a first spatial sound signal and a second spatial sound signal for simulating the target sound. A spatial sound refers to a sound produced by a stereo speaker, a surround-sound speaker, a speaker-array, or a headphone that indicates binaural spatial cues that permits a listener to locate the sound source of the spatial sound in a three-dimensional (3D) space. Generally, the spatial cues may be created primarily based on an intensity difference, a phase difference between the sound at two ears of the listener, a spectral change of the sound resulting from shapes of a pinnae or an outer ear of the listener, the head and torso of the listener, or the like.

The controller 4813 may process data and/or signals obtained from one or more components (e.g., the audio sensor 4812, the target sound generation module 4814) of the acoustic output apparatus 4800. In some embodiments, the controller 4813 may be configured to generate a first sound signal corresponding to a first frequency range (or referred to as a low frequency range) and a second sound signal corresponding to a second frequency range (or referred to as a high frequency range). For example, the controller 4813 may generate the first sound signal and the second sound signal based on the first spatial sound. The controller 4813 may generate the first sound signal and the second sound signal based on the second spatial sound.

The second frequency range may include frequencies higher than the first frequency range. For example, the first frequency range may be in a range of 100 Hz-1000 Hz, and the second frequency range may be in a range of 1000 Hz-10000 Hz. More descriptions regarding the first and second frequency ranges may be found else wherein in the present disclosure. See, e.g., FIG. 4 and relevant descriptions thereof. In some embodiments, the controller 4813 may include one or more components (e.g., the frequency divider 415, the signal processor 420 (or 430)) of the electronic frequency division module 410 as described in connection with FIG. 4. For example, the first and second sound signals may be generated by the frequency divider 415 via decomposing the sound signal. As another example, the first and second sound signals may further be processed (e.g., the intensity thereof being adjusted) by the signal processor 420. The controller 4813 may be electrically coupled to the target sound generation module 4814. The first and second sound signals may be transmitted to the controller 4813.

The acoustic driver 4815 may include at least one low-frequency acoustic driver and at least one high-frequency acoustic driver. The at least one low-frequency acoustic driver may be configured to generate the first spatial sound based on the first spatial sound signal. The at least one high-frequency acoustic driver may be configured to generate a second spatial sound based on the second spatial sound signal. The at least one low-frequency acoustic driver may have a similar or same configuration as that of the low-frequency acoustic driver 440 as described in connection with FIG. 4. The at least one high-frequency acoustic driver may have a similar or the same configuration as that of the high-frequency acoustic driver 450 as described in connection with FIG. 4. In some embodiments, the at least one low-frequency acoustic driver may include two first transducers, and the at least one high-frequency acoustic driver may include two second transducers. The first transducers and the second transducers may have different frequency response characteristics. For example, the first transducers may convert the first spatial sound signals into a first right spatial sound and a first left spatial sound, respectively. The first right spatial sound may be outputted from one or more first sound guiding holes located at the right leg of the acoustic output apparatus 4800, and the first left spatial sound may be outputted from one or more first sound guiding holes located at the left leg of the acoustic output apparatus 4800. For example, the second transducer may convert the second spatial sound signals into a second right spatial sound and a second left spatial sound, respectively. The second right spatial sound may be outputted from one or more first sound guiding holes located at the right leg of the acoustic output apparatus 4800, and the second left spatial sound may be outputted from one or more first sound guiding holes located at the left leg of the acoustic output apparatus 4800.

In some embodiments, the supporting structure may be a housing. The at least one low-frequency acoustic driver may be enclosed by the housing, forming a first front chamber and a first rear chamber corresponding to the at least one low-frequency acoustic driver. The first front chamber may be acoustically coupled to one of the at least two first sound guiding holes, and the first rear chamber may be acoustically coupled to another one of the at least two first sound guiding holes. The at least one high-frequency acoustic driver may be enclosed by the housing, forming a second front chamber and a second rear chamber corresponding to the at least one high-frequency acoustic driver. The second front chamber may be acoustically coupled to one of the at least two second sound guiding holes, and the second rear chamber may be acoustically coupled to another one of the at least two second sound guiding holes.

The one or more sound guiding holes 4816 may include a plurality of first sound guiding holes acoustically coupled to the at least one low-frequency acoustic driver and a plurality of second sound guiding holes acoustically coupled to the at least one high-frequency acoustic driver, so as to output the first and second spatial sound to the user. In order to reduce the destructive interference of sounds in the near-field, a first distance between the first sound guiding holes may be greater than a second distance between the second sound guiding holes. For example, the first distance may be in a range of 20 mm-40 mm, and the second distance may be in a range of 3 mm-7 mm. In some embodiments, as described in connection with FIG. 4, one of the first sound guiding holes may be coupled to the low-frequency acoustic driver via a first acoustic route, and one of the second sound guiding holes may be coupled to the high-frequency acoustic driver via a second acoustic route. The first acoustic route and the second acoustic route may have different frequency selection characteristics.

The first sound guiding holes may be configured to output the first spatial sound. For example, the first sound guiding holes on the leg 4810 may output the first right spatial sound, and the first sound guiding holes on the leg 4820 may output the first left spatial sound. The second sound guiding holes may be configured to output the second spatial sound. For example, the second sound guiding holes on the leg 4810 may output the second right spatial sound, and the second sound guiding holes on the leg 4820 may output the second left spatial sound. When perceived by the ears of the user, the first and second spatial sound may appear to originate from a sound source located at the known position in a VR/AR scene. In some embodiments, the two second sound guiding holes may be located closer to a listening position of a user's ear than the two first sound guiding holes. For example, the two second sound guiding holes may be provided at a rear end of the leg 4810 and/or 4820 being far away from the frame 4830, a bending part 4860 of the leg, or the like.

In some embodiments, the acoustic output apparatus 4800 may include a first set of first sound guiding holes located in a first region of the acoustic output apparatus and a second set of first sound guiding holes located in a second region of the acoustic output apparatus. The first region and the second region may be different. In some embodiments, the acoustic output apparatus may include a first set of second sound guiding holes located in a third region of the acoustic output apparatus and a second set of second sound guiding holes located in a fourth region of the acoustic output apparatus. The third region and the fourth region may be different. In some embodiments, the first region and the second region may be located at opposite sides of the user. In some embodiments, the third region and the fourth region may be located at opposite sides of the user. For instance, the first region and the third region may be located relatively close to the left ear of the user (e.g., located on the left leg of the acoustic output apparatus 4800), and the second region and the fourth region may be relatively close to the right ear of the user (e.g., located on the right leg of the acoustic output apparatus 4800). More details regarding the sound guiding holes may be found elsewhere in the present disclosure, for example, in FIG. 50 and the description thereof.

The scene information generating module 4817 may be configured to process information related to a VR scene or an AR scene. In some embodiments, the data related to a scene may include video data, audio data, peripheral data, or the like, or any combination thereof. For example, the scene information generating module 4817 may generate a scene according to an instruction or a program (e.g., a gaming program) received from the controller 4813. As another example, the scene information generating module 4817 may receive the data related to the interaction scenario from a sensor (e.g., a visual sensor, a video sensor, an audio sensor) on the acoustic output apparatus 4800. The scene information generating module 4817 may provide a corresponding VR/AR sense, by displaying the audio data in the data on a display (e.g., the lenses 4840 or a portion thereof) of the acoustic output apparatus 4800, and providing the audio data simultaneously (e.g., the target sound) via the sound guiding holes 4816 to the user to accompany the audio data. When the user's head moves or rotates, the scene information generating module 4817 may update the video data and the audio data according to an updated position of the sound source, and output the updated video data and the updated audio data to the user. In some embodiments, the acoustic output apparatus 4800 may receive an instruction (e.g., a mode switching instruction among a normal mode, a VR mode, and an AR mode) from the controller 4813. Similar to the lenses 4330, the lenses 4840 may automatically adjust its light transmittance and/or haze according to the received instruction, and call a mini projection device to achieve a mode switching instruction, and detailed descriptions are not repeated herein.

The power interface 4825 may be provided on a side of the leg 4810 and/or the leg 4820 facing the user's face. Exemplary power interfaces may include a dock charging interface, a DC charging interface, a USB charging interface, a lightning charging interface, a wireless charging interface, a magnetic charging interface, or the like, or any combination thereof.

The one or more button structures may be used to implement interactions between the user and the acoustic output apparatus 4800. The power button 4821 may include a power-on button, a power-off button, a power hibernation button, or the like, or any combination thereof. The sound adjustment button 4822 may include a sound increase button, a sound decrease button, or the like, or any combination thereof. The playback control button 4823 may include a playback button, a pause button, a resume playback button, a call playback button, a call drop button, a call hold button, or the like, or any combination thereof. The Bluetooth button 4824 may include a Bluetooth connection button, a Bluetooth off button, a selection button, or the like, or any combination thereof. In some embodiments, the button structures may be provided on the glasses 100. For example, the power button may be provided on the leg 4810, the leg 4820, or the frame 4830. In some embodiments, the one or more button structures may be provided in one or more control devices. The acoustic output apparatus 4800 may be connected to the one or more control devices via a wired or wireless connection. The control devices may transmit instructions input by the user to the acoustic output apparatus 4800, so as to control the operations of the one or more components in the acoustic output apparatus 4800.

In some embodiments, the acoustic output apparatus 4800 may also include one or more indicators to indicate information of one or more components in the acoustic output apparatus 4800. For example, the indicators may be used to indicate a power status, a Bluetooth connection status, a playback status, or the like, or any combination thereof. In some embodiments, the indicators may indicate related information of the components via different indicating conditions (for example, different colors, different time, etc.). Merely by way of example, when a power indicator is red, it is indicated that the power source assembly may be in a state of low power. When the power indicator is green, indicating that the power source assembly may be a state of full power. As another example, a Bluetooth indicator may flash intermittently, indicating that the Bluetooth is connecting to another device. The Bluetooth indicator may be blue, indicating that the Bluetooth may be connected successfully.

It should be noted that the above descriptions of the acoustic output apparatus 4800 are provided for the purposes of illustration, and not intended to limit the scope of the present disclosure. For those skilled in the art, various changes and modifications may be made according to the description of the present disclosure. In some embodiments, the acoustic output apparatus 4800 may include one or more additional components. Additionally or alternatively, one or more components of the noise reduction system 3800 described above may be omitted. For example, the acoustic output apparatus 4800 may include one or more cameras to capture image data from a real scene around the user (for example, a scene in front of the user). As another example, the acoustic output apparatus 4800 may also include one or more projectors for projecting an image or a video (for example, the image or video that users see through the acoustic output apparatus 4800) onto an external display.

Figure 49:
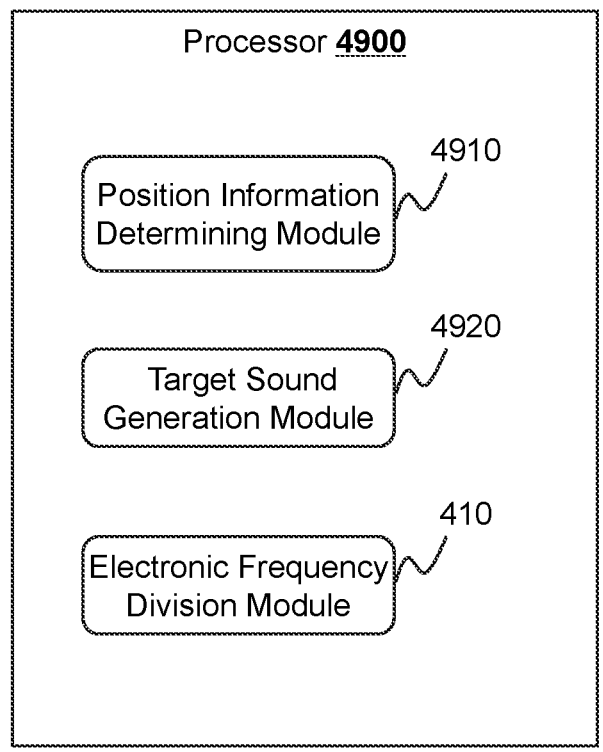
FIG. 49 is a block diagram illustrating an exemplary processor for simulating a target sound coming from a sound source according to some embodiments of the present disclosure.

FIG. 49 is a block diagram illustrating an exemplary processor for simulating a target sound coming from a sound source according to some embodiments of the present disclosure. In some embodiments, the processor 4900 may be implemented on an acoustic output apparatus (e.g., the acoustic output apparatus 4800 shown in FIG. 48). In some embodiments, at least a part of the modules of the processor 4900 may be implemented on one or more independent devices. As shown in FIG. 49, the processor 4900 may include a position information determining module 4910, a target sound generation module 4920, and an electric frequency division module 410. The modules may be hardware circuits of all or part of the processor 4900. The modules may also be implemented as an application or set of instructions read and executed by the processor 4900. Further, the modules may be any combination of the hardware circuits and the application/instructions. For example, the modules may be part of the processor 4900 when the processor 4900 is executing the application/set of instructions.

The position information determining module 4910 may determine position information related to a sound source in a VR/AR scene. In some embodiments, the position information determining module 4910 may obtain status information of a user. The status information may include information related to, for example, a location of the user, a gesture of the user, a direction that the user faces, an action of the user, a speech of the user, or the like, or any combination thereof. The status information of the user may be acquired by one or more sensors mounted on the acoustic output apparatus, such as an Inertial Measurement Unit (IMU) sensor, a camera, a microphone, etc. In some embodiments, the position information determining module 4910 may determine position information of a sound source with respect to the user based on the status information. The sound source may be a virtual object presented in a VR/AR scene. The position information may be the information of a position of the virtual object in the VR/AR scene with respect to the user. For instance, the position information may include a virtual direction of the sound source with respect to the user, a virtual location of the sound source with respect to the user, a virtual distance between the sound source and the user, or the like, or any combination thereof.

The target sound generation module 4920 may generate at least two sound signals for simulating a target sound. The target sound may be a spatial sound that allows the user to identify the position information of the sound source in the VR/AR scene. In some embodiments, there may be a difference between the at least two sound signals that enable the user to hear the spatial sound and identify the position information of the sound source. For example, the difference may include at least one of a phase difference, an amplitude difference, or a frequency difference.

The electronic frequency division module 410 may generate, for each of the at least two sound signals, a first sound signal corresponding to a first frequency range and a second sound signal corresponding to a second frequency range. The first frequency range and the second frequency range may or may not include overlapping frequency ranges. The second frequency range may include frequencies higher than the first frequency range. As described in other parts of the present disclosure, in some embodiments, the phases of two first sounds corresponding to the first sound signal which are outputted to the user through different acoustic routes may be different (e.g., opposite). Similarly, the phases of two second sounds corresponding to the second sound signal which are outputted to the user through different acoustic routes may be different (e.g., opposite). As a result, the target sound outputted by the acoustic output apparatus may be less likely to be heard by other people near the acoustic output apparatus.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, any module mentioned above may be divided into two or more units. For example, the position information determining module 4910 may include an obtaining unit configured to obtain status information of a user and a position information determining unit configured to determine position information of a sound source based on the status information of the user.

Figure 50:
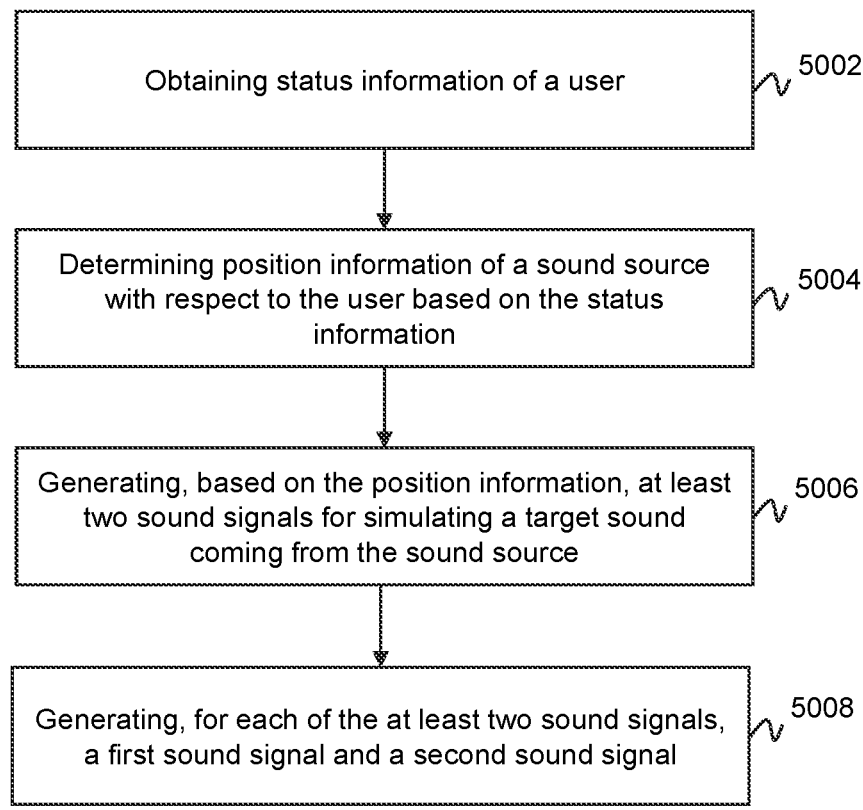
FIG. 50 is a flowchart of an exemplary process for simulating a target sound coming from the sound source according to some embodiments of the present disclosure.

FIG. 50 is a flowchart of an exemplary process for simulating the target sound coming from a sound source according to some embodiments of the present disclosure. In some embodiments, process 5000 may be implemented by at least a part of the modules shown in FIG. 49.

In 5002, the position information determining module 4910 may obtain status information of a user. As used herein, the term "status information" refers to information related to a location of the user, a gesture of the user, a direction that the user faces, an action of the user (e.g., turning his/her head to a certain direction), a speech of the user, or the like, or any combination thereof. In some embodiments, the status information may be detected by one or more sensors mounted on the acoustic output apparatus, such as an Inertial Measurement Unit (IMU) sensor, a camera, a microphone, etc. For example, the IMU sensor may include but not limited to an acceleration sensor, a gyroscope, a geomagnetic sensor, or the like, or any combination thereof. In some embodiments, the user may interact with the acoustic output apparatus by speaking a voice command, such as "Power off", "Start game X", "Quit game X". The microphone may receive the speech of the user and the acoustic output apparatus may identify the voice command. In some embodiments, an interactive menu may be presented by a display of the acoustic output apparatus (e.g., glasses of a smart helmet) for the user to give an instruction to the acoustic output apparatus.

In 5004, the position information determining module 4910 may determine position information of a sound source with respect to the user based on the status information. In some embodiments, the sound source may be a virtual object presented in a VR/AR scene. For instance, the VR/AR scene may be presented to the user via a display (e.g., lenses 4840 or a portion thereof). The position information may be the information of a position of the virtual object in the VR/AR scene with respect to the user. In some embodiments, the position information of the virtual object in the VR/AR scene may be determined based on the status information of the user and information related to the VR/AR scene. For instance, the position information may include a virtual direction of the sound source with respect to the user, a virtual location of the sound source with respect to the user, a virtual distance between the sound source and the user, or the like, or any combination thereof. For example, when the acoustic output apparatus presents a VR scene to the user and the sound source is a virtual bird, the position information determining module 4920 may determine a virtual position of the virtual bird in the VR scene based on the status information of the user. Merely by way of example, when the user faces towards North, the virtual bird may be on the left of the user in the VR scene. When the status information indicates that the user turns his/her head towards the West, the virtual bird may be located in front of the user. The position information may be used for generating a spatial sound (e.g., the chirp of the virtual bird).

In 5006, the target sound generation module 4920 may generate, based on the position information, at least two sound signals for simulating a target sound coming from the sound source. As used herein, the target sound may be a spatial sound that allows the user to identify the position information of the sound source. For example, the target sound generation module 4920 may generate a first spatial sound signal and a second spatial sound signal for simulating the target sound. In some embodiments, there may be a difference between the at least two sound signals that enables the user to hear the spatial sound and identify the position information of the sound source. For example, the difference may include at least one of a phase difference, an amplitude difference, or a frequency difference. The at least two sound signals may be transmitted to one or more acoustic drivers for generating at least two sounds. In some embodiments, the at least two sounds may be heard by the user via different acoustic routes. The at least two sounds may be outputted to the user by different sound guiding holes (e.g., the sound guiding holes 4816 located in different locations of the acoustic output apparatus 4800).

In some embodiments, the target sound generation module 4920 may apply a spatial sound reproduction algorithm to generate a first spatial sound signal and a second spatial sound signal, respectively. Exemplary spatial sound reproduction algorithm may include head-related transfer functions (HRTFs), a dummy head recording algorithm, a cross-power spectrum phase (CSP) analysis algorithm, or the like, or any combination thereof. For illustration purposes, the HRTFs for two ears of the listener may be used to synthesize the spatial sound that seems to come from a particular direction or location in a 3D space. Merely by way of example, the target sound generation module 4920 may generate the first spatial sound signal and the second spatial sound signal in real time. The target sound generation module 4920 may be electrically coupled to an electronic frequency division module 410. The first and second spatial sound signals may be transmitted to the electronic frequency division module 410.

In 5008, for each of the at least two sound signals, the electronic frequency division module 410 may generate a first sound signal and a second sound signal. The frequency of a first sound corresponding to the first sound signal may be within the first frequency range. The frequency of a second sound corresponding to the second sound signal may be within the second frequency range. In some embodiments, the first frequency range may include at least one frequency that is lower than 650 Hz. In some embodiments, the second frequency range may include at least one frequency that is higher than 1000 Hz. In some embodiments, the first frequency range may overlap with the second frequency range. For example, the first frequency range may be 20-900 Hz and the second frequency range may be 700-20000 Hz. In some embodiments, the first frequency range does not overlap with the second frequency range. For example, the first frequency range may be 0-650 Hz (excluding 650 Hz) and the second frequency range may be 650-20000 Hz (including 650 Hz).

In some embodiments, the acoustic output apparatus may include a first set of first sound guiding holes located in a first region of the acoustic output apparatus and a second set of first sound guiding holes located in a second region of the acoustic output apparatus. The first region and the second region may be different. In some embodiments, the acoustic output apparatus may include a first set of second sound guiding holes located in a third region of the acoustic output apparatus and a second set of second sound guiding holes located in a fourth region of the acoustic output apparatus. The third region and the fourth region may be different. For instance, the first region and the third region may be relatively close to the left ear of the user (e.g., located on the left leg of the acoustic output apparatus 4800), and the second region and the fourth region may be relatively close to the right ear of the user (e.g., located on the right leg of the acoustic output apparatus 4800).

The first set of first sound guiding holes may include at least two first sound guiding holes configured to output the first sound corresponding to a first spatial sound signal. The second set of first sound guiding holes may include at least two first sound guiding holes configured to output the first sound corresponding to a second spatial sound signal. The first set of second sound guiding holes may include at least two second sound guiding holes configured to output the second sound corresponding to a first spatial sound signal. The second set of second sound guiding holes may include at least two second sound guiding holes configured to output the second sound corresponding to a second spatial sound signal.

In some embodiments, there may be a phase difference between the first sounds outputted by two first sound guiding holes of the first set of first sound guiding holes. For example, the phases of the first sounds outputted by two first sound guiding holes of the first set of first sound guiding holes may be opposite, which may help preventing the leakage of the first sounds. In some embodiments, similarly, there may be a phase difference between first sounds outputted by two first sound guiding holes of the second set of first sound guiding holes. In some embodiments, similarly, there may be a phase difference between second sounds outputted by two second sound guiding holes of the first set of second sound guiding holes. In some embodiments, similarly, there may be a phase difference between the second sounds outputted by two second sound guiding holes of the second set of second sound guiding holes. As a result, the target sound simulated based on the first spatial sound signal and the second spatial sound signal may be less likely to be heard by other people near the acoustic output apparatus.

In some embodiments, there may be a first difference between the first sound (corresponding to the first spatial sound signal) outputted by the first set of first sound guiding holes and the first sound (corresponding to the second spatial sound signal) outputted by the second set of first sound guiding holes. In some embodiments, there may be second difference between the second sound (corresponding to the first spatial sound signal) outputted by the first set of second sound guiding holes and the second sound (corresponding to the first spatial sound signal) outputted by the second set of second sound guiding holes. The first difference and the second difference may facilitate the user to identify position information of the sound source of the target sound (i.e., a spatial sound) in the VR/AR scene. For instance, the first difference may include at least one of a phase difference, an amplitude difference, or a frequency difference. The second difference may include at least one of a phase difference, an amplitude difference, or a frequency difference.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

We claim:

1. An acoustic output apparatus, comprising:
   one or more status sensors configured to detect status information of a user;
   at least one acoustic driver for outputting sounds based on the status information through at least two sound guiding holes acoustically coupled to the at least one acoustic driver, wherein:
     the acoustic output apparatus is configured to simulate, by outputting the sounds, at least one target sound coming from a sound source, the target sound being a spatial sound that allows the user to identify position information of the sound source,
     the at least one acoustic driver includes:
       at least one low-frequency acoustic driver configured to generate at least one first sound, a frequency of the at least one first sound being within a first frequency range; and
       at least one high-frequency acoustic driver configured to generate at least one second sound, a frequency of the at least one second sound being within a second frequency range,
     the at least two sound guiding holes include:
       at least two first sound guiding holes acoustically coupled to the at least one low-frequency acoustic driver, the at least two first sound guiding holes being configured to output the at least one first sound; and
       at least two second sound guiding holes acoustically coupled to the at least one high-frequency acoustic driver, the at least two second sound guiding holes being configured to output the at least one second sound, wherein a distance between each of the at least two first sound guiding holes and an ear of the user is greater than a distance between each of the at least two second sound guiding holes and the ear of the user.

2. The acoustic output apparatus of claim 1, wherein the second frequency range includes at least one frequency that exceeds the first frequency range.

3. The acoustic output apparatus of claim 2, wherein the first frequency range includes at least one frequency that is lower than 650 Hz and the second frequency range includes at least one frequency that is higher than 1000 Hz.

4. The acoustic output apparatus of claim 1, wherein the at least one low-frequency acoustic driver includes a first transducer and the at least one high-frequency acoustic driver includes a second transducer, the first transducer and the second transducer having different frequency response characteristics.

5. The acoustic output apparatus of claim 4, wherein the first transducer includes a low-frequency speaker and the second transducer includes a high-frequency speaker.

6. The acoustic output apparatus of claim 1, the acoustic output apparatus further includes:
an electronic frequency division module configured to divide a sound signal into a first sound signal corresponding to a sound of the first frequency range and a second sound signal corresponding to a sound of the second frequency range, wherein:
the first sound signal is transmitted to the at least one low-frequency acoustic driver and the second sound signal is transmitted to the at least one high-frequency acoustic driver.

7. The acoustic output apparatus of claim 1, wherein there are a first distance between the at least two first sound guiding holes and a second distance between the at least two second sound guiding holes, the first distance being greater than the second distance.

8. The acoustic output apparatus of claim 1, wherein:
the at least two first sound guiding holes include a first set of first sound guiding holes located in a first region of the acoustic output apparatus and a second set of first sound guiding holes located in a second region of the acoustic output apparatus, the first region of the acoustic output apparatus and the second region of the acoustic output apparatus being located at opposite sides of the user; and
the at least two second sound guiding holes include a first set of second sound guiding holes located in a third region of the acoustic output apparatus and a second set of second sound guiding holes located in a fourth region of the acoustic output apparatus, the third region of the acoustic output apparatus and the fourth region of the acoustic output apparatus being located at opposite sides of the user.

9. The acoustic output apparatus of claim 8, wherein the at least one target sound is simulated based on at least one of:
a first difference between the at least one first sound outputted by the first set of first sound guiding holes and the at least one first sound outputted by the second set of first sound guiding holes; or
a second difference between the at least one second sound outputted by the first set of second sound guiding holes and the at least one second sound outputted by the second set of second sound guiding holes, the first difference or the second difference including at least one of a phase difference, an amplitude difference, or a frequency difference.

10. The acoustic output apparatus of claim 1, wherein the at least two first sound guiding holes are coupled to the at least one low-frequency acoustic driver via a first acoustic route and the at least two second sound guiding holes are coupled to the at least one high-frequency acoustic driver via a second acoustic route, the first acoustic route and the second acoustic route having different frequency selection characteristics.

11. The acoustic output apparatus of claim 10, wherein the first acoustic route includes an acoustic impedance material, an acoustic impedance of the acoustic impedance material being within a range of 5 MKS Rayleigh to 500 MKS Rayleigh.

12. The acoustic output apparatus of claim 1, wherein the acoustic output apparatus further includes a supporting structure configured to:
carry the at least one acoustic driver; and
enable the acoustic output apparatus to be located off a user ear.

13. The acoustic output apparatus of claim 12, wherein the at least two sound guiding holes are located on the supporting structure.

14. The acoustic output apparatus of claim 1, wherein the at least one acoustic driver is enclosed in a housing, the housing forming a front chamber of the at least one acoustic driver and a rear chamber of the at least one acoustic driver.

15. The acoustic output apparatus of claim 14, wherein the front chamber is acoustically coupled to one of at least two sound guiding holes and the rear chamber is acoustically coupled to another one of the at least two sound guiding holes.

16. The acoustic output apparatus of claim 1, wherein a phase of the sound outputted from one of the at least two sound guiding holes is opposite to a phase of the sound outputted from another one of the at least two sound guiding holes.

* * * * *